United States Patent [19]

Brown

[11] 4,338,673

[45] Jul. 6, 1982

[54] PHOTOTYPESETTING SYSTEM AND METHOD

[75] Inventor: Kenneth W. Brown, Framingham, Mass.

[73] Assignee: Compugraphic Corporation, Wilmington, Mass.

[21] Appl. No.: 181,808

[22] Filed: Aug. 27, 1980

Related U.S. Application Data

[63] Continuation of Ser. No. 966,638, Dec. 5, 1978, abandoned.

[51] Int. Cl.3 .................... G06F 3/153; G06F 15/20

[52] U.S. Cl. .................... 364/523; 354/7; 340/720; 340/731; 340/739; 340/748

[58] Field of Search .................. 364/521, 523; 358/96, 358/217; 354/5, 7; 340/720, 731, 739, 747, 748; 178/15

[56] References Cited

U.S. PATENT DOCUMENTS

| | | | |
|---|---|---|---|
| 3,471,848 | 10/1969 | Manber | 340/324 |
| 3,665,408 | 5/1972 | Erdahl et al. | 364/900 |
| 3,713,098 | 1/1973 | Muenchhausen et al. | 340/146.3 AC |
| 3,786,482 | 1/1974 | Puckett, Jr. et al. | 340/739 |
| 3,936,664 | 2/1976 | Sato | 364/523 |
| 3,946,365 | 3/1976 | Bantner | 354/7 |
| 3,979,742 | 9/1976 | Kolb et al. | 340/739 |
| 4,020,462 | 4/1977 | Morrin | 340/146.3 AE |
| 4,029,947 | 6/1977 | Evans et al. | 364/523 |
| 4,038,493 | 7/1977 | Richards | 178/15 |
| 4,199,815 | 4/1980 | Kyte et al. | 364/523 |
| 4,231,096 | 10/1980 | Hansen et al. | 364/523 |

*Primary Examiner*—Jerry Smith

*Attorney, Agent, or Firm*—Kenway & Jenney

[57] ABSTRACT

A method and system for use in phototypesetting. A type font character is scanned and character data representative of the font character is generated. The scan data is encoded in accordance with a first predetermined sequence of steps to have the form of an ordered succession of code words. The stored encoded font data is processed in conjunction with character selection control signals to specify a line-to-be-typeset. The selected character data is decoded in accordance with a second predetermined sequence of steps. The first (encoding) and second (decoding) sequences of steps are related so that the format of the stored encoded data is specifically ordered so that it may be utilized in the decoding process as that data is presented. The decoded selected character data is then converted to video signals for an output cathode ray tube. The decoding sequence may be performed to generate stroke signals for the output cathode ray tube (CRT) of a conventional phototypesetting system during the corresponding strokes in the raster pattern of that output CRT operation. The encoding sequence of steps is adapted so that the decoding sequence may be selectively modified to provide selective scaling of the reproduction of the selected characters.

30 Claims, 34 Drawing Figures

13

P7

P9

PHOTOTYPESETTING SYSTEM AND METHOD

This is a continuation, of application Ser No. 977,638, filed Dec. 5, 1978 and now abandoned.

BACKGROUND OF THE INVENTION

This invention relates to methods and systems for use in phototypesetting and more particularly to such methods and systems used in coding and decoding font information for use in CRT phototypesetting systems.

Phototypesetting systems are often required to meet a broad range of selected typesetting applications, such as newspaper, news text, classified advertising material, telephone directories, parts lists, and catalogs. In such applications, a large number of type fonts may typically be required for a phototypesetting system, or one system may be required to rapidly switch type fonts from one "job" to the next. In addition, the type fonts reproduced may be selectively scaled in either the horizontal or vertical directions, or both directions, in the typeset format.

In phototypesetters of the prior art, an image disector tube may be used with an associated glass font grid for each type font to be typeset. In one form of prior art system, the font grid includes master characters with a set of coded bars associated with each character representative of character width. In such systems, the image of a selected character from the font grid is projected onto the cathode of an image disector tube and the width bars are sensed and the associated values stored in memory locations. An input paper tape provides information representative of the necessary typographic parameters such as measure, point size, and leading. For computer generated tape or prejustified counting keyboard output, all control functions and commands are read from the input tape.

As a line-to-be-typeset is read into the system (e.g. by way of the paper tape reader), the characters in the line are selectively scanned on the image dissector grid. As the characters are scanned, the character width data from appropriate memory locations is processed, with interword, and if necessary intercharacter, computation being performed, and CRT modulation control signals are generated. Electronic manipulations may be performed under the input tape control for characters extracted from the image disector to provide for such type variations as sizing, obliqueing, condensing or expanding, or boldface effect, or others. Finally, the characters are generated on the face of a cathode ray tube (CRT) through a fiber-optic faceplate of the CRT, and onto a photosensitive medium.

In such prior art systems, the memory requirements are extremely large in order that the system be able to rapidly generate the character signals for the output CRT. In addition, such systems generally require manual intervention (e.g., in the form of replacing the relatively bulky and fragile font grid) whenever type font changes are required. Furthermore, each time a character is to be typeset, the entire processing routine (i.e. selection, followed by scanning, followed by processing) must be performed to generate suitable character signals for the output CRT.

In alternative prior art approaches, the latter problem is sometimes alleviated by preloading a digital memory in effect with a library of stored digital signals representative of all the characters in a particular font. However, the memory requirement for storing the font character signals for a complete font, typically about one hundred characters, is extremely large. Furthermore, the mere generation of the signals for such stored font character signals is a difficult task in itself.

In order to reduce storage requirements for such prior art systems, the font character signals are often encoded prior to storage, although this step produces considerable added complexity to the encoding portion of the system as well as requires a decoding portion of the system. Moreover, the prior art encoding techniques place severe limitations on the processing of the font character signals, such as processing directed to character operator-selected scaling, boldface effect, and the like.

Accordingly, it is an object of the present invention to provide an improved system and method for generating phototypesetting control signals for a CRT.

It is a further object of the present invention to provide an improved system and method for generating efficiently encoded representations of images-to-be-typeset.

Another object of the present invention is to provide an improved system and method for efficiently decoding representations of images-to-be-typeset and converting the decoded representations to control signals for the output CRT of a phototypesetting system.

Yet another object of the present invention is to provide an improved system and method for decoding representations of images-to-be-typeset, and for independently scaling in two orthogonal directions the coded representations, and for converting the scaled decoded representations to control signals for the output CRT of a phototypesetting system.

SUMMARY OF THE INVENTION

Briefly, the present invention is directed to a method and system for use in phototypesetting. According to one aspect of the invention, a type font is scanned and character, or symbol, data representative of that image is generated. The original font information which is scanned may be character cards or have some other conventional format. The scan data is then encoded in accordance with a first predetermined sequence of steps. The resultant encoded data may be temporarily stored in digital form on such a storage medium as a magnetic disc pack, for example. According to this aspect of the invention, a library of disc packs, each containing a stored font data in relatively compact encoded form, may be established for a number of type fonts. In some forms of the invention, encoded font data stored in the disc packs, or other media, may be encrypted prior to storage in the disc pack, or alternatively, that information may be extracted from the disc pack, encrypted, and then stored on some other medium, such as floppy disks. In the latter forms of the invention, encryption produces a security aspect to the stored font information.

According to another aspect of the invention, the stored, encoded font data from the disc pack, or alternatively, from the floppy disks, or other storage medium, may be then processed by a decoding portion of the system in conjunction with character selection control signals specifying a line-to-be-typeset provided in a conventional manner. Initially, the stored, encoded font data is read from the medium into a local decoder storage. The selected character data is then decoded in accordance with a second predetermined sequence of steps. The decoded selected character data is then converted to video signals for an output CRT. In systems where the encoded font data is stored in encrypted form, a corresponding data decrypter is utilized at the font end of the decoding portion of the system.

The first (encoding) and second (decoding) sequences of steps are related so that the decoding sequence may be performed to generate stroke signals for the output CRT of a conventional phototypesetting system during the corresponding strokes in the raster pattern of that output CRT operation. As a result, substantially less memory is required to store a reconstructed image for the output CRT.

In addition, the encoding sequence is adapted so that the format of the stored, encoded data is specifically ordered so that it may be utilized by the decoding portion of the system as that data is presented. As a result, relatively little and straightforward hardware and software implementation is required for the decoding operation. Consequently, the storage requirements at the location of the decoding portion of the system are relatively small since the ordered structure of the data in the stored medium does not require any tags or other identifying portions for processing.

Since the stored encoded font data is in a form which is ordered in precisely the manner required by the decoding portion of the system, relatively little processing is required at the decoding portion of the system in terms of reformatting stored data, identifying data portions by associated tags and the like. As a consequence of this encoding approach of the present invention, the font digitizing, or encoding, portion of the system is characterized by a relatively high level of complexity, but the decoding portion is relatively straightforward. As a result, the system may readily be configured with a single encoding station producing encoded font data and a number of remote and relatively low cost decompression or decoding stations.

Further, the encoding sequence of steps is adapted so that the encoded data on the medium may be decoded in a manner so that the decoding sequence may be selectively modified to provide selective scaling of the reproduction of the selected characters, or symbols, on the output CRT of the phototypesetting system. This selective scaling may be independent in two orthogonal directions. In other words, the operator might select to scale in the horizontal dimension by some selected factor, and in the vertical direction by another selected factor. Alternatively, the operator may select the scaling factors to be unity in either or both of the horizontal and vertical directions. In any event, the output CRT control signals for the scaled symbols are provided at a constant spatial stroke rate, or pitch, in the raster pattern. Thus, the present invention, in effect, scales the vector representation of contour edges rather than the prior art approach of scaling the contents of a RAM which includes a full representation of a character-to-be-typeset. Further, the character scaling is accomplished on an interpolative basis so that the scaling may be greater or less than unity while maintaining constant pitch.

In accordance with the invention, the format for the font signals on the medium for the decoding portion of the system may be in either scaled form or directly related to a master as originally encoded. However, since the scaling may be readily performed at the decoding portion of the system, the preferred form of the invention provides a single form of intermediate storage representation of the encoded characters. This latter feature is contrasted with techniques in conventional systems which store coded information on a media, decode the information and reconstruct the desired output symbol in random access memory (RAM), and then process that information to accomplish scaling, followed by reading out the resultant control signals which are representative of the scaled symbol. With the present invention, the scaling of symbols prior to display of the character on the CRT provides improved resolution compared with the prior art systems.

In accordance with the present invention, the encoded font character, or symbol, signal is produced by a contour-following coding, following transistions of the image from one binary level to another throughout the field for a symbol. All contours are defined to monotonically increase from one edge to the image to another, with merge points occurring as required. The adaptive coding technique is based on a linear interpolation where the number of coded points for a contour, or vectors, is variable depending on the rate of change of curve of the contour of the symbol being encoded.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 2 which comprises

FIGS. 3–1 shows in block diagram form, the encoder of the system of FIG. 1;

FIGS. 3–2 shows an exemplary symbol-to-be encoded by the system of FIG. 1;

FIG. 4 which comprises

DESCRIPTION OF THE PREFERRED EMBODIMENT

1. General Description

Figure 1:
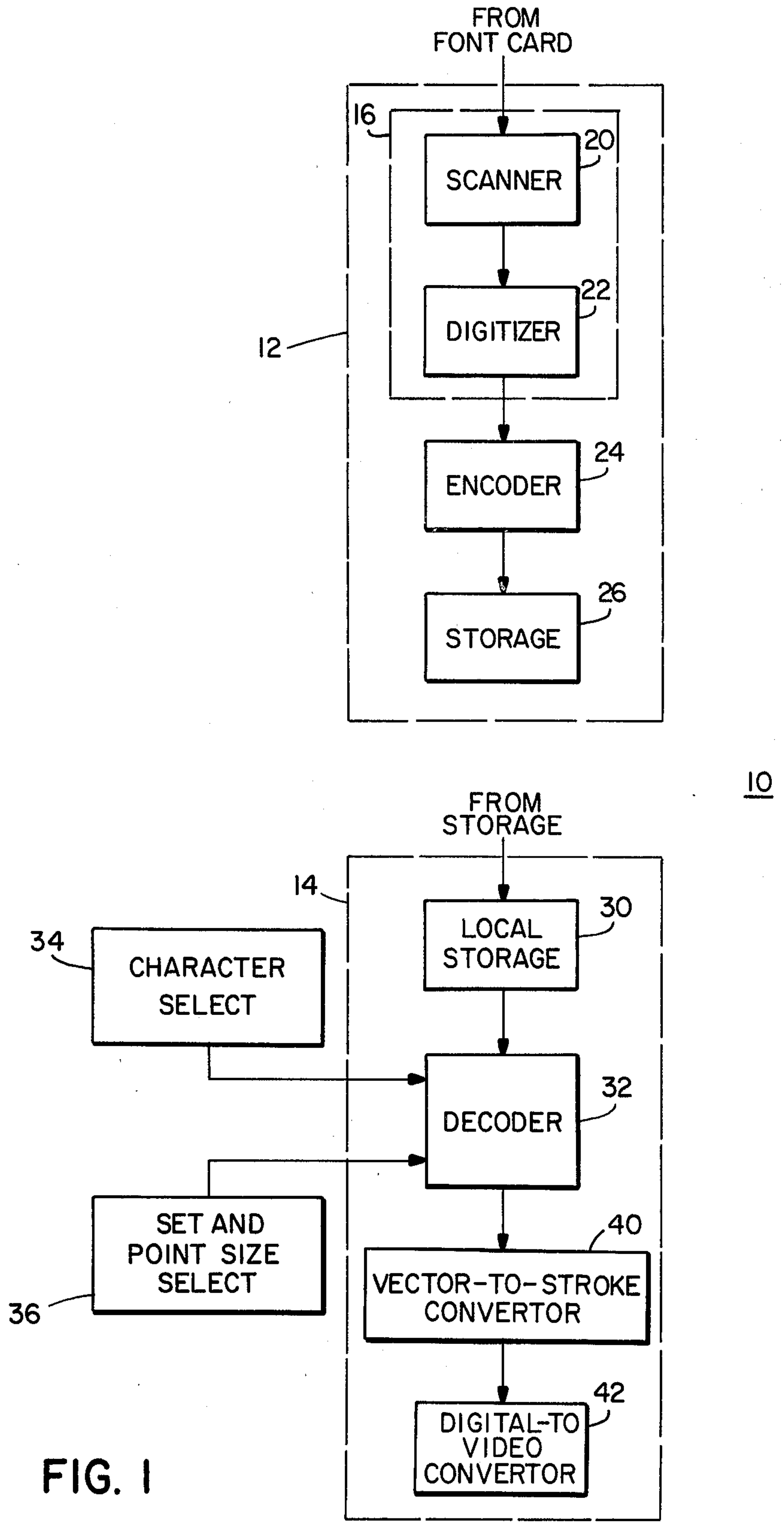
FIG. 1 shows in block diagram form, an exemplary embodiment of the present invention.

The invention is directed to a system and method for generating data representative of the contour of an object against a background. Initially, the image, which includes the object and background, is scanned along a plurallity of substantially parallel scan lines. Contour points of the object are identified along those scan lines. For a black and white image, with optical scanning, these contour points may represent the coordinates of black-to-white and white-to-black transitions of the image along the scan lines. As the scanning progresses from scan line to scan line, selected ones of the identified contour points are grouped so that the contour points of each group are representative of a contour elememt of the object, with a contour element being defined as a portion of the object boundary extending monotonically in the direction perpendicular to the scan lines. Vector data is generated and stored for each group, where the vector data is representative of straight line vectors forming a piecewise linear representation of the associated contour element. The vector data corresponding to each straight line portion of the piecewise linear representation, represents the change (ΔY) in that portion in the direction of the scan lines and the number of scan lines (ΔX) for which that portion extends. In the preferred embodiment, each scan line is defined to extend in the vertical (Y) direction, and adjacent scan lines are mutually displaced by an increment in the horizontal (X) direction.

The vector data is encoded and stored for the image as a succession of data words. The succession includes at least one word representative of the starting position of each contour element, at least one word representative of the range of each ΔX value of the straight line portions and the number of straight line portions for which the ΔX range value is valid, at least one other word representative of the range of each ΔY value of the straight line portions and the number of straight line portions for which the ΔY range value is valid, and at least one word representative of the ΔX and ΔY values for the straight line portions. The encoded vector data words are compiled and stored in a predetermined order related to the order of detection of the various portions fo the contour elements.

The invention is further directed to a system for generating a succession of stroke signals from an ordered sequence of code words, such as the encoded code words descirbed above. The succession of stroke signals are representative of the optical characteristics of a corresponding succession of substantially parallel, elongated strips of an image which includes an object against a background. The strips extend in a direction corresponding to the scan line direction defined above. The code words are representative of line segments connecting contour points along associated contour elements of the object, where the contour elements are defined as portions of the contour which are single valued functions in the direction parallel to the image strips.

The code words include data representative of the start points of the segments, the positional changes between start and end points of the segments, and the number of successive segments associated with the same contour element having corresponding positional changes in the same range.

In the process of generating the stroke signals, each of the various strips of the image are successively identified as a current strip. For each current strip, a vector generator produces and stores vector data derived from the code words which represent line segments overlapping the current strip. The vector data for each line segment is representative of: (1) the ratio ΔY/ΔX corresponding to the change in the position (Y) of the line segment in the direction of the strip from the current strip to the next strip, (2) the starting point (SV) of the line segment in the current strip and (3) the number of subsequent strips for which the ratio of that segment is unchanged. The stored vector data is converted for each current strip to one of the stroke signals.

In one form of the invention, the stored vector data is converted to stroke signals by identifying the location of each line segment in the current strip and generating a corresponding video stroke signal in binary form, with the stroke signal being a time function and having binary level transitions at points in time corresponding to the line segment locations in the current strip.

In another form of the invention, the stroke signals may represent the original image as scaled by independent horizontal and vertical scale factors (e.g., set size and point size). In this form, segment data words may be generated for a current strip from the code words for each of the line segments overlapping the current strip. The segment data words for each segment are representative of: (1) the end point for the line segment in accordance with the associated code words, (2) a scaled length of the line segment, where the scaled length corresponds to the length of the line segment from the current strip in the direction perpendicular to the current strip and scaled by a first scale factor so that the scaled length corresponds to an integer plus a fractional value (k), (3) the range of the positional change in the direction perpendicular to the current strip between the start and end points of that segment, and the number of subsequent successive segments of the associated contour element having corresonding positional changes in the same range, and (4) the range of the positional change in the direction of the current strip between the start and end points of the segment and the number of subsequent successive segments of the associated contour element having corresponding positional changes in the same range.

In addition, in generating the vector data, the segment data words are identified for segments having no subsequent strips for which the change in position portion is unchanged. The identified segment data words are then processed in order of increasing scaled length with the identified segment words having the same scaled length being processed in order of increasing position (i.e. from top-to-bottom along the corresponding stroke) along the current strip.

The vector data is generated and updated from the ordered succession of the identified segment data words as those segment data words are identified. The vector data for each of the segment data words is representative of: (1) modified ΔY/ΔX ratio, where the ΔY value is modified to equal the product of ΔY and the second scale factor and the ΔX value is modified to equal the product of ΔX and the first scale factor, (2) the modified starting point of the line segment in the current strip, where the modified starting point equals the product of SV and the second scale factor, plus the product of (1-K) and the modified ΔY/ΔX ratio, and (3) the modified number of subsequent strips for which the change of position for each strip is unchanged, that modified number being equal to K plus the product of ΔX and the first scale factor. The vector data modified in this manner is then stored in the order of the identified segment data words.

FIG. 1 shows an exemplary system 10 embodying the present invention. The system 10 includes an encoding section 12 and a decoding section 14. Section 10 includes an input section 16 having a conventional scanner 20 and digitizer 22. Scanner 20 is adapted to optically scan an object against a background field from top-to-bottom (Y-direction) along substantially parallel lines of scan which progress left-to-right (X-direction) across the image. In this embodiment, the X and Y directions represent orthogonal axes with the X direction being perpendicular to the scan line direction and the Y direction being in the scanned direction. In other embodiments, different scan configurations may readily be utilized. In this embodiment, scanner 20 is adapted to optically scan a master for characters to be typeset, such as a conventional font card which includes a black alpha-numeric symbol against a white background. In other embodiments, the card may include an image in a direction form with the image having an object (characterized by a first detectable characteristic, such as optical reflectivity) against a background field (characterized by a second detectable characteristic). For example, the font card may have a character in black ink on a transparent film background, where optical density is detected.

The digitizer 22 is responsive to the scanner 20 to generate a digital signal, where each bit is representative of an elementary area, or cell, in the symbol being scanned on the font card, with the binary value of each bit being representative of the optical reflectivity of the associated cell. From the cell data, the digitizer 22 generates and stores contour point data representative of elemental regions along the scan line characterized by a transition between the first and second (e.g. black and white) detectable charactertistic of the image. The contour point data for each cell includes coordinate data representative of the X and Y position of the corresponding cell at which the detectable characteristic transition occured. Thus, the digitizer 22 provides a set of contour point data representative of contours (i.e. black-white and white-black transitions) of the object against the background field in the image being scanned.

The contour point data from digitizer 22 is applied to an encoder 24 where that data is encoded into a compact form, which encoded form is then transferred for storage in storage element 26. The encoding process is described in detail below.

The decoding section 14 includes a local storage element 30 which receives the encoded contour point data as stored in element 26, or in some alternative storage medium. The stored data in element 30 is extracted as required by a decoder 32. Decoder 32 operates in conjunction with an external character selector 34 and a set and point size selector 36. The character selector 34 may be a conventional element for phototypesetting systems which generates data representative of a line of characters or symbols to be typeset. For example, a TTY-tape reader may be utilized for use where the text-to-be-typeset is already encoded on paper tape. The set and point size selector 36 is an operator control by which X and Y direction scaling control signals are generated for a desired set size and point size, respectively. In alternative embodiments, the set size and point size parameters may be included on the paper tape, for example.

The signals generated by decoder 32, therefore, represent a scaled version of the character selected by selector 34, as generated from the corresponding font card. This data is applied to a vector-to-stroke convertor 40 which converts the scaled data to an appropriate form suitable for stroke-by-stroke control signals for a constant stroke rate CRT display. The latter control signals are applied to a digital-to-video convertor, or CRT line generator, 42 in order to transform the control signals into suitable video signals for driving the output CRT for a conventional phototypesetting system.

2. ENCODING SECTION AND PROCESS

The various font symbols are encoded in section 12 using a form of contour coding wherein connected points which share an attribute are separated from all contour point data for further processing. The attribute of interest in the present coding technique is a change from white-to-black or black-to-white, i.e. essentially locating the edges of a black object (e.g. a character or symbol) against a white background in an image.

Figure 2A:
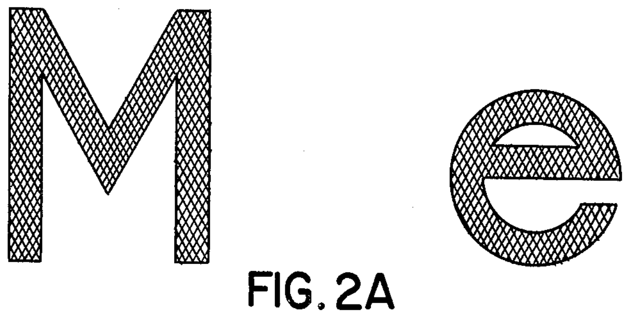
FIGS. 2A–2C illustrates sample characters and contour definitions.
Figure 2B:
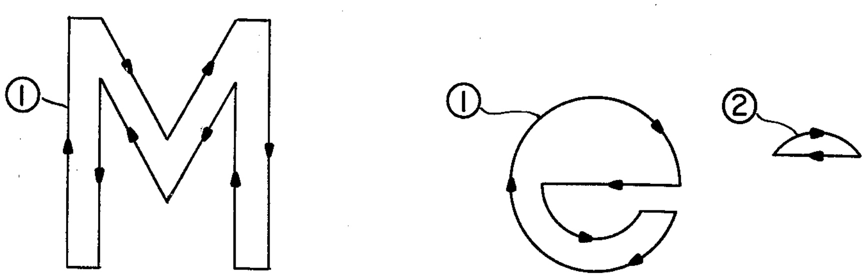
FIG. 2B (prior art)

Conventional contour coding for symbols generally define a single contour for a block letter. For example, as shown in FIGS. 2A and 2B, the block upper case letter "M" may be defined to have a single contour (denoted by encircled reference numeral 1 in FIG. 2B), since a single line can describe its entire shape and there are no interior "holes". On the other hand, the block lower case letter "e" has two contours (denoted by encircled reference numerals 1 and 2 in FIG. 2B), one representing the exterior border, and the other representing the interior hole border. With such contour definitions, a symbol can be described as a string of coordinate points for each of its contours. Since the distance from one point to an adjacent point is usually small, further compression may be achieved by specifying a start value and a string of difference values. However, this coding technique is quite expensive to implement in the font-coding application, since the decoder must decode and store the entire character before proceeding to generate output signals representative of the stored character. The coding technique of the present invention avoids this difficulty.

Figure 2C:
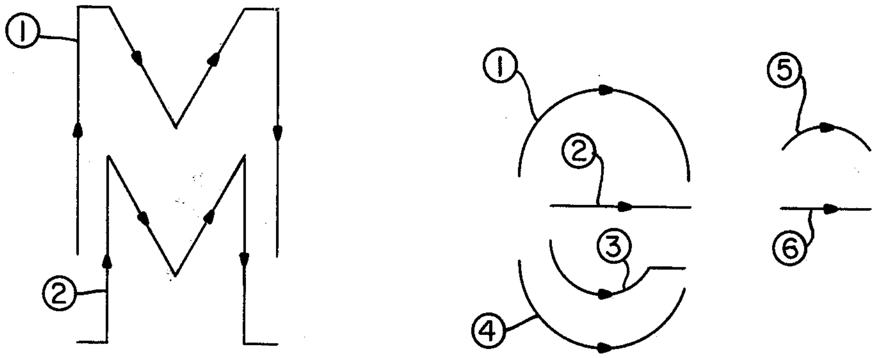

In accordance with the present embodiment having top-to-bottom scanning progressing left-to-right across a symbol, a contour is defined to be monotonically continuing from left to right in an image, i.e. perpendicular to the scan line direction. In alternative embodiments, the monotonic contours may be defined in other directions with different scanning definitions. With the present contour definition, as shown in FIG. 2C, the letter "M" is defined to have two contours (denoted by encircled reference numerals 1 and 2 in FIG. 2C), one to describe the top edge and a second to describe the bottom edge. The letter "e" is defined to have six contours (denoted by encircled reference numerals 1–6 in FIG. 2C).

The present contour definition does not change the number of data points required to describe the character outlines, although it does alter the order in which data is presented to the decoder, so that a stroke-by-stroke reconstruction may be performed without need of a large RAM to store the entire character, or require tags associated with the various data words, while still permitting character scaling with independent horizontal and vertical scale factors. With the present form of contour coding, vertical scaling is straight-forward. The various contour points are defined relative to a horizontal base line. Upon decoding, the contour points are directly scaled by the ratio of the output size to the original master size during an output stroke. Appropriate round-off can give a scaled point which is accurate within the resolution of the output CRT.

Horizontal scaling is provided by means of interpolation in order to maintain a constant stroke spacing. A character that is, for example, 1280 strokes wide at 64 point, becomes 200 strokes wide at 10 points. Thus, when a particular point is located relative to the left edge of a character at the master size, scaling by the ratio of output size to master size will in general produce points which do not lie on the strokes of the output device. It is not sufficient to take the scaled point "closest to" the output stroke on steeply sloped edges since this can be a significant distortion. Thus, the present encoding approach provides encoded data in a form from which the points on stroke are generated by interpolation.

Briefly, the contour point data is converted to a string of vectors. Each vector is a straight line coded as a ΔX, ΔY) pair which gives the slope of the curve for a variable distance ΔX, allowing for extremely short vectors around fine details, and long vectors around regions of constant slope. The end value of a vector is constrained to lie exactly on the original contour, while intermediate points may be slightly offset from the actual contour. This ensures that a long series of vectors can be drawn without accumulating error from vector-to-vector, since the start of each new vector is known exactly by accumulating the ΔY values to the start of the contour.

Further data compression is achieved by considering the pattern of data in the (ΔX, ΔY) pairs. In general for alphanumeric typesetting applications, successive values of ΔX tend to be near each other, particularly when ΔX is small. Consequently, a new type of code word is introduced in the form (m, n) which specifies that the next "m" codes all have "n" for their most significant bits. The addition of this code word reduces the number of bits for each (ΔX, ΔY) pair by the number of bits in "n". This compression approach is also applied to successive values of ΔY, where a code work (i, j) specifies that the next "i" codes all have "j" for their most significant bits. The (m,n) and (i,j) code words are referred to as lines-code/lines-range (LC/LR) and delta-code/delta-range (DC/DR) words respectively. The least significant bits for (ΔX, ΔY) pair are encoded as residual lines value (L) and delta value (D) as a delta/lines (D/L) word.

The encoder 24 provides an ordered sequence of codewords to be stored in element 26, with the codeword data being in the form of starting point, lines-range, lines-code, delta-range and delta-code, and residual lines and delta values. In the present embodiment, all of this data is representative of a 64-point master since scaling for other sizes and interpolation between coded points is performed at the decoder section 14. A key consideration at this point is that the encoding process anticipates the order of operations in the decoding process to be performed in section 14. As a result, the code is ordered such that the storage element 26 stores data in the order that the decoder section 14 will require it, simplifying storage requirements within the decoder section 14. The interleaving of various types of data from various contours follows a specific set of ordering constraints, allowing the decoder section 14 to interpret the data without additional flag or other identifier bits.

Briefly, the rules for interleaving data may be summarized as follows:

1. Data items are inserted in the order in which ΔX values expire.
2. If more than one contour element needs update data during the same scan line, the contour elements are updated in order of increasing distance from the top of the character.
3. If more than one data item is needed to update a contour element, items are inserted in the priority: first, LC/LR, second, DC/DR, and third, D/L.
4. The end of a contour element is signaled with a "zero" value LC/LR word.

These first four rules are sufficient for updating and terminating contours. The following rules allow for start-up and insertion of new contours as detected along a scan line:

5. The first two items for a scan line at which newly identified contour elements "new starts" occur are the topmost new start value and the number of contours starting on that scan line.
6. The word immediately following the D/L word of all new starts except the last in a scan line is the next new start value on this stroke.
7. The word immediately following the D/L word of the last new start for a scan line is the ΔX value to the next scan line requiring contour element updating.

With these last three rules, the decoder section 14 can insert new starts into their proper numerical order relative to existing data, then apply the first four rules to create the first vector of each start. As a convenience for the decoder section, a further rule is imposed on the encoding process which forces an existing contour to have a "breakpoint" when-ever new starts are required. This allows the decoder section 14 to compare integer start values (for insertion in numerical order) and only perform the comparison relative to contours which require updating.

By definition, a character is complete when all existing contours are complete. This leads to an inconvenience for pi characters such as the ellipsis ( . . . ), for example, where the three dots are desired to be a single character. For these cases, an artificial line of zero width is created by the coder to "connect" the disjoint contours. To accommodate such characters, the decoder section 14 monitors scaled values within a stroke for features which are less than one (or two) elements wide, i.e. features which have lost significance at the scaled size. The same mechanism which deletes non-significant features removes the zero-width artifact at all point sizes.

In order to accommodate a vertical jump in a contour, i.e. for cases where sampling creates one sample at the bottom of the jump, and an adjacent sample at the top of the jump, the encoding process initially treats these samples as being connected by a line of finite slope. However, since any subsequent scaling of the character which requires an output stroke between these two points can result in an apparent slope in the output, the encoding operator may then modify the data base to allow a change in "zero" distance. Strictly speaking, this results in a contour being multivalued at this stroke, requiring an additional coding rule.

8. In applying rule 2, an update of zero lines does not count as an update.

This coding modifies the desired contour to show a change in ΔX=O. The first eight rules will insert this condition properly. With this approach, the decoder section 14 determines that a multi-valued contour is assigned the value assumed immediately to the right of the multi-valued condition.

Two more data words complete the character code - the first is representative of the total width of the character, and the second is representative of the distance to the first black data, i.e. the left bearing of the character. These are defined with the rules:

9. The first word of the code word succession is the left bearing word (LB).
10. The second word of the code word succession is the character width word (W).

An example of a character and its code are given in the Contour Point Encoding Example below, which also describes the packing of data into code words on a bit level.

Figures 2, 3:
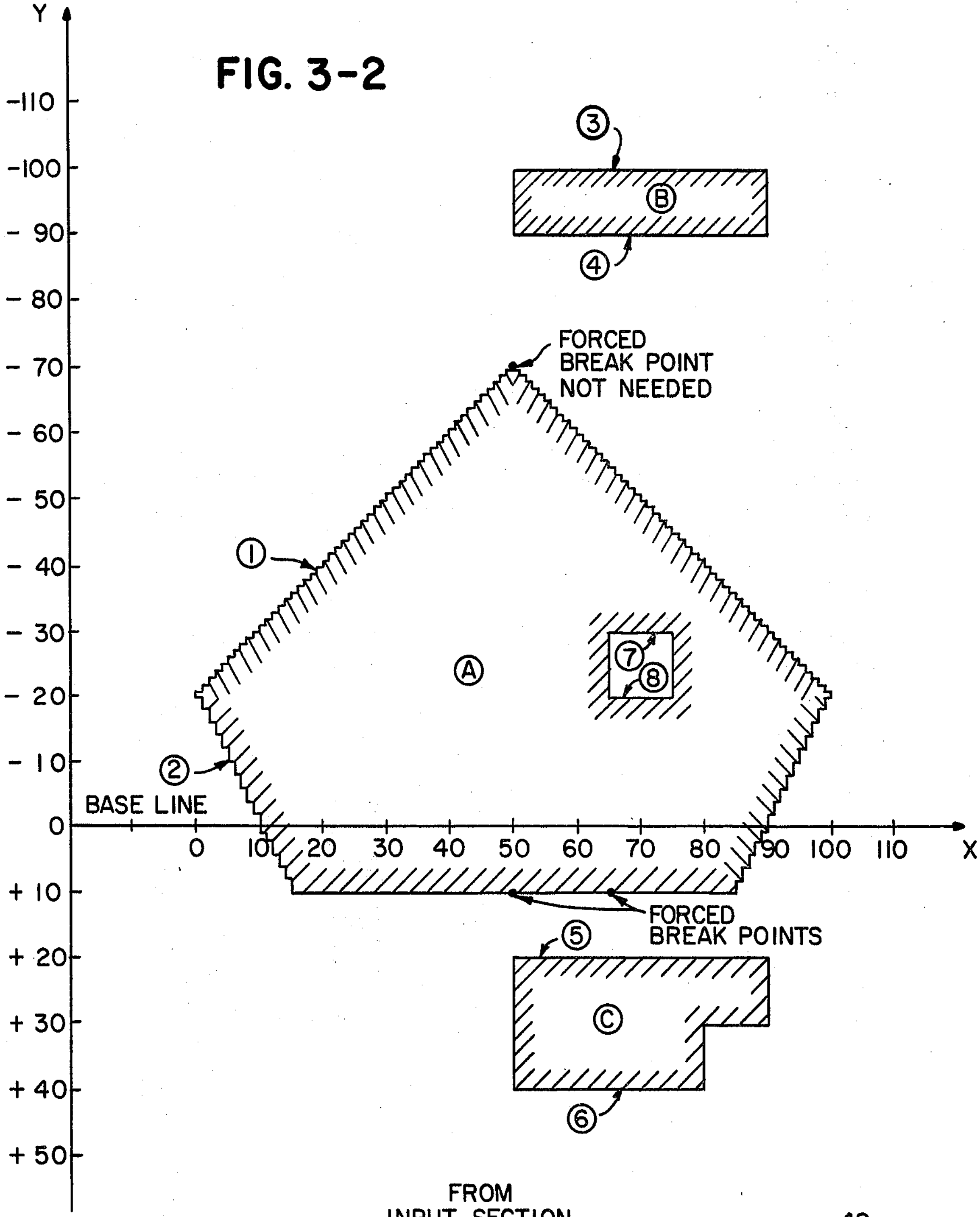
Figures 1, 3:
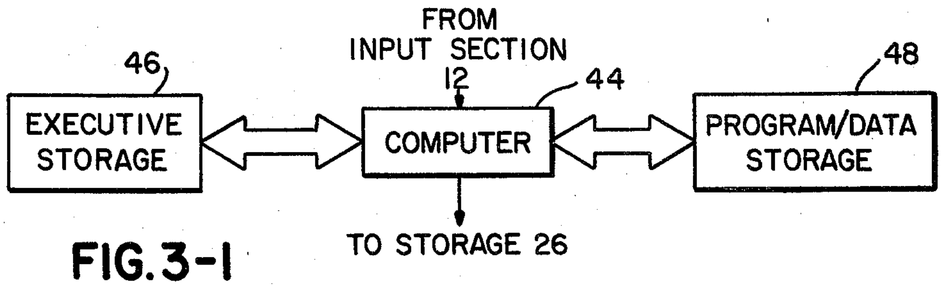

The encoder 24 for the present exemplary embodiment is shown in detailed form in FIG. 3-1. The encoder 24 includes a mainframe computer 44 (DEC PDP-11/34, with 48K words of memory), an executive storage element 46 (DEC RK05F disk pack) and a program/data storage element 48 (DEC RK05J disk pack). Storage element 46 is programmed with a DEC RSX-11M, version 3.1 executive program for controlling operation of encoder 24. The storage element 48 is programmed with a first MACRO-11 program (listed in Appendix 1) which converts the raw contour point data from input unit 16 to a string of points (i.e. vector data) representative of a piecewise linear contour model, where each segment approximates the actual contour within predetermined error criteria. The storage element 48 also includes a portion dedicated to storing the vector data as generated. A second MACRO-11 program (listed in Appendix 2) controls the conversion of the vector data to the ordered sequence of codewords for storage in element 26.

In operation, prior to linear coding, data for an image is separated into contours and stored as strings of points. Storage is in two disk files. The first file, which the system refers to as EDGES. BIN; 1, is a file of uniform-size randomly accessible records, each record containing up to 64 points which are associated with a particular contour. The second file, which the system refers to as PTRS.VAR;1, is a file of variablelength records containing pointers to the following data: word #1 is the stroke at which this contour was first detected. Word #2 is the total number of bytes (words ×2) in the record. Word #3 is the contour value in the first active stroke. Successive numbers in the record point to record numbers in EDGES.BIN;1 assigned to this contour. For example, a record in PTRS.VAR;1 containing the data 1, 12, 406, 2, 4, 5 would be interpreted as a contour starting at line 1 with 12 bytes in its record. The contour starts with a value of 406, and consists of the points stored in records 2, 4 and 5 of file EDGES.-BIN;1. The end of the contour is signified either by zero values as "data points" in the file EDGES.BIN;1 or by terminating the list in PTRS.VAR;1 for the case when a contour is a precise multiple of 64 strokes wide.

The contour data is processed in two main phases. Phase 1 converts the strings of points to linearized approximations of the contour data (converting the points to vectors). Phase 2 interleaves these vectors into a code sequence which is useful to the decoder, and to extract and code the lines-range data, delta-range data, and new-start coding information.

In the Phase 1 processing, the entire contents of file PTRS.VAR;1 are transferred into memory. Two main steps are then performed. First, each contour is brought into memory, one at a time, and assigned a contour number. The ending stroke of the contour is computed from the start line and the number of points in the contour. The start and end lines are then compared against each of the other contour start lines to determine which contours start while the one under consideration is active. For each such other contour, the value of the contour under consideration at that stroke is compared against all prior contenders to find the nearest contour below the new start, or failing that the bottom contour of the character, and the contour number. In effect, this identifies which contour(s) require forced breaks to allow insertion of new contours. This first step is complete when all contours have been tested as candidates for forced breaks.

The second step is to bring each contour into memory for actual vector generation. This is performed by taking a trial vector length, chosen to be the smallest of: (1) the number of points remaining in the string; (2) the distance to a forced break, if any, and (3) an arbitrary 200-stroke maximum. The "Y" values at the start and end of this trial length are compared to give a $\Delta Y$ value, which is divided by the trial length to give a linear change-per-stroke. The decoder operation is then simulated by repetitively adding this slope to the value at the start of the segment plus a round-off bias of ½ unit. The truncated sums are compared against the actual scanned data for the following criteria:

A. no error exceeds 1 unit
B. if the length is >25 strokes, no more than 3 errors of 1 unit occur
C. if the length is <15 strokes, no more than 1 error of 1 unit occurs
D. if the length is between 15 and 24 inclusive, no more than 2 errors of 1 unit occur If these criteria are violated, the trial length is reduced by 1 stroke and the process is repeated until an acceptable length is found. (The limiting case will be adjacent lines connected by a vector of length 1). Data is stored for Phase 2 as two vectors, one pointing to the starting address of the data for each contour and the second containing the packed vector data for all contours. Each contour is represented by its starting line and start value (X, Y coordinates of the first point), followed by a string of ($\Delta X$, $\Delta Y$) pairs describing the vector representation of the contour.

In the Phase 2 processing, the encoder 24 substantially duplicates the decoder 32 operation (described below) at 64 points to predict the order in which the decoder 32 will require data. As the need for each item is predicted, the encoder 24 analyzes its data base to compute that particular item. When all contour codes have been processed, the resulting string of data is stored in storage element 24, along with a count of the number of words in the string.

The detailed operation of encoder 24 will now be described.

Initially, the encoder 24 defines contour elements of the contour of an object scanned by scanner 20 for the various contour value pairs (X, Y) generated by the digitizer 22.

Each contour element is monotonically increasing in the direction perpendicular to the scanned direction.

A succession of vector data pairs is generated for each of the contour elements. Each vector data pair has a first ($\Delta X$) value and a second ($\Delta Y$) value, where the $\Delta X$ and $\Delta Y$ values are representative of the distance in the scan direction and perpendicular to the scan direction, respectively, between selected vector start and end points on an associated contour element. The vector start and end points are selected from the contour point data so that the distance between any point on the straight line segment connecting the start and end points and the closest point on the associated contour element between those start and end points is less than a predetermined value.

The vector data pairs are encoded to form an ordered sequence of code words representative of the scanned object. Before forming this ordered code word sequence, the vector data pairs are modified by first identifying the X value at which a new contour element starts along one of the scan lines, and then modifying the vector data pair ΔX, ΔY for a selected previously identified contour element which overlies that scan line. When the new contour element is the last contour element identified in the scan line, the selected previously identified contour element is the contour element which is adjacent to the new contour element on that same scan line and preceding that new contour element along that scan line. Otherwise, the selected previously identified contour element is the contour element which is adjacent to the new contour element and follows that new contour element. The modification step is omitted if the vector end point of the vector data pair of the previously identified contour element is in that same "new start" scan line.

In this vector data pair modification operation, a first modified vector data pair ΔX, ΔY is generated and stored for the selected previously identified contour element, with the first modified vector data pair having a vector end point representative of the X and Y values for the selected previously identified contour element in the new start scan line and the previously determined vector start point. In addition, a second modified vector data pair ΔX, ΔY is generated and stored for the selected previously identified contour element, with the second modified vector data pair having a vector start point representative of the X and Y values for that new start scan line and the previously determined vector end point. Following their generation and initial storage, the first and second modified vector data pairs are stored in the vector storage as replacement data for the vector data pair for the selected previously identified contour element.

Following the vector data pair modification operation, a contour element (CE) value is generated and stored. This CE value is representative of the number of identified contour elements in the scanned object. Then, in association with each contour element, data representative of the initial X and Y values for that contour element detected during the scan of the object is stored.

Following these preliminary operations, steps in the formation and storage of the ordered code word sequence begin. Initially, the first (bearing) code word in the sequence is generated and stored. The first code word is representative of the X value of the scan line in which the first contour element was detected during the scan. Next, the scan line in which the first contour element was detected is identified as the current scan line. Than a subsequence of code words for said current scan line is generated and stored by performing the steps of:

1. Generating and storing an SV word representative of the Y value of a first new start (NS) portion detected in the current scan line. The first NS portion is part of the first contour element detected for the first time along the current scan line. This step of performing the SV generating and storing step is deleted for a current scan line having no new start portions.
2. Generating and storing an NS word and NS value, both the NS word and NS value are representative of the number of NS portions of contour elements detected for the first time along the current scan line. The NS word and value generating and storing step is deleted for a current scan line having no new start portions.
3. Successively processing NS portions and continuing (C) portions of contour elements detected in the current scan line, where the NS portions are parts of contour elements detected for the first time along the current scan line, and the C portions are extensions of contour elements detected in the next previous scan line. The NS and C portion processing is performed in the order of detection of the respective portions along the current scan line. Each processing of an NS portion for a current scan line includes the sub-steps of:

Generating and storing an LC/LR word representative of a predetermined number of most significant bits (LR) of the ΔX value associated with the first vector data pair for the NS portion, and representative of the number of vector data pairs (LC) for which that ΔX value has those most significant bits for the corresponding contour element, Generating and storing a DC/DR word representative of a predetermined number of most significant bits (DR) of the ΔY value associated with the first vector data pair for the NS portion, and representative of the number of vector data pairs (DC) for which that ΔY value has those most significant bits for the corresponding contour element, Generating and storing a D/L word representative of a predetermined number of least significant bits (L) of the ΔX value associated with the first vector data pair, and representative of a predetermined number of least significant bits (D) of the ΔY value associated with the first vector data pair, whereby LR and L completely specify the ΔX value and DR and D completely specify the ΔY value, Generating and storing a first expiration value $X_{exp}$ representative of the number of scan lines between the current scan line and the scan line including the vector end point of the vector pair including the NS portion, Generating and storing a second expiration value $M_{exp}$ representative of the number of vector data pairs for the contour element remaining before the LR portion of the LC/LR word for the NS portion changes from one vector data pair to another, Generating and storing a third expiration value $N_{exp}$ representative of the number of vector data pairs from the data pair including the NS portion to the data pair in which the DR portion of the DC/DR word for said contour element including said NS portion changes from one vector data pair to another, Generating and storing a fourth expiration value $Z_{exp}$ representative of the number of vector data pairs from the data pair including the NS portion to the data pair including the end of the contour element including the NS portion, Decrementing the stored NS value, Comparing the NS value with zero and when the NS value exceeds zero, completing the processing for that NS portion by generating and storing an SV word representative of the Y value of the next unprocessed NS portion detected along said current scan line, or when the NS value equals zero, completing the processing for the NS portion by generating an NL word, that NL word being representative of the number of scan lines between the current scan line and the next scan line including an NS portion, that NL word being representative of a reference (R) word when there are no other scan lines including an NS portion.

Each processing of a C portion for a current scan line includes the sub-steps of:

updating $X_{exp}$ to equal zero when the ΔX value for the vector data pairs associated with the contour element including the C portion changes from one vector data pair to another in the current scan line, or otherwise to be representative of the number of the scan lines following the current scan line before said ΔX value for the vector data pairs associated with the contour element including the C portion changes from one vector data pair to another, comparing the updated $X_{exp}$ with zero, and when $X_{exp}$ exceeds zero, terminating the processing of said C portion for the current scan line, and when $X_{exp}$ equals zero, updating $Z_{exp}$ to be representative of the number of vector data pairs following the data pair including the C portion to the data pair including the end of the contour element including the C portion, comparing the updated $Z_{exp}$ with zero, and when the updated $Z_{exp}$ equals zero, completing said processing of the C portion by generating and storing a termination (T) word for the contour element and decrementing said CE value, when the $Z_{exp}$ exceeds zero, continuing by updating $M_{exp}$ to be representative of the number of vector data pairs remaining before the LR portion of the LC/LR word for the vector data pairs associated with the contour element including C portion changes from one vector data pair to another, and comparing the updated $M_{exp}$ with zero, and when $M_{exp}$ equals zero, generating an LC/LR word representative of a predetermined number of most significant bits (LR) of the ΔX value associated with the next vector data pair for the C portion, and representative of the number of vector data pairs (LC) for which that ΔX value has those most significant bits, and updating $M_{exp}$ to equal the LC value, updating $N_{exp}$ to be representative of the number of vector data pairs remaining before the DR portion of the DC/DR word for the vector data pairs associated with the contour element including C portion changes from one vector data pair to another, and comparing said updated $N_{exp}$ with zero, and when $N_{exp}$ equals zero, generating a DC/DR word representative of a predetermined number of most significant bits (DR) of the ΔY value associated with the next vector data pair for the C portion, and representative of the number of vector data pairs (DC) for which that ΔY value has those most significant bits, and updating $N_{exp}$ to equal the DC value, and terminating the processing of said C portion for the current scan line by generating a D/L word representative of a predetermined number of least significant bits (L and D) of the associated ΔX and ΔY values, respectively, associated with the next vector data pair for the C portion, and updating $X_{exp}$ to be representative of the number of scan lines following the current scan line before the ΔX value for the vector data pairs associated with the contour element including the C portion change from one vector data pair to another.

4. comparing the CE value with zero, when the CE value exceeds zero, updating the current scan line to be the next closest scan line following the previous current scan line, the next closest scan line being selected from the set of scan lines including:

the scan lines identical to or following the previous current scan line and defined by the $X_{exp}$ values for processed NS and C portions, and returning to step 1 for the new current scan line, when the CE value equals zero, terminating the generation and storage of the subsequence of code words.

3. CONTOUR POINT ENCODING EXAMPLE

FIG. 3-2 shows an arbitrary symbol for the present encoding example. The symbol has three sections A, B, and C illustrated against an X-Y coordinate grid. In this example, there are ten scan lines per division on the X and Y axes.

The encoding section 12 of the present embodiment generates a succession of eleven bit code words, each having one of the seven data formats illustrated in FIG. 4A-4G. In FIGS. 4A-4G, the weighting for the various bit positions is indicated parenthetically for the first and last bit positions of the various portions of those code words.

Figure 4A:
FIGS. 4A–4G shows the code word format for the system of FIG. 1.

The "left bearing" (LB) or "distance to next new start" (NL) codeward of FIG. 4A, is an eleven bit number ranging from one to 2047. This code word is representative of the identity of the scan line in which the symbol first is detected or the identity of the scan line in which the next new start contour element is detected.

Figure 4B:
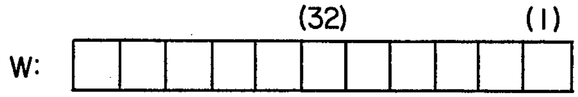

The "width" (W) code word of FIG. 4B is a seven bit number ranging from 1 to 127. This codeword is representative of the width of the symbol relative to an em of 54 units width.

Figure 4C:
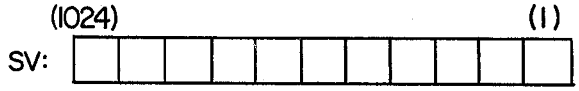

The "start value" (SV) codeword of FIG. 4C is an eleven bit number ranging from zero to 2047. A "start value" is coded as a distance from a horizontal "baseline" of the uppermost portion of the symbol-to-be-encoded, as measured in a scanline and in the direction (Y) of that scan line. This distance may be either a positive or negative number for a symbol. In the present embodiment, the baseline is positioned so that start values above the baseline are always less than 1536, and start values below the baseline are always less than 512. As a result, the SV code stores values above the baseline as an eleven-bit magnitude, and values below baseline as (magnitude + 1536). The decoder section 14 monitors the two most significant bits (MSB's) to determine which case occurred and convert to sign and eleven-bit magnitude. In alternative embodiments, the start value could store values above the bottom of the em-square, i.e. so that the start values are always positive.

Figure 4D:
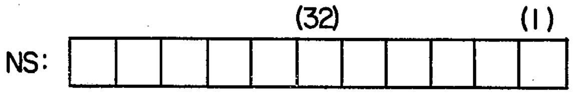

The "number of starts" (NS) code word of FIG. 4D is a six bit number ranging from one to 64. This code word is representative of the number of contour elements identified during a scan line.

Figure 4E:
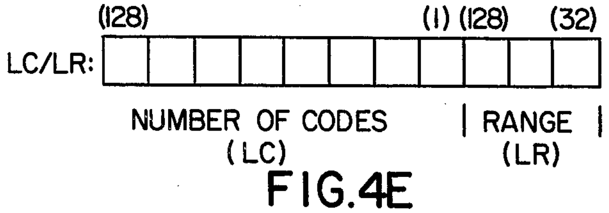

The "lines code/lines range" (LC/LR) code word of FIG. 4E is a pair of numbers LC and LR. The righthand number (LR) is a three bit number representative of the three most significant bits of the ΔX value associated with a vector data pair (i.e. piece-wise linear portion) of a contour element in a scan line. The lefthand number (LC) is an eight bit number representative of the number of consecutive vector data pairs for a contour element in which the ΔX value has those three most significant bits, i.e. the number of successive vector pairs for the same contour element having ΔX in the range determined by LR.

Figure 4F:
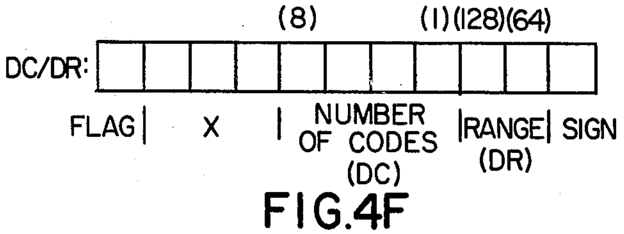

Similarly, the "delta code/delta range" (DC/DR) code word of FIG. 4F includes two numbers DC and DR. Generally, DR is a two bit number representative of the bits weighted 128 and 64 of the ΔY value associated with the vector data pair of a contour element in a scan line, and DC is a four bit number representative of the number of consecutive vector data pairs for which the ΔY value is within the range determined by LC. However, a "delta range" code can require six bits to specify the sign and the range of delta, leaving only 5 bits to specify the number of codes over which the range is valid. In order to minimize the number of codes, for example, when many codes all require a small range as in a complex curve, the three bit portion X in FIG. 4F may be assigned to either the LC or LR variable, with the code MSB providing a flag denoting whether the variable bits X are associated with the number of codes, DC, or the delta range, DR. As a result, the DC/DR code word can accommodate both a large range for a small number of codes, or a small range for a large number of codes.

Figure 4G:
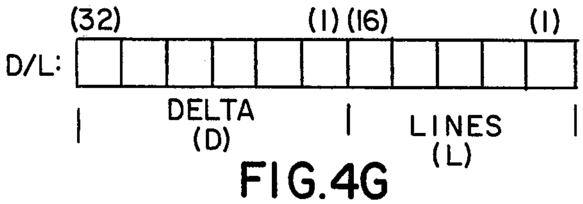

The "delta/lines" (D/L) codeword of FIG. 4G includes two numbers D and L. D is a six bit number in the range zero to 63 representative of the six LSB's of the ΔY value associated with the vector data pair of a contour element in a scan line. Similarly, L is a five bit number in the range zero to 31 representative of the five LSB's of the ΔX value associated with a vector data pair of a contour element.

As the scanner 20 scans the image of FIG. 3-2, and the digitizer 22 generates a binary signal representative of the optical reflectivity along the scan lines, the encoder 24 first identifies contour edge points and then assigns those edge points to monotonic contour elements and determines start coordinates and vector data pairs (piece-wise linear lines) for the contour elements. This information is tabulated in Table I for the symbol of FIG. 3-2. For purposes of illustration, the contour elements for the FIG. 3-2 symbol are numbered 1 through 8 in Table I. These contour elements are identified by encircled reference numerals in FIG. 3-2.

TABLE 1

| Contour Element Number | Start Value | Start Scan Line | Vector Data (ΔX,ΔY) Pairs |
|---|---|---|---|
| 1 | −21 | 0 | (50, −50) |
| | | | (50, 50) |
| 2 | −20 | 0 | (15, 30) |
| | | | (70, 0) |
| | | | (15, −30) |
| 3 | −100 | 50 | (40, 0) |
| 4 | −90 | 50 | (40, 0) |
| 5 | 20 | 50 | (40, 0) |
| 6 | 40 | 50 | (30, 0) |
| | | | (0, −10) |
| | | | (10, 0) |
| 7 | −30 | 65 | (10, 0) |
| 8 | −20 | 65 | (10, 0) |

Encoder 24 then modifies the above contour definitions so that new starts occur at an appropriate break in existing contours. At line 50 contours 3 and 4 require a break in contour 1, which is already present. Contours 5 and 6 require a break in contour 2, which must be forced. At line 65, contours 7 and 8 require a break in contour 2, which must also be forced. Contour 2 thus is modified to be defined as contour 2A shown in Table 2.

TABLE 2

| Contour Element Number | Start Value | Start Scan Line | Vector Data (ΔX,ΔY) Pairs |
|---|---|---|---|
| 2A | −20 | 0 | (15, 30) |
| | | | (35, 0) |
| | | | (15, 0) |
| | | | (20, 0) |
| | | | (15, −30) |

Encoder 24 then processes the contour data to generate the succession of codewords shown in Table 3. In that Table, the current scan line, contour element numbers and code word types are shown for convenience in reading the Table. There are no corresponding tags in the output code words generated by encoder 24. The LB and W code word values are denoted by X's, since those values are not related to the contour coding.

By way of example, as the encoder 24 approaches scan line 50, New Starts are required. Accordingly, code word sequence contains an SV word for contour 3 and a code of 4 new starts. Contour 3 is ahead of all other data on the line, so the code provides a LC/LR word, a DC/DR word and a D/L word for contour 3, immediately followed by an SV word for contour 4. Contour 4 is still ahead of all other data, requiring LC/LR, DC/DR and D/L words followed by a SV word for contour 5. Contour 5 is after both contours 1 and 2 in scan line 50. Contour 1 requires update, but only a DC/DR word is required to be updated, since the previous lines range value is still valid. Accordingly, DC/DR and D/L words for contour 1 are provided. Contour 2 requires update, but only the lines-range is required to be updated since the previous delta-range value is still valid. The code therefore contains LC/LR and D/L words for contour 2. The startup data for contours 5 and 6 are now included. Following the D/L word for contour 6, no new starts remain. A NL word is therefore provided giving the distance (15 lines) to the next scan line having new starts. All of the above data for scan line 50 is shown in the code words between the asterisks in Table 3.

TABLE 3

| CURRENT SCAN LINE | CONTOUR NUMBER | CONTOUR TYPE | CODEWORD VALUE |
|---|---|---|---|
| 0 | — | LB | X X X X X X X X X X X |
| 0 | — | W | X X X X X X X X X X X |
| 0 | 1 | SV | 0 0 0 0 0 0 1 0 1 0 1 |
| 0 | — | NS | 0 0 0 0 0 0 0 0 0 1 0 |
| 0 | 1 | LC/LR | 0 0 0 0 0 0 1 0 0 0 1 |
| 0 | 1 | DC/DR | 0 0 0 0 0 0 0 1 0 0 1 |
| 0 | 1 | D/L | 1 0 0 1 0 1 0 0 1 0 0 |
| 0 | 2 | SV | 0 0 0 0 0 0 1 0 1 0 0 |
| 0 | 2 | LC/LR | 0 0 0 0 0 0 0 1 0 0 0 |
| 0 | 2 | DC/DR | 0 0 0 0 0 1 0 0 0 0 0 |
| 0 | 2 | D/L | 0 1 1 1 1 0 0 1 1 1 1 |
| 0 | — | NL | 0 0 0 0 0 1 1 0 0 1 0 |
| 15 | 2 | LC/LR | 0 0 0 0 0 0 0 1 0 0 1 |
| 15 | 2 | D/L | 0 0 0 0 0 0 0 0 0 1 1 |
| 50 | *3 | SV | 0 0 0 0 1 1 0 0 1 0 0 |
| 50 | — | NS | 0 0 0 0 0 0 0 0 1 0 0 |
| 50 | 3 | LC/LR | 0 0 0 0 0 0 0 1 0 0 1 |
| 50 | 3 | DC/DR | 0 0 0 0 0 0 0 1 0 0 0 |
| 50 | 3 | D/L | 0 0 0 0 0 0 0 1 0 0 0 |
| 50 | 4 | SV | 0 0 0 0 1 0 1 1 0 1 0 |
| 50 | 4 | LC/LR | 0 0 0 0 0 0 0 1 0 0 1 |
| 50 | 4 | DC/DR | 0 0 0 0 0 0 0 1 0 0 0 |

TABLE 3-continued

| CURRENT SCAN LINE | CONTOUR NUMBER | CONTOUR TYPE | CODEWORD VALUE |
|---|---|---|---|
| 50 | 4 | D/L | 00000001000 |
| 50 | 5 | SV | 11000010100 |
| 50 | 1 | DC/DR | 00000001000 |
| 50 | 1 | D/L | 11001010010 |
| 50 | 2 | LC/LR | 00000011000 |
| 50 | 2 | D/L | 00000001111 |
| 50 | 5 | LC/LR | 00000001001 |
| 50 | 5 | DC/DR | 00000001000 |
| 50 | 5 | D/L | 00000001000 |
| 50 | 6 | SV | 11000011110 |
| 50 | 6 | LC/LR | 00000011000 |
| 50 | 6 | DC/DR | 00000011001 |
| 50 | 6 | D/L | 00000011110 |
| 50 | *— | NL | 00000001111 |
| 65 | 7 | SV | 00000011110 |
| 65 | — | NS | 00000000010 |
| 65 | 7 | LC/LR | 00000001000 |
| 65 | 7 | DC/DR | 00000001000 |
| 65 | 7 | D/L | 00000001010 |
| 65 | 8 | SV | 00000010100 |
| 65 | 8 | LC/LR | 00000001000 |
| 65 | 8 | DC/DR | 00000001000 |
| 65 | 8 | D/L | 00000001010 |
| 65 | — | NL | 11000000000 |
| 65 | 2 | D/L | 00000010100 |
| 75 | 7 | LC/LR | 00000000000 |
| 75 | 8 | LC/LR | 00000000000 |
| 80 | 6 | D/L | 00101000000 |
| 80 | 6 | D/L | 00000001010 |
| 85 | 2 | DC/DR | 00000001001 |
| 85 | 2 | D/L | 01111001111 |
| 90 | 3 | LC/LR | 00000000000 |
| 90 | 4 | LC/LR | 00000000000 |
| 100 | 1 | LC/LR | 00000000000 |
| 100 | 2 | LC/LR | 00000000000 |

4. DECODING SECTION AND PROCESS

Figure 5:
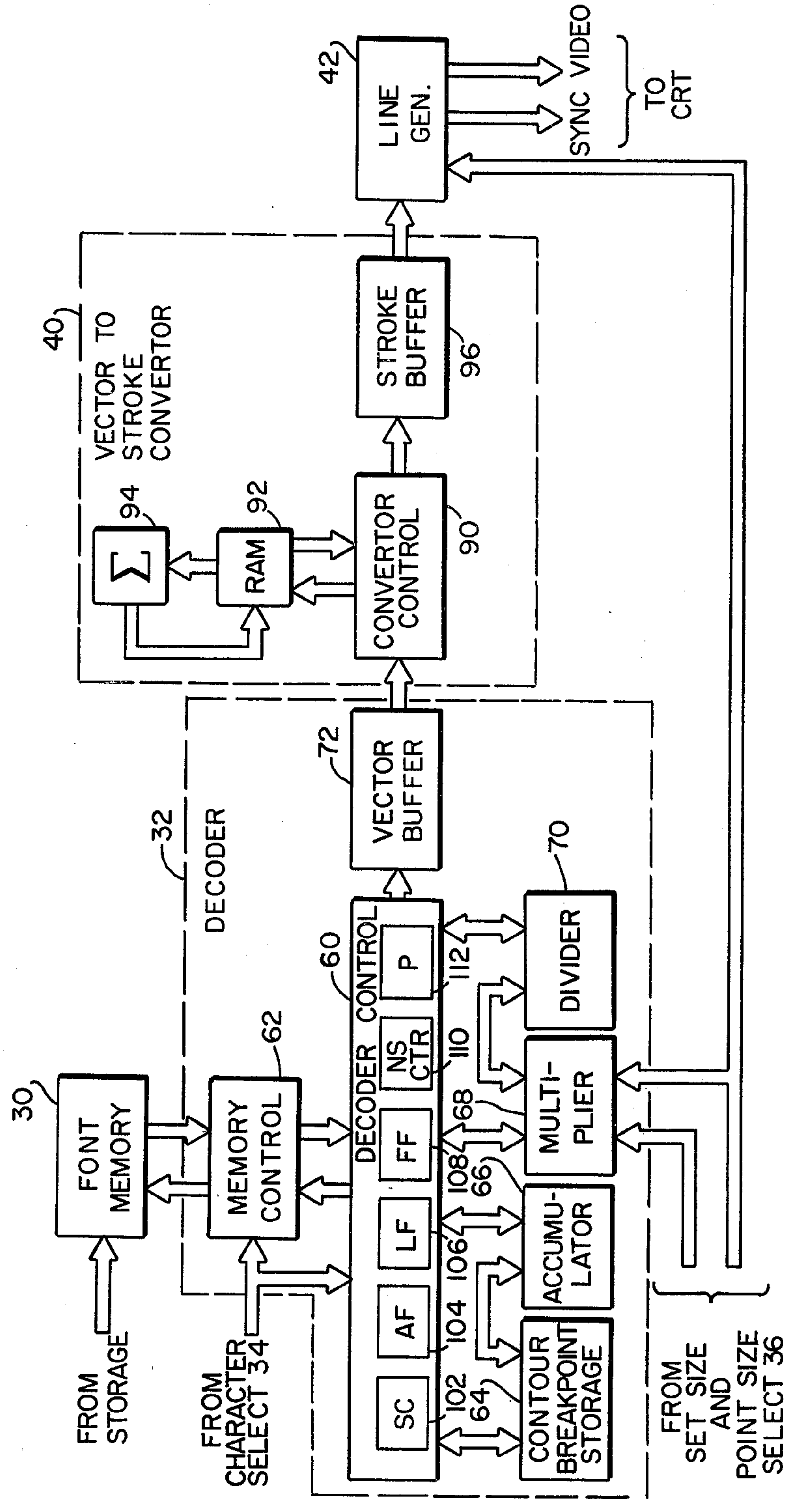
FIG. 5 shows in detailed block diagram form, the decoding section of the system of FIG. 1.

FIG. 5 is a detailed block diagram of the decoder section 14 which converts the succession of eleven bit code words produced by encoding section 12 to stroke-by stroke video control signals for driving an output CRT. The decoding section 14 is functionally separated into a first section 32 which converts the code words into scaled and ordered vector data, a vector-to-stroke convertor section 40 which converts the scaled and ordered vector data to stroke data, and a digital-to-video, or line generator, section 42 which converts the stroke data to video signals for driving the CRT.

The decoder 32 includes a decoder control 60, memory control 62, contour breakpoint storage element 64, and adder 66, multiplier 68 and divider 70. Decoder 32 further includes an elastic store vector buffer 72 which receives ordered vector data at its input and provides that data as requested by the convertor 40.

The vector-to-stroke convertor 40 includes a control 90, RAM 92, summation network 94, and stroke buffer 96. Generally, the convertor 40 provides an iterative accumulation for each contour, using the start value and change-per-stroke provided as vector data.

The line generator 42 stores a sequence of points generated (in numerical order) by the vector-to-stroke convertor 40, and generates a CRT on/off beam switching signal. The stored points are converted to video by starting with the beam off and continually changing beam polarity whenever a counter-timer matches the next stored point in the line.

VECTOR DECODING

The memory control 62 contains a memory address counter and a RAM pointer memory which is addressed by the character select 34 (for example using conventional character codes). The output of control 62 is the starting address in font memory 30 of the first byte of the selected character. This data is loaded into the memory address counter, which then is incremented from one byte to the next. Memory control 62 is responsive to requests from the decoder control 60 to advance 1 or advance 2 words. A one-shot timer informs the decoder control 62 that data is invalid during memory access.

Generally, the decoder 32 interprets the succession of code words to initially generate a set of vectors for the stroke which corresponds to the first scan line in which portions of the symbol-being-encoded were identified. The subsequent code words are used to provide a base for updating the set of existing vectors as the values for the vectors expire, i.e. at horizontal positions at which the previously generated vectors are replaced by new vectors. This updating procedure requires the decoder 32 to identify the shortest vector in the set of vectors and then process the vectors in order of increasing length at times corresponding to scan lines in which the vectors expire. The processing includes the scaling for point size and set size effects, resulting in vector data accurate for the interpolation and line generation processes performed by sections 40 and 42, respectively.

One effect of the set-size scaling is the introduction of an ordering problem. In the present embodiment, the master data is coded at 64-point, with contours updated in the order at which breakpoints occur in 64-point reproduction. At smaller sizes, however, this order is not necessarily the same order in which the interpolator section 40 will require new vectors. For example, contour A may be updated at line X in the 64-point data and lie below contour B which is in turn updated at line X+Y. Coding will update these in the order A, B. At some set sizes, however, both X and X+Y will scale to the same integer value for vector extension and will therefore end on the same output stroke. The convertor section 40 in that case will require data in the order B, A. The decoder section 32 reconciles the difference in the following manner.

Initially, decoder 32 stores the distance to a vector's endpoint as a scaled number, which in general is an integer number of lines plus a fractional extension. For example, a 27 line vector at 64-point would be stored at 4-7/32 lines at 10-point, while a 26 line vector at 64-point would be 4-1/16 lines at 10-point. Working first with the integer portion, the decoder 32 predicts that both vectors will require updating after four output strokes. Working next with the fractions, the decoder will predict the order in which contour codes were generated in order to update each contour. Finally, the vectors will be shuffled into numerical order for the convertor 40.

The desired data into the convertor 40 is the start value of the vector, the change per line, and the number of lines which can be generated with this data. Horizontal scaling causes a minor difficulty in scaling the start value—it is not just the value at 64-point scaled to the desired point size, since in general this is correct somewhere between output strokes. When the contour is updated, the fractional stroke value is represented by K. Then a correction term of (1−K)×(scaled change per line) must be added to the scaled start value in order to predict the vector value crossing an output stroke. As a result, the scaled start value (SSV) is:

$$SSV=(SV)(PT\,SZ/64)+(1-K)(\Delta Y/\Delta X)(PT\,SZ/SET\,SZ)$$

Where PT SZ is the desired point size and SET SZ is the desired set size. For convenience, this fractional-stroke interpolation is performed by decoder 32 prior to sending data to the convertor 40.

The decoder control 60 includes a state controller (SC) section 102 and address finder (AF) section 104, lines field comparator-register (LF) section 106, Fraction field comparator-register section 108, new start counter (NS CTR) 110 and breakpoint storage point (P) section 112.

The state controller section 102 includes a programmable state register, ROM, multiplexer and a programmable logic array. The ROM provides all of the control bits required in decoder 32 for its various states. In each state, the data from the ROM is strobed into the state register and used to control decoder 32. Branching is provided by the appropriate logic states established by the PLA in response to applied branch variables and certain present-state bits.

The decoder control 60 also includes an address finder section 104 for locating vacant positions in the breakpoint storage 64 (referred to below as the C-array). This section 104 consists of a RAM, an address counter, and a ROM. The ROM controls operation of the circuit. If the address counter is selecting a RAM location corresponding to a used location, the ROM enables the counter. The address will thus cycle independent of the rest of the system until an unused address is located. When the operation of decoder 32 requires an address in storage 64, the control 60 generates a flag to the ROM. If an address is available, the counter provides it and the appropriate RAM location is written BUSY. If an address is not available when requested, the ROM will force the control 60 to wait until one is available. The ROM is also flagged when a contour is being deleted in the cleanup cycle, as described more fully below. In this case the address of the completed contour is multiplexed into the RAM address to write the appropriate location as NOT BUSY.

A lines field (LF) comparator-register section 106 monitors the "lines" field of the accumulator 66 output along with the zero-test flag. When enabled by a state bit, the LF comparator-register 106 stores the smaller of the register contents or the "lines" field if the data is not zero, thus computing variable MI, described below. A similar fraction field (FF) comparator register ection 108 monitors the "fraction" field to compute KI, described below. Blocks 106 and 108 also include addition registers which store variables M and K, described below.

A separate new start (NS) counter 110 is provided to monitor the number of new starts to be processed. The "NS" value is loaded into this counter, which then counts each time an address in the C-array is assigned to a new start. When the counter reaches its terminal count a flag is gated to the PLA to indicate no more new starts.

Decoder control 60 further includes a breakpoint storage point (P) section 112 for the breakpoint storage 64. In addition to storage of the address sequence, the signs of the vector start value (V) and change per line value (delta), and the two MSB's of V, the section 112 includes counters for the read address, write address, and "NC" functions.

Table 4 shows the control bit assignments for the decoder control 60.

TABLE 4

| BIT(S) | FUNCTION(S) |
|---|---|
| 1 | store N1, K = 0, KI = 1.0, M = MI, MI = 2048 |
| 2 | vector buffer address LSB |
| 3 | clear flag F3 |
| 4 | clear flag F2 |
| 5 | conditional increment W-counter |
| 6 | increment R-counter |
| 7 | conditional set flags F2 and F3 |
| 8 | store left bearing, prime vector buffer |
| 9 | vector buffer write enable |
| 10, 11 | multiplier and vector buffer source control |
| 12–14 | event code |
| 15, 16 | accumulator and pointer source control |
| 17–20 | C-array write enables |
| 21 | division enable, data for flag F4 |
| 22 | force pointer address to W-counter |
| 23 | pointer write enable |
| 24 | vector buffer pointer write enable |
| 25, 26 | accumulator and vector buffer pointer source control |
| 27 | select (lines-M) or (value + delta)-auxiliary accumulator control |
| 28 | set buffer pointer assigned |
| 29 | force F = K in next state |
| 30 | clear accumulator, store width |
| 31 | enable pause from vector buffer |
| 32 | enable pause from memory access |
| 33 | conditional store MI and KI |
| 34 | advance memory access |
| 35–37 | return code controls |
| 38 | record SV |
| 39 | C-array address LSB |
| 40 | KI = 1.0, K = KI, M = 0 |
| 41 | unassigned |
| 42 | unassigned |
| 43–48 | next-state selection |
| 49 | initialize NC, R, W |
| 50, 51 | clock deletion controls |
| 52 | enable many-way branch |
| 53 | unassigned |
| 54 | load new delta codes |
| 55 | load new lines codes, test lines codes, startup of new contour |
| 56 | unassigned |

A single-state instruction could thus be:

set return = 011; acc = lines-M;
write P(R) into P(W); access C(P(R)), LSB = 0;
wait 1 additional clock cycle;
if (lines-M = 0) and (F > K), K1 = min (K1, F);
if (lines-M = 0) M1 = min (M1, lines-M);
next state = 26 if lines ≠ M or F ≠ K; or
= 38 if lines = M, F = K, F3 = 1, V > SV; or
= 30 otherwise.

Appendix 3 lists an exemplary program for the ROM of section 102.

The contour breakpoint storage element 64 stores a multi-bit word for each contour representing the 64-point vector end value, the scaled integer/fraction to the vector end value, the lines-range and remaining number of codes for which it is valid, the delta-range and remaining number of codes for which it is valid, and various flags associated with the decoding process. Whenever a new contour is started, a multi-bit word must be inserted into this array in proper numerical order. To avoid shuffling long strings of multi-bit words, a pointer RAM in control 60 is used which stores the sequence of addresses required to access the array in correct order. Contour insertion/deletion thus simplifies to adjusting the contents of the pointer.

The magnitude accumulator 66 is adapted to find the larger of the two magnitudes and assign its sign to the output. If the two signs differ, the smaller operand is inverted and added with a carry in; otherwise, the magnitudes are added. For example:

4+3=0100+0011=0111=7 (xfer sign, add)

$^{-}$4+3=0100+1100−1=0001=$^{-}$1 (xfer sign, invert 3, add)

4+$^{-}$3=0100+1100+1=0001=1 (xfer sign, invert 3, add)

$^{-}$4+$^{-}$3=0100=0011=0111=$^{-}$7 (xfer sign, add)

In the present embodiment, only terms which involve the vector start value (V) or changes per line value (delta) can be negative. Furthermore, comparison of magnitudes is only required in the case of V+Delta, which may move from one side of baseline to the other. Other cases are known beforehand:

Baseline>(V) (point size)/64

Accumulated value>(1−K) (correction factor)

L≧M

The accumulator 66 also incorporates two "convenience" features. One is a zero-test on the eleven MSB for testing the results of (L−M) and (K+(lines) (set size)/64); the second is multiplexing the stored fraction into the output when computing (L−M). The present embodiment initially forces all "lines" bits to zero and "fraction" bits to one.

Resolution of the rules for magnitude accumulation is accomplished with a ROM whose inputs monitor the signs of "value" and "delta" and the relative magnitudes of the two, along the part of the accumulator control field which specifies the operation being performed. The ROM outputs specify which operand to invert, if any; whether a carry input is required; and the sign of the output.

In the computation of the start value of a vector, the 64-point start value is scaled, added to the baseline, then the (1−K) (correction factor) terms are accumulated. Eventually, the resultant value is transferred to the vector-to-stroke convertor 40. To avoid having to make roundoff decisions in the convertor 40, the accumulator 66 adds a hard-wired value (baseline +0.5) to the scaled start value. Consequently, convertor 40 functions with all values high by ½ dot, so that truncation of the offset values provides a true rounding function.

The vector buffer 72 provides the decoder 32 information to the convertor 40. Buffer 72 stores a multi-bit word for each vector consisting of the start value, change per line, number of lines before a new vector is needed, a pointer indicating which contour is being updated, and various flags associated with the contour insertion/deletion process. Data is written into this array in the order defined for the 64-point master, then must be shuffled to agree with interpolator requirements at the output size. This shuffling is performed in another pointer RAM in control 60 which stores the sequence in which words should be accessed by the interpolator.

FIGS. 6-15 are a flow chart representation of the operation of decoder 32.

The following symbols are used in these figures:

SYMBOL DEFINITION

L—Integer portion of scaled distance to contour breakpoint.
F—Fraction portion of scaled distance to contour breakpoint.
M—Smallest L value among all contours.
MI—Smallest non-zero difference of L−M to date.
C—A RAM array of contour breakpoint data.
P—A pointer RAM indexing the contents of C in arbitrary order.
R—A counter addressing P, hence C, e.g. C(P(R)).
W—A counter addressing P, hence C, e.g. C(P(W)).
F1—A flag indicating that this contour was updated in this cycle.
F2—A flag indicating that new starts occurred in this cycle.
F3—A flag indicating that new starts are being processed into numerical order.
F4—A flag indicating this contour has been terminated in the computations.
SV—Register holding next start value.
NS—Counter holding number of starts yet to be processed.
B—Buffer array storing data for interpolation.
BP—A pointer RAM indexing the contents of B in arbitrary order.
N—Index of next vacant location in B and BP.
ACC—Accumulator output register.
SS—Set size.
PS—Point size.
LR—Lines range.
LC—Number of codes for which LR is valid.
DR—Delta range.
DC—Number of codes for which DR is valid.
MUL—Multiplier.
DIV—Divider.
NL—Codeword-distance to next new starts at 64-point.

Figure 6:
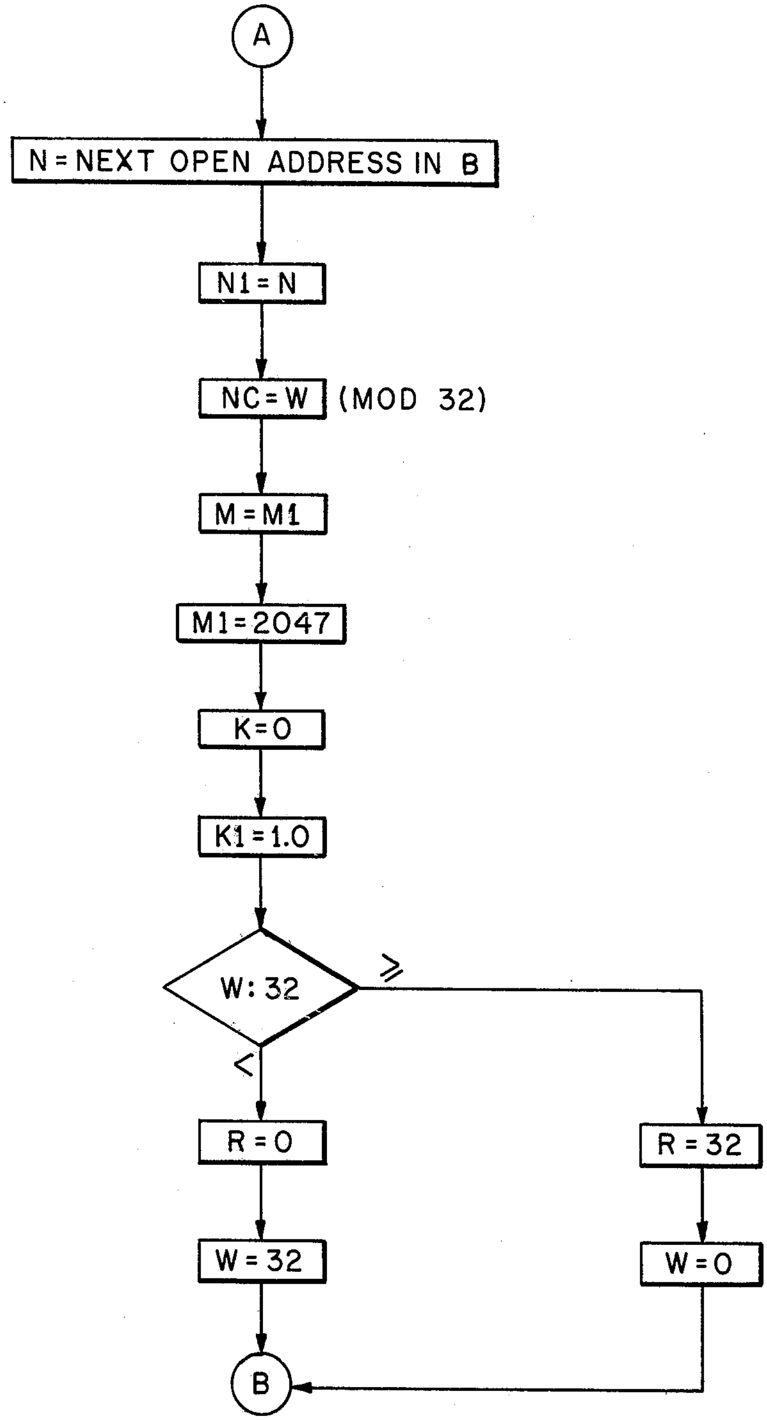
FIGS. 6–15 show flow charts representative of the operation of the decoding section of FIG. 5.

Operation of decoder 32 in accordance with the flow chart will now be described, initially assuming that the decoder 32 is in the midst of a computation loop, and has computed the variable MI representing the number of output strokes to the next vector update. The variable W has also been computed representing the number of contours in existence at this time, and output buffer B was last written at address (N−1). In FIG. 6, several variables are initialized. The flow is basically self-explanatory except for the treatment of R and W. In the present embodiment, a 64×9 RAM serves as the pointer into the C-array (block 64, FIG. 5). One half of the words point to the addresses to be accessed during the current computation cycle; the other half will be ordered during the cycle to point to the address sequence in the next cycle. This alternation of functions is represented by the initializing of R and W as a function of the W used previously. Thus, in the present embodiment, only 30 contours may be simultaneously active, which may be insufficient for exotic display faces or foreign character sets. The constraint of 30 results from assigning address 0/32 to the data predicting the next startup of contours, combined with always processing an even number of contours. In alternative embodiments, these constraints may readily be relaxed.

Figure 7:
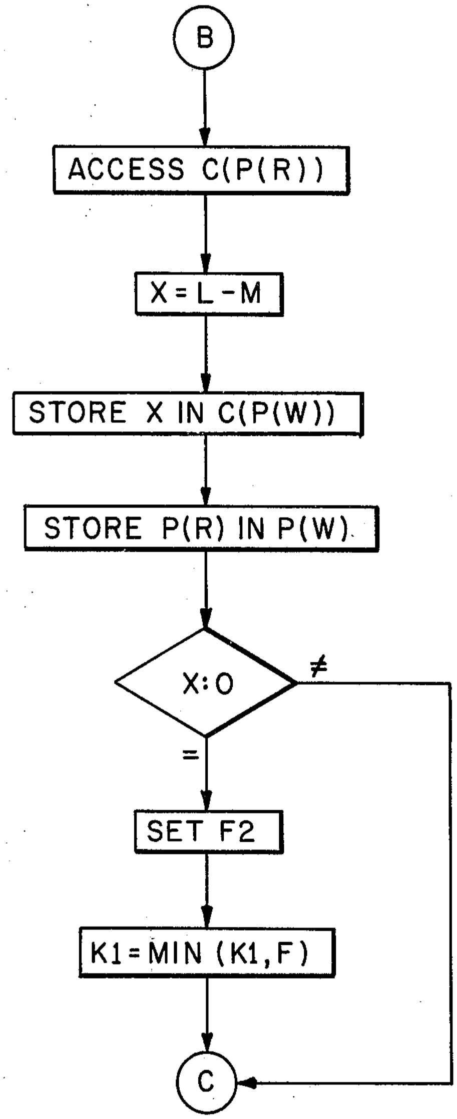

FIG. 7 tests for new starts being required during this cycle, indicated by the number of output strokes before update going to zero. If so, flag F2 is set, and variable KI is reduced from 1.0 to the additional fraction between output strokes and the startup of contours in the data base. The illustrated system forces all starts and updates to occur between output strokes by offsetting the first starts to occur at a fraction of 127/128. Given integer set sizes, scaling any integral number of strokes by (set size/64) and adding this offset results in a non-zero fraction. An alternative system which might accept half-point increments must alter this offset to 255/256 to maintain the same non-zero fraction. By maintaining the fraction to be non-zero, it is ensured that new contours will not be in existence until the output stroke following the update cycle.

Figure 8:
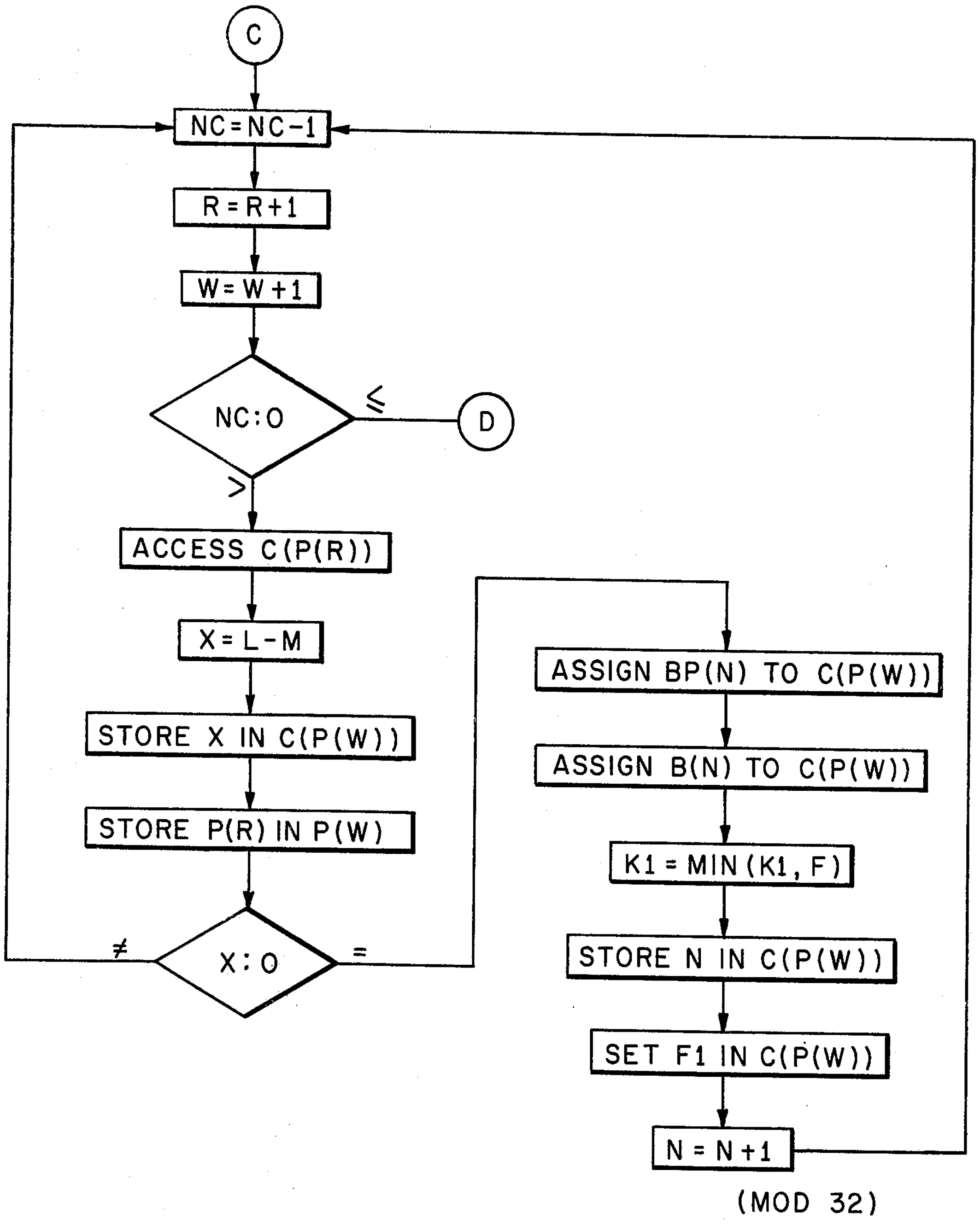

FIG. 8 tests the existing contours one at a time to see which ones require updates at this time. If one requires updating, its word in the C-array is flagged and a location in the output B-array (block 72, FIG. 5) is assigned to it. The address of this location is stored in the C-array for later processing. An interlock mechanism is implicit in FIG. 7. At large output sizes the vector updating proceeds, in machine time, more rapidly than the real-time stroke generation, causing the buffer to fill with vectors waiting to be used. Consequently, a test is performed to verify that "B(N)" is available for use—if not, the updating mechanism stops until the location becomes available. The computation of KI continues finding the smallest distance to an updating event. When all existing contours have been tested, the cycle proceeds to the next figure.

Figure 9:
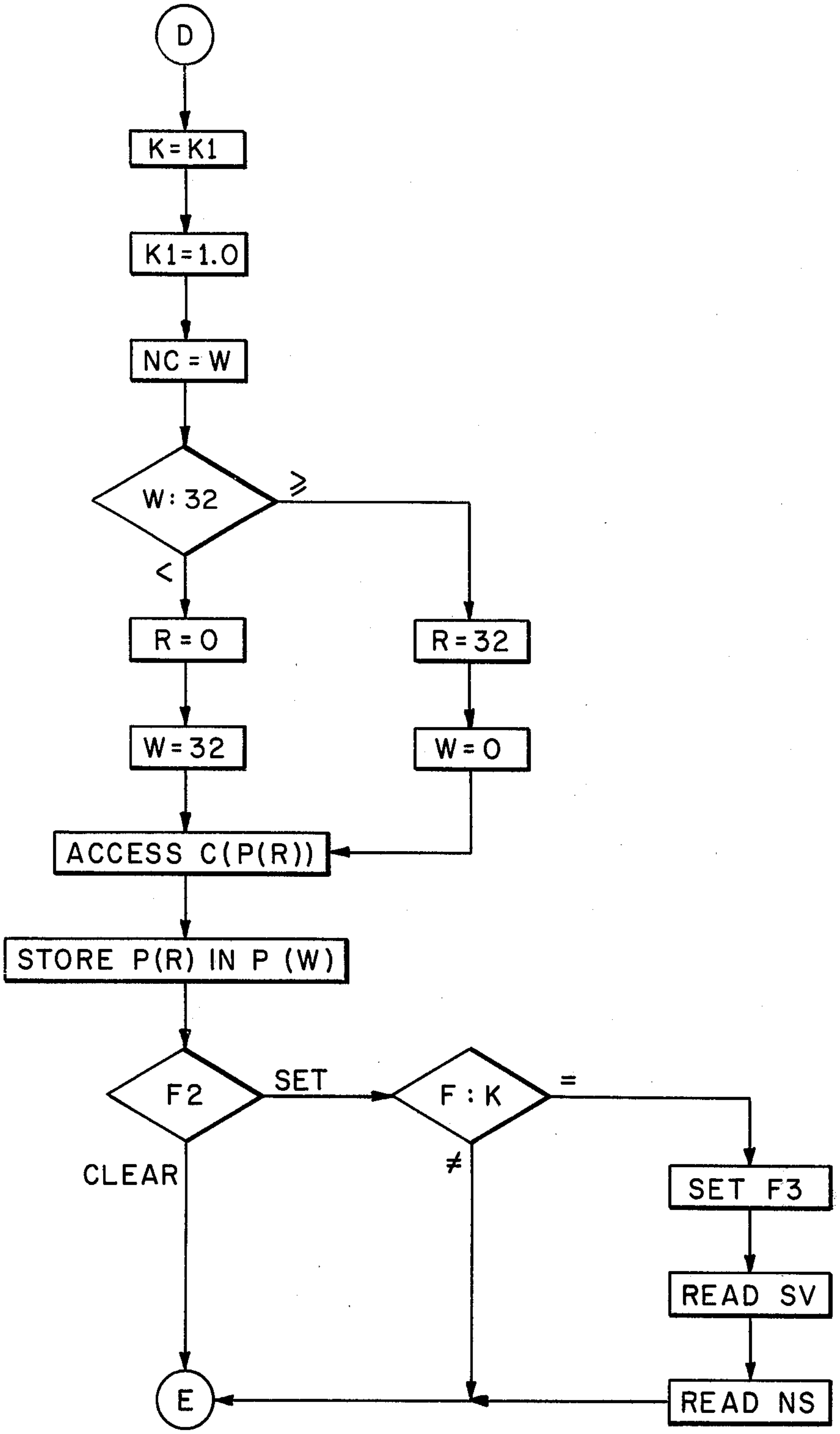

FIG. 9 shows storage of the smallest fraction as variable K, and the reinitializing of variables for the next pass thru the contours. As before, the first check is on the distance to the next starts. If this has completely expired, flag F3 is set and the first start value is read, along with the number of contours starting.

Summarizing to this point: The contours which will require updating for the next output vectors have been flagged, and each has been assigned an address in the vector buffer. Using the fractional line concept, the control logic has identified the order in which data was coded for the 64-point master. If new starts will occur as part of the output vectors, flag F2 has been set. Further, if new starts are required in conjunction with the first vector updates, flag F3 has been set and the start value/number of starts data have been learned. The decoder 32 now moves through the fractional values in order, extracting data from the 64-point master code and coputing vector updates until all contours have been extended past at least one output stroke.

Figure 10:
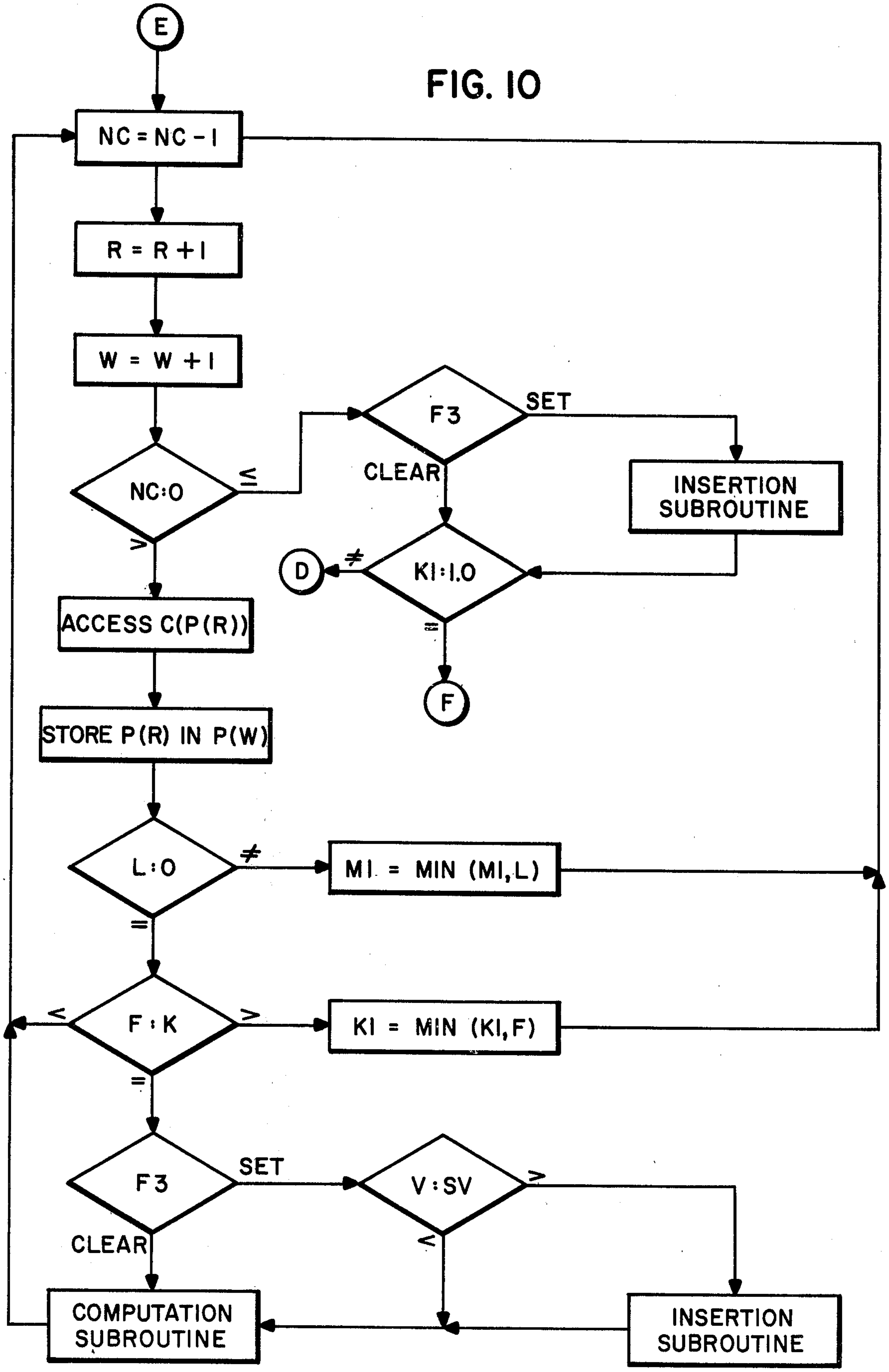

FIG. 10 describes the systematic update of contours. Words in the C-array are checked in order to see if L is zero. If it is not, variable MI is computed such that following a pass through all contours, MI will represent the smallest distance in output strokes to the next update(s). The present embodiment performs this computation in parallel with many others. In alternative embodiments, which are serial oriented, this step is performed as part of FIG. 7 in the X=0 branch. If L is zero, F is compared to K. If F is less than K the contour is ignored—this condition can only arise when a contour has been terminated in the current cycle, but not yet deleted from the pointer RAM. If F is greater than K, variable KI is updated to find the smallest remaining fraction. Finally, if F is equal to K it is time to update this contour. The first step is to check F3 to determine whether new starts are required at this fraction. If not, the contour can execute the computation subroutine (described below in conjunction with FIG. 13) and proceed to the next contour. If F3 is set, a comparison is made between the contour value V and the new start SV. If the contour is above the new starts, the computation subroutine is executed and the control moves on to the next contour. However, if the contour is below the new starts then control passes to the insertion subroutine (to be described shortly) which starts all new contours for which V is greater than SV, after which the computation subroutine is executed for this contour and control moves to the next. When all contours have been updated for this fraction, NC will no longer be greater than zero. The first check after this is for flag F3. If F3 is set, it indicates contours still remain to be started—a valid condition arising when contours start below all existing contours. In this case, the insertion sub routine starts all remaining new contours. Following this check, KI is compared to 1.0. Equality implies that L is unequal to zero for all existing contours, including new starts. In equality implies some L value is still zero, which causes a loop back to FIG. 8 to restart. Otherwise, a cleanup routine commences.

Figure 11:
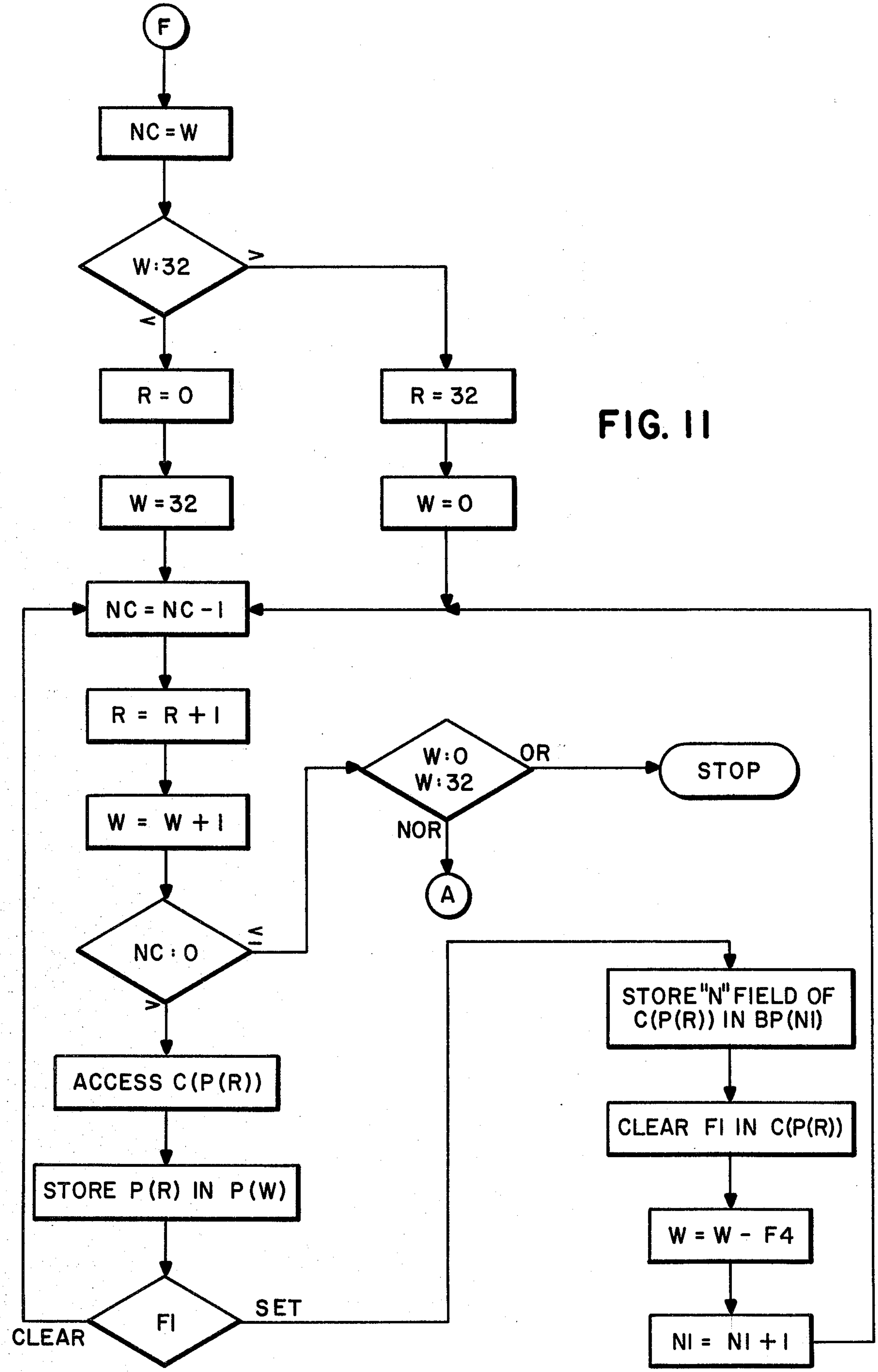

FIG. 11 represents the cleanup routine. Following initialization steps, the contours are checked one at a time to see if F1 is set, indicating that an update cycle was performed for this contour. If not, the next one is checked. If F1 is set, the first action is to reshuffle the vector buffer B. Each word in the C-array contains a field specifying the address N which was assigned to this contour. However, because of new starts the words may not be in proper order for interpolation. The contours in the C-array are in proper order, and shuffling reduces to storing the "N" fields in their order of appearance. Back in FIG. 6, variable NI was set to the first of the "N" values. This now serves as an index for storing the reordered pointers in the BP pointer array. Flag F1 is now cleared. Next, flag F4 is processed. This is a flag set during the computation subroutine if the contour is terminated, and cleared if the contour is extended. Subtraction of F4 from W amounts to a conditional decrement of W, which will cause the pointer for the next contour to be written over the pointer for this contour on the next pass through the loop, effectively removing this word in the C-array from all further processing.

The loop continues until all contours have been tested, then the value of W is checked. If it is still zero or 32, all incrementing of W in the loop was matched by corresponding decrements—in other words, all contours were terminated and the program halts. Otherwise the loop is back to start over at FIG. 6 with W counting the number of active contours and MI flagging the smallest existing value of L in the set, the assumed start conditions.

Figure 12:
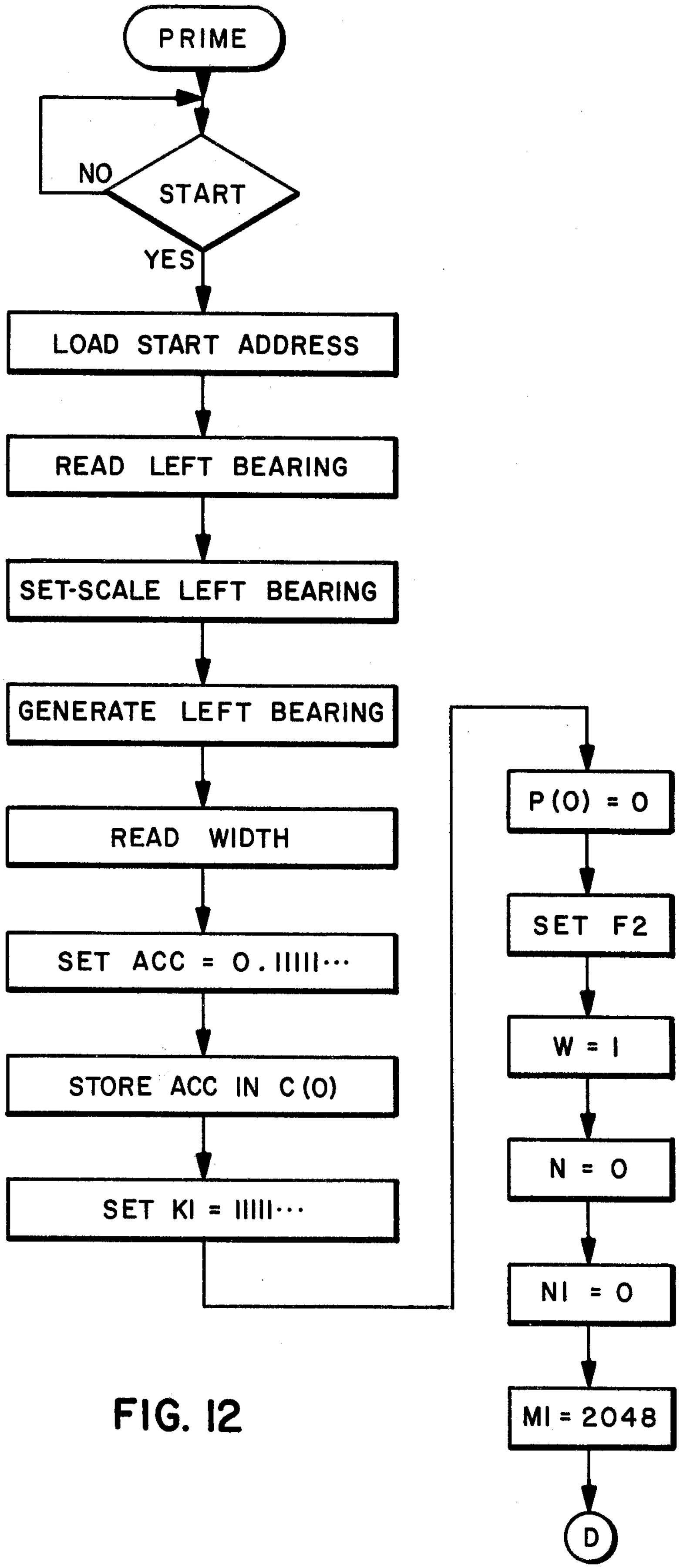

The remaining detail is to get into the program loop from the halted condition. FIG. 12 shows the start up routine. Initially, the system is in a state where the CRT stroke generator is producing blank strokes and the decoding program is waiting. This state is also forced at the start of each character by generating a short prime pulse and a startup pulse from the character select 34. The character code from the select 34 drives a lookup table which provides the address in memory of the first codeword byte for the selected character. This is loaded into a memory address counter, and used to read the first word—the left bearing of the character, measured as strokes at 64-point. This is multiplied by the set size/64 and truncated to a desired number of blank strokes at the selected size, which is then passed to the line generator to produce white lines. The width is then available for reading. The accumulator register is set to correspond to line=0, fraction=127/128. This is stored in the C-array as the distance prior to the first starts. Variable KI is set to 127/128 to indicate that the smallest fraction has this value, and the zero address of the pointer is set to point at zero. Flag F2 is set to indicate that new starts are required, and other variables are initialized as shown. The routine is then entered at FIG. 9 to complete initializing, move into FIG. 10 for contour insertion, and the program is running.

Figure 13:
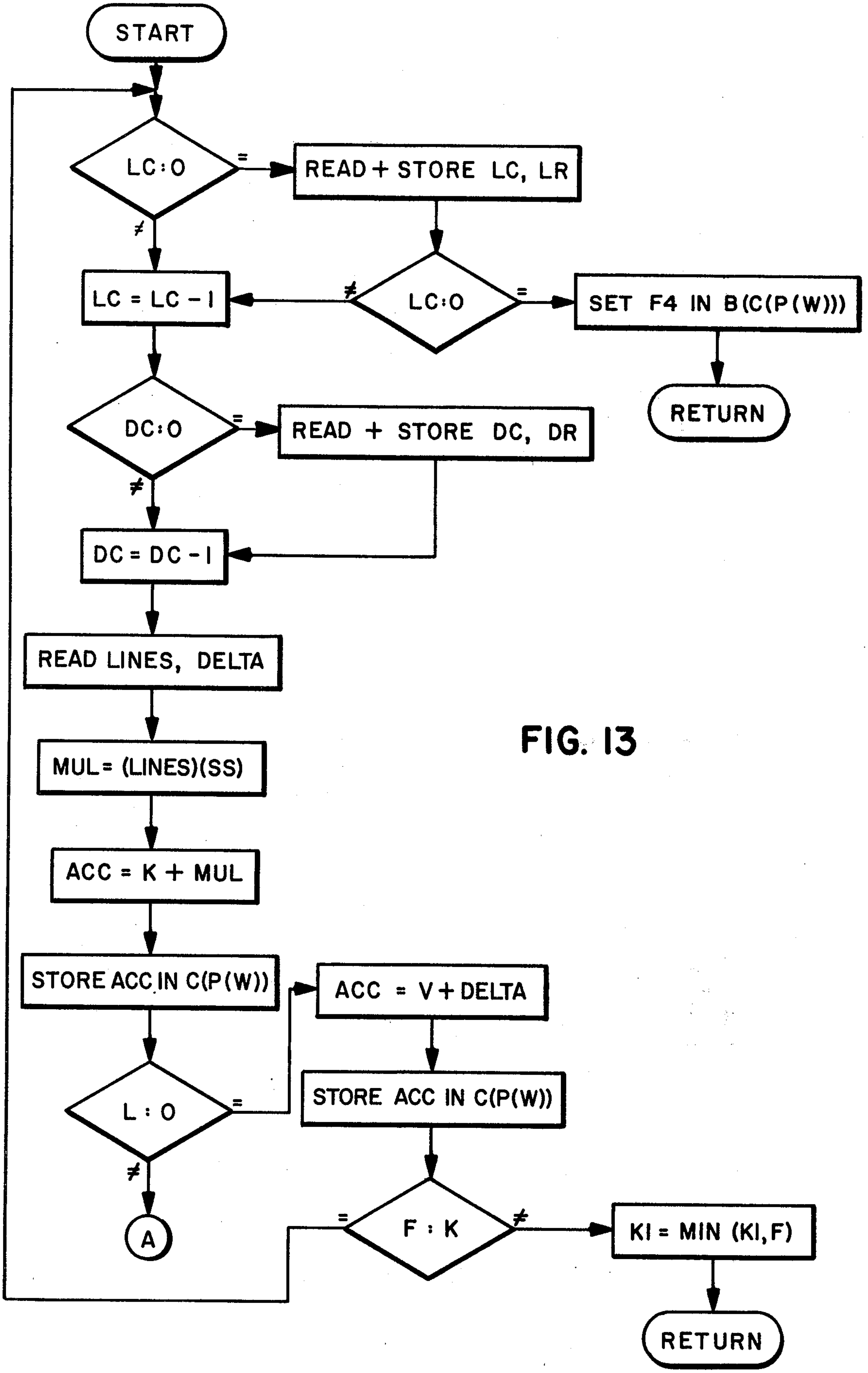
Figure 14:
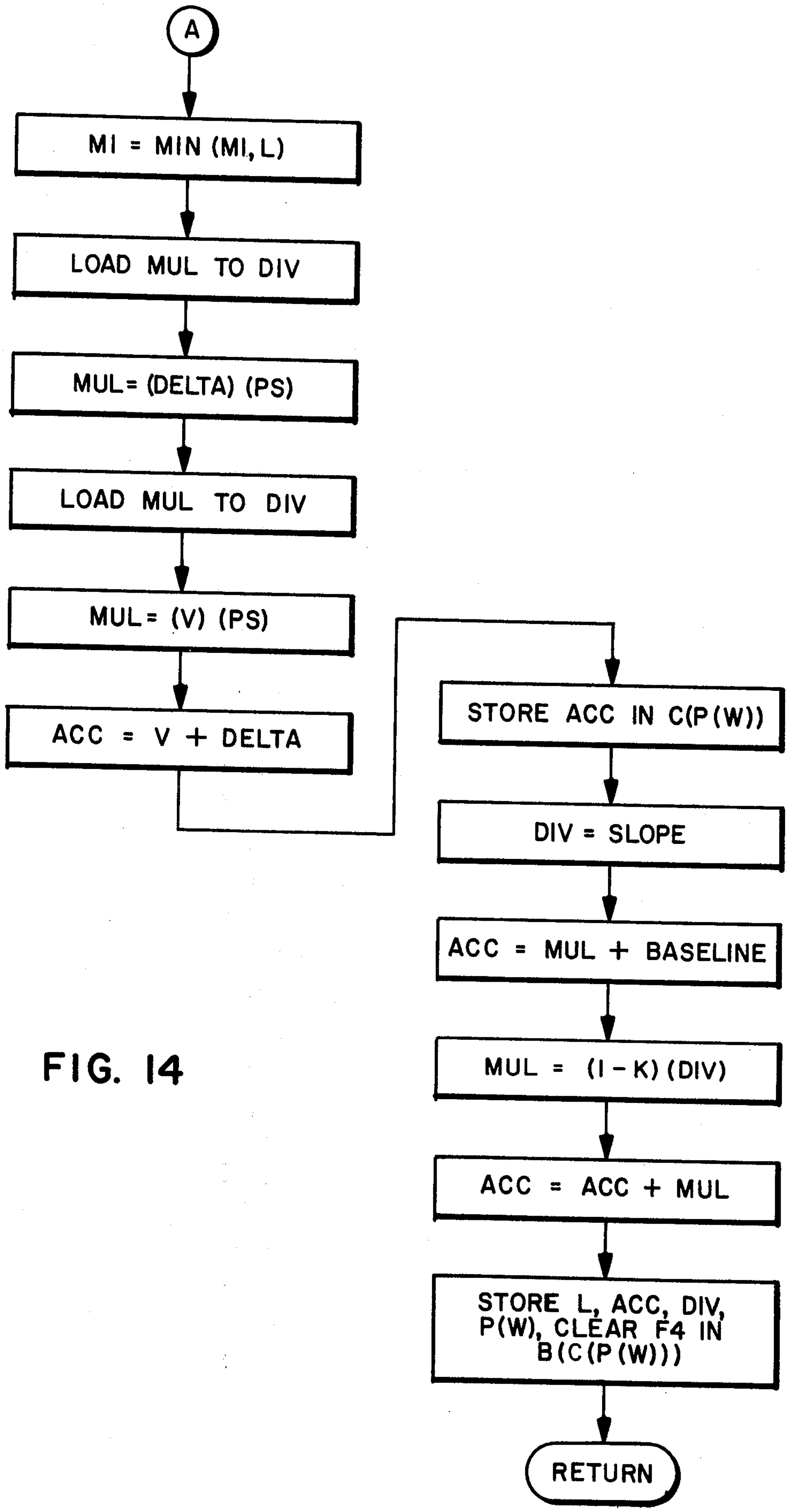

The flow chart indicates two subroutines—one for computation of a vector and the other for insertion of new starts. FIGS. 13 and 14 are a flow chart of the computation routine, using the symbols defined earlier. (In following the steps it should be noted that a multiplication by set size or point size also may have a simultaneous division by 64 to complete a scaling operation merely by reinterpreting the magnitude of each bit.)

The first step is to see whether a valid lines-range exists. If not, a new one is read and again checked for validity. An invalid code at this point implies the contour is terminated, requiring setting of a flag for the interpolator before exiting from the subroutine. After establishing a valid lines-range, the count of valid codes is decremented and a similar loop is performed to establish a valid delta-range. The residual lines and delta bits can now be read and combined with the range bits to produce the full lines and delta pair.

The next step is to scale the lines to the set size and add K, storing the result in the proper address of the C-array. The L value of this is checked to see whether the scaled vector length extends past at least one output stroke. If not, the accumulator adds V and delta to reach the 64-point value at the end of the vector, and stores this. A check is done at this point to see whether the vector has advanced horizontally at all. A truly vertical edge will have finite delta in zero lines. If a vertical edge is indicated, the flow loops back to immediately do another computation cycle, otherwise KI is updated and the subroutine ends.

Assuming the vector extends past at least one output stroke, the flow moves to FIG. 14 to update variable MI, transfer (lines)×(set size) to the divider, compute (delta)×(point size) and transfer it to the divider, and start the divider to generate the change per stroke at the indicated set and point sizes. Meanwhile, the multiplier computes (V)×(point size) to get the scaled end of the prior vector while the accumulator adds V and delta and stores the resultant value. The accumulator then adds the baseline value to the scaled end of the prior vector to provide an unsigned number for the interpolation process. (The values are coded as a distance from baseline so that scaling does not move the baseline.)

The multiplier now scales the change per stroke by the distance from the coded breakpoint at 64-point to the next actual output stroke, i.e. (1−K). This fractional-stroke correction is then added to the scaled end of the prior vector to reach the first valid point on this segment. The number of points in the segment (L), the first point (ACC), the slope (DIV), the contour address (P(W)), and a cleared flag F4 are now stored in the buffer address assigned to this contour, indicated symbolically as B(C(P(W))). The variable P(W) is used to allow the interpolator 40 to use a memory and pointer scheme similar to that in the decode 32. This completes the computation subroutine.

Figure 15:
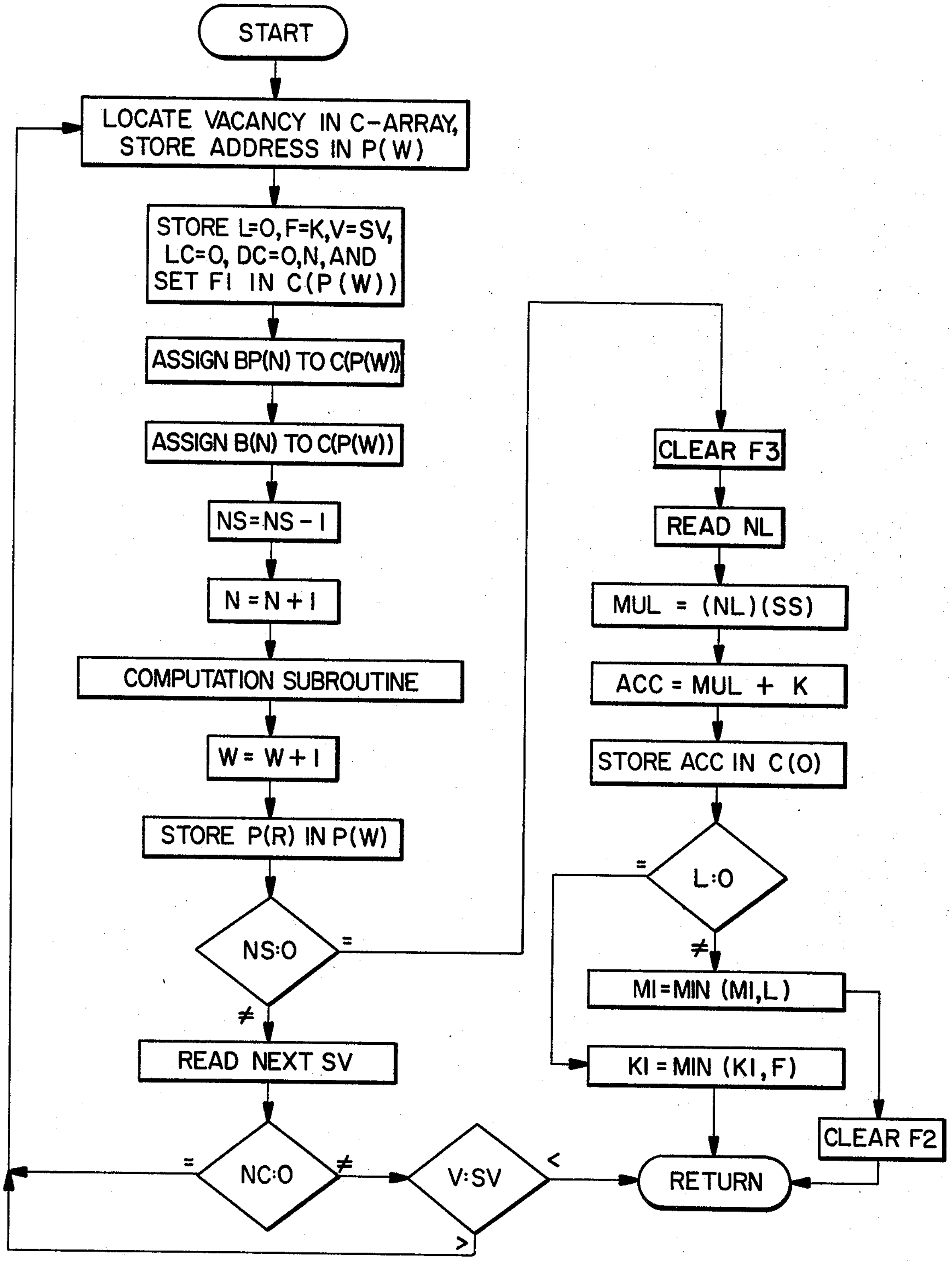

The insertion subroutine is shown in FIG. 15. The first step is to locate an unused adress in the C-array (the demonstration system employed a 32×1 auxiliary RAM for this purpose) and store that address in the pointer. The word is then initialized, and an address in the output vector buffer is assigned to the word. The number of starts remaining is decremented, and the computation subroutine is executed to generate data for this contour. The pointer write counter is then incremented, and the most recent existing contour is moved up in the pointer. If NS is not zero, new starts remain, so the next start value is read. If all existing contours have been processed, this is automatically inserted as new data at the bottom of the character, otherwise a test is performed to see whether the next new start is still above the existing contour. If so, the insertion cycle is rerun; otherwise, the routine is ended. When all starts are processed, NS will be zero, which clears flags F2 and F3. The distance to the next starts is then read, scaled, and stored, updating MI and KI as appropriate before exit from the subroutine.

CONVERSION OF VECTORS TO VIDEO

The conversion of vector data to video is performed in the vector-to-stroke convertor 40 and line generator 42. Convertor 40 receives vector data from buffer 72, where the vector data is in the form of start value and change per stroke, scaled for the correct output size. The convertor 40 converts this to stroke-by-stroke data by adding a correctly scaled change to each stored contour in numerical order, and transferring the resultant stroke data to the line generator 42. The convertor 40 loads a line of stroke data at a time to the line generator 42 whenever buffer space is available in generator 42, and takes words from the vector buffer 72 when it requires them—waiting, if necessary, until one has been written.

In the present embodiment, the line generator 42 functions on a real time basis so that it is interlocked with the analog CRT ramp generation process in the phototypesetter CRT. The line generator 42 holds the CRT ramps OFF until a line is completely loaded from the convertor 40. The ramp is then started, along with a counter whose state represents the beam position relative to baseline. The counter frequency is a function, ultimately, of the scanning process.

The counter states are compared to the contour points to determine times when the CRT beam should turn on and off, reconstructing a stroke. Meanwhile, the vector-to-stroke convertor 40 loads another line into an alternate buffer. The last contour in the stroke is flagged (Wold) so that when the counter reaches this value, a blanking cycle is immediately restarted, resetting the CRT ramp, advancing the horizontal position, and indexing a character-width counter in the photo-typesetter.

The vector-to-video conversion will now be described in detail.

Figure 16:
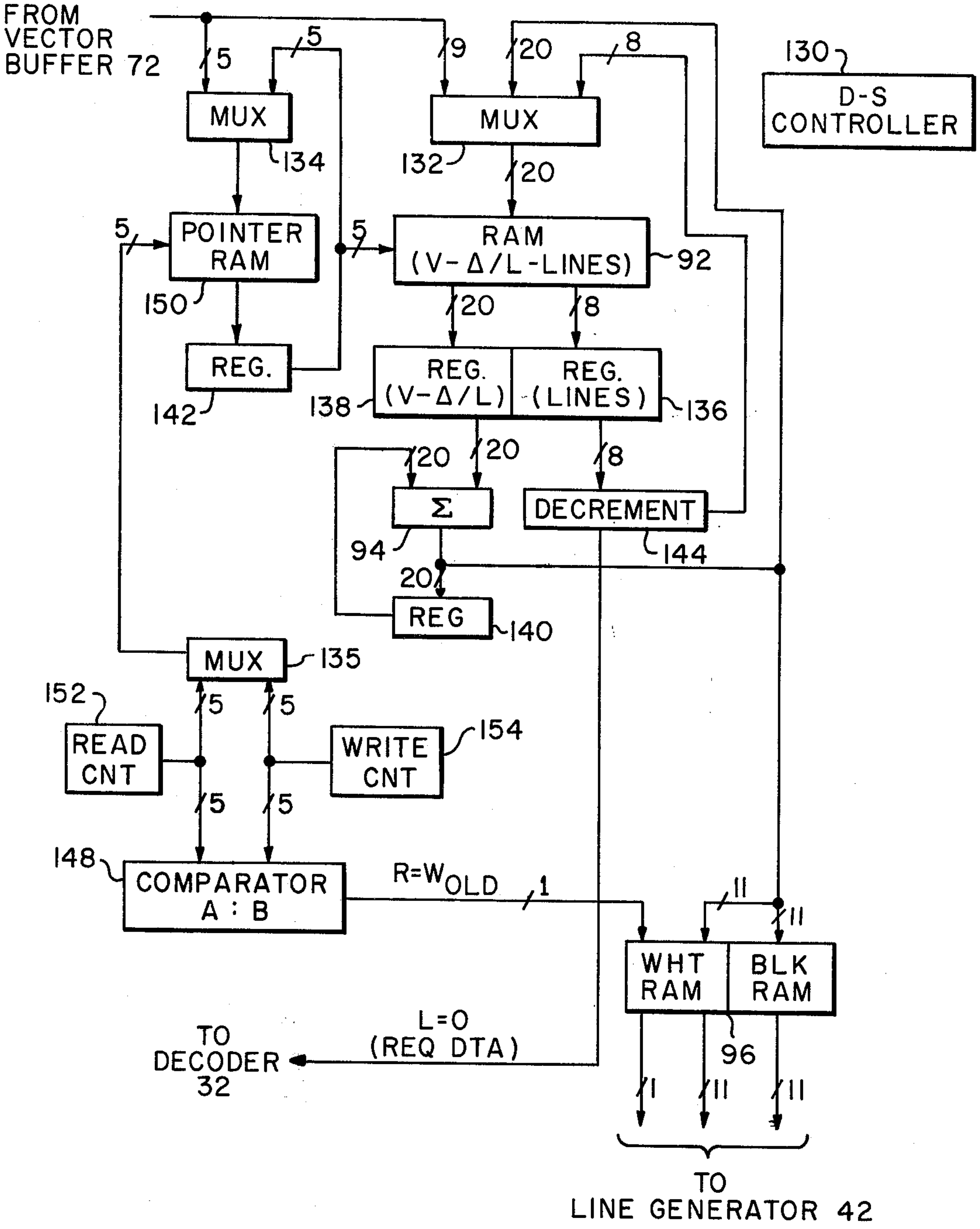
FIG. 16 shows a detailed block diagram form, the vector-to-stroke convertor section of the system of FIG. 1.

The vector-to-stroke convertor 40 is shown in detailed block diagram form in FIG. 16, including RAM 92, summation network 94 and stroke buffer 96. The remaining blocks form the control 90, including digital-to-stroke controller 130, multiplexers (MUX's) 132, 134 and 135, registers 136, 138, 140 and 142, decrementing network 144, comparator 148, RAM 150, and read and write counters 152 and 154, respectively. Convertor 40 reconstructs each contour from stroke-to-stroke with the decoded, ordered vector data received from the decoder 32 under the control of D-S controller 130, which operates in accordance with the flow chart shown in FIGS. 17A–17E.

Figure 17A:
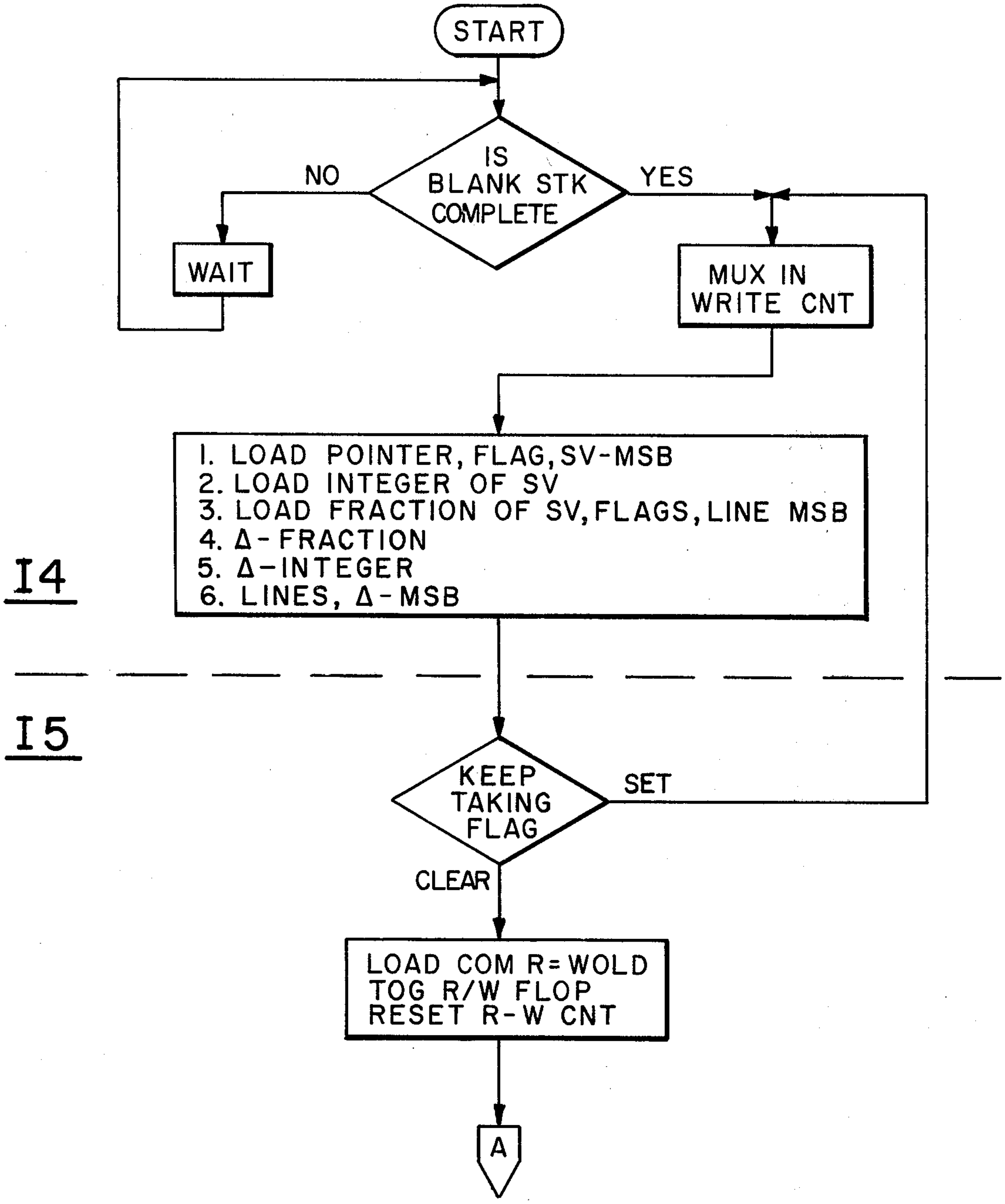
FIGS. 17A–17E show flow charts representative of the operation of the vector-to-stroke convertor of FIG. 16.
Figure 17B:
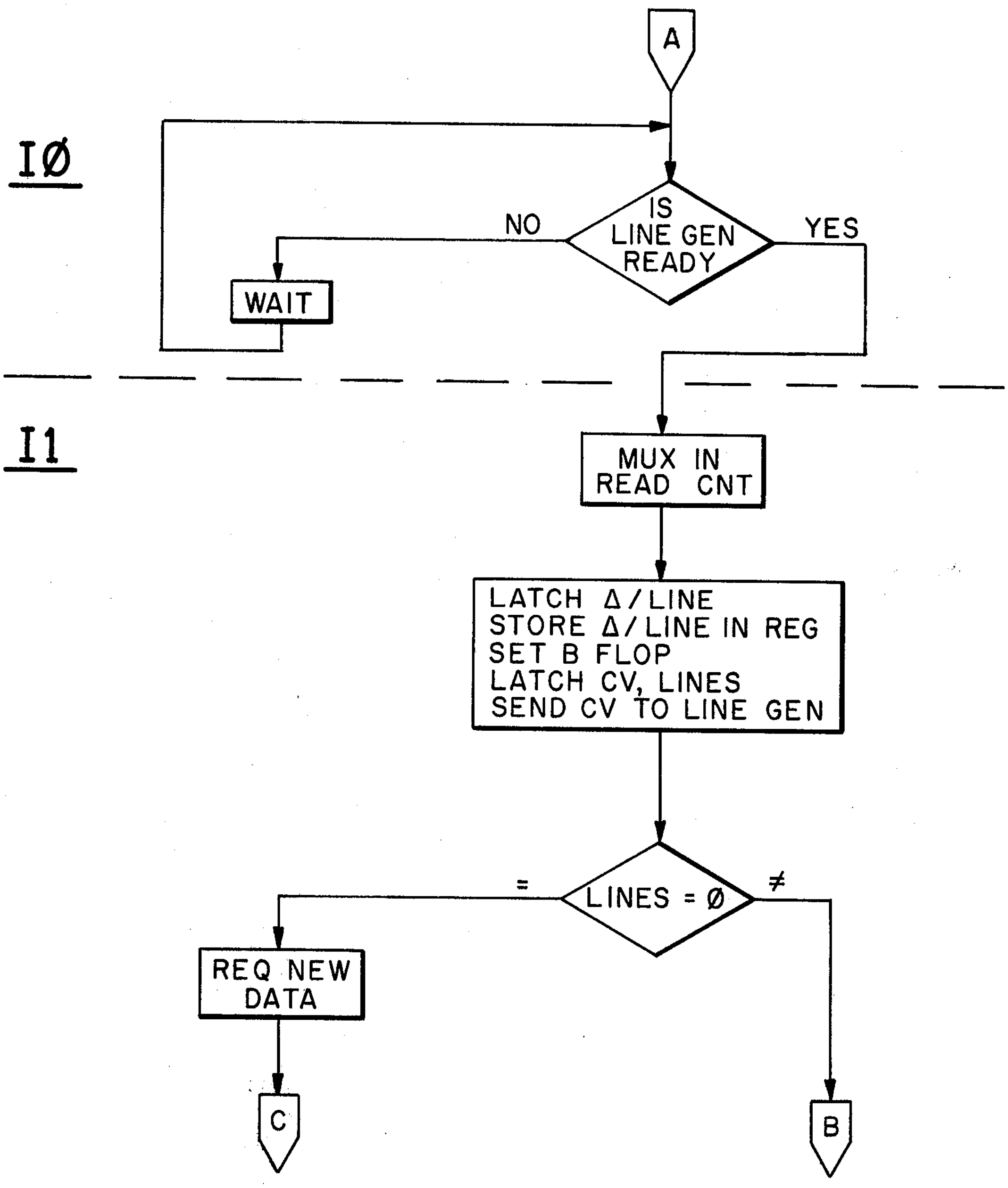
Figure 17C:
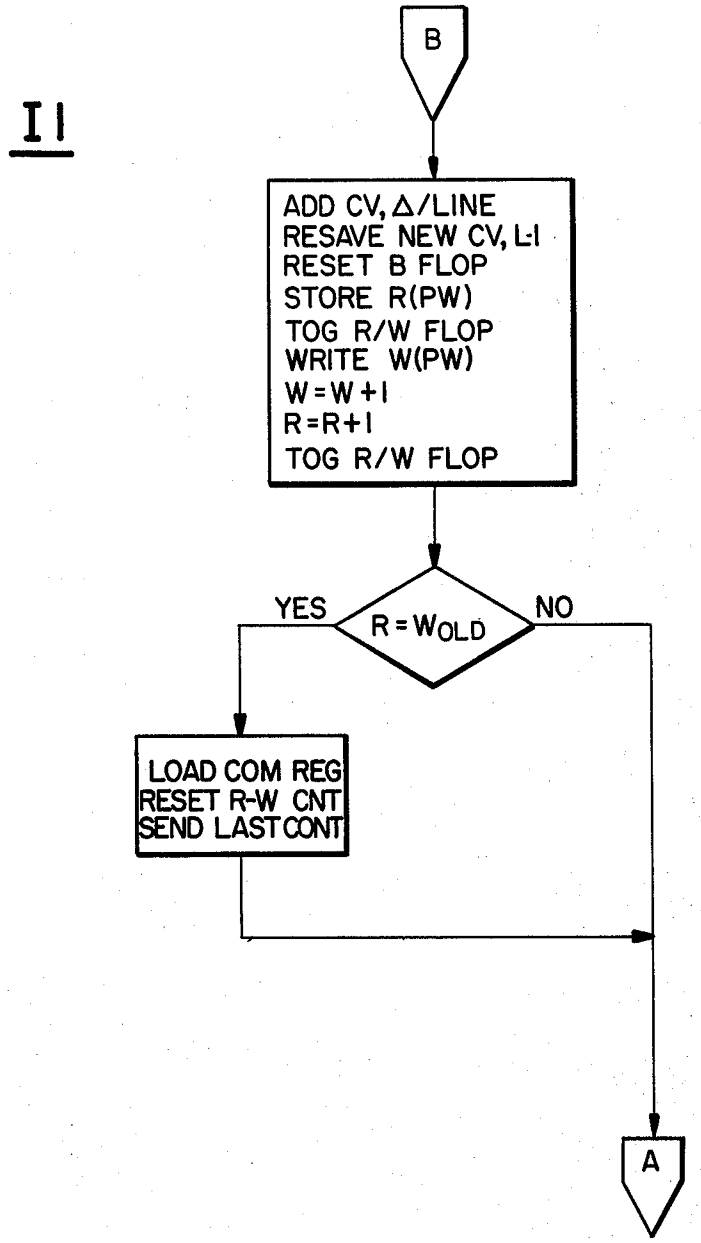
Figure 17D:
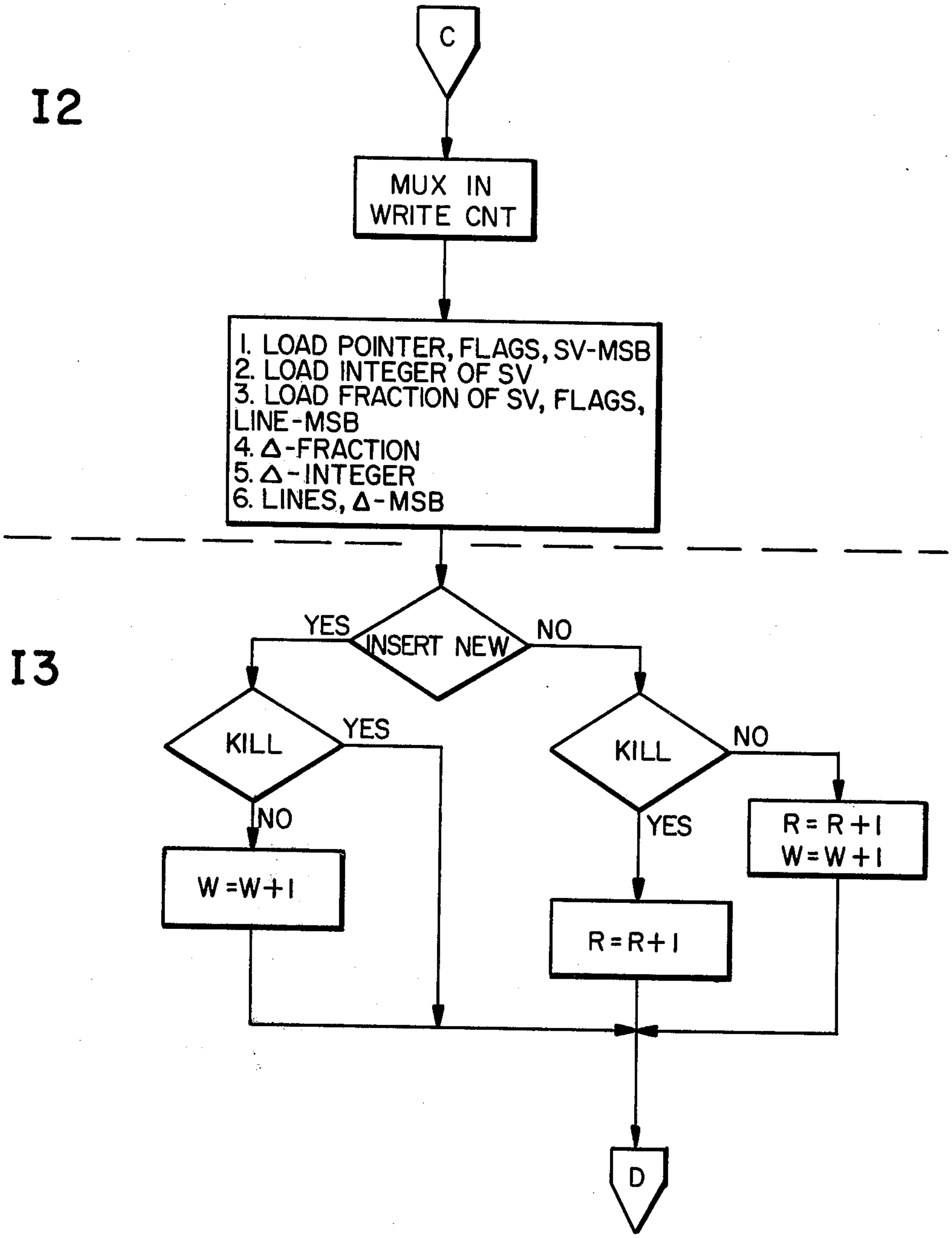
Figure 17E:
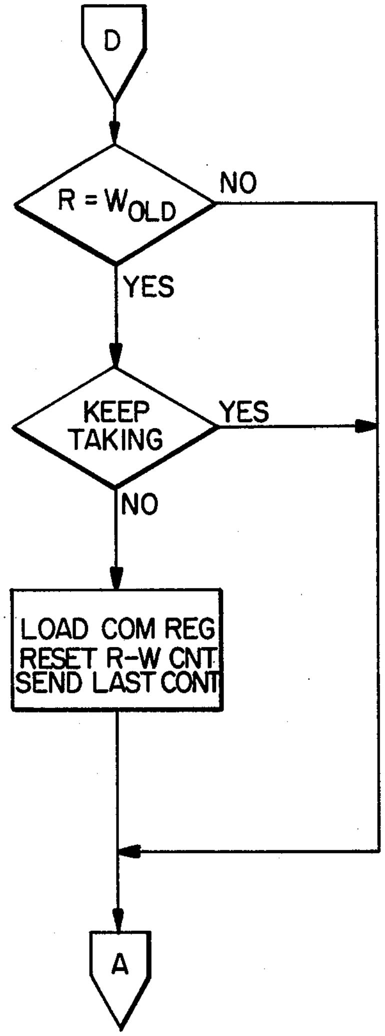

At the start of each character a state counter in controller 130 is loaded to state I4 (see FIG. 17A). In this state the convertor 40 waits until a blank stroke counter (in line generator 42) is full, indicating completion of left-bearing strokes, then a data request (REQ DTA, in FIG. 16) is sent to the decoder 32. In response to that signal, new vector data is loaded by way of MUX 134 into the pointer RAM and by way of MUX 132 into data RAM 92. The data consists of (1) pointer word (5 bits), which is the address at which the data is stored in the data RAM 92, 2) start value for the contour (16 bits), 3) delta (or change) per line (20 bits), (4) the number of lines before a break point (8 bits). After the last word is stored in the RAM's 92 and 150, the state counter increments to state I5. At this time a "keep taking" flag will be checked. If that flag is set, a request for more data is sent to the decoder 32. This procedure is repeated until the "keep taking" flag is no longer set. The state counter is then loaded to I0 and the conversion process is ready to begin (see FIG. 17B).

In state I0, the controller 130 waits for the line generator 42 to be ready, at which time the state counter is incremented to state I1. At this time, the pointer RAM 150 addresses the first contour of the line. The current value, delta per line, the number of lines data are loaded into holding registers 138 and 136. The 11 MSB's of the current value is also sent over to the line generator 42 for further processing (as described below). The current value and delta per line are added together in network 94 to obtain the next value of the contour, i.e. the new current value. The lines value from register 136 is decremented by network 144. The new current value and new lines value are then stored back in the data RAM 92 replacing the old values. The convertor state counter continues to jump between states I0 and I1 until the lines value for one of the contours equals zero. When this occurs a request for contour update is sent to the decoder 32 and the state counter of convertor 40 is set to I2 (see FIG. 17D).

In state I2 the convertor 40 is ready to accept data from the decoder 32 and store it in the appropriate RAM. After all data has been stored, the state counter is incremented to I3 (see FIGS. 17D and 17E).

In state I3, convertor 40 checks the flag bits, "kill", "keep taking", and "insert new". The "kill" flag signals the convertor 40 that the contour in process is completed. In turn, the write address counter 154 for the pointer RAM 150 is not rewritten for the next line. When the "keep taking" flag is set, the convertor 40 continues to request date from the decoder 32 by returning to state I1 and detecting that the old contour still requires update. This procedure continues until the "keep taking" flag is reset. "Insert new" signals that the data received is for a new contour. In this case, only the write address counter 154 for the pointer RAM 150 is incremented. After all flags have been checked in state I3 and the appropriate functions have been completed, the state counter is loaded back to state I0 to continue processing of contours.

The convertor 40 determines when all the points in a vertical stroke have been processed: When the count state of the read address counter 152 for the pointer RAM 150 equals the count state of the write counter for the previous stroke, that line of data is completed. This flag ($R=W_{old}$) is also sent over to the line generator 42.

Each vertical stroke is processed in the same manner, with the sequence of states determined by the character code. The character is completed when the write address counter 154 for the previous line is zero.

Figure 18:
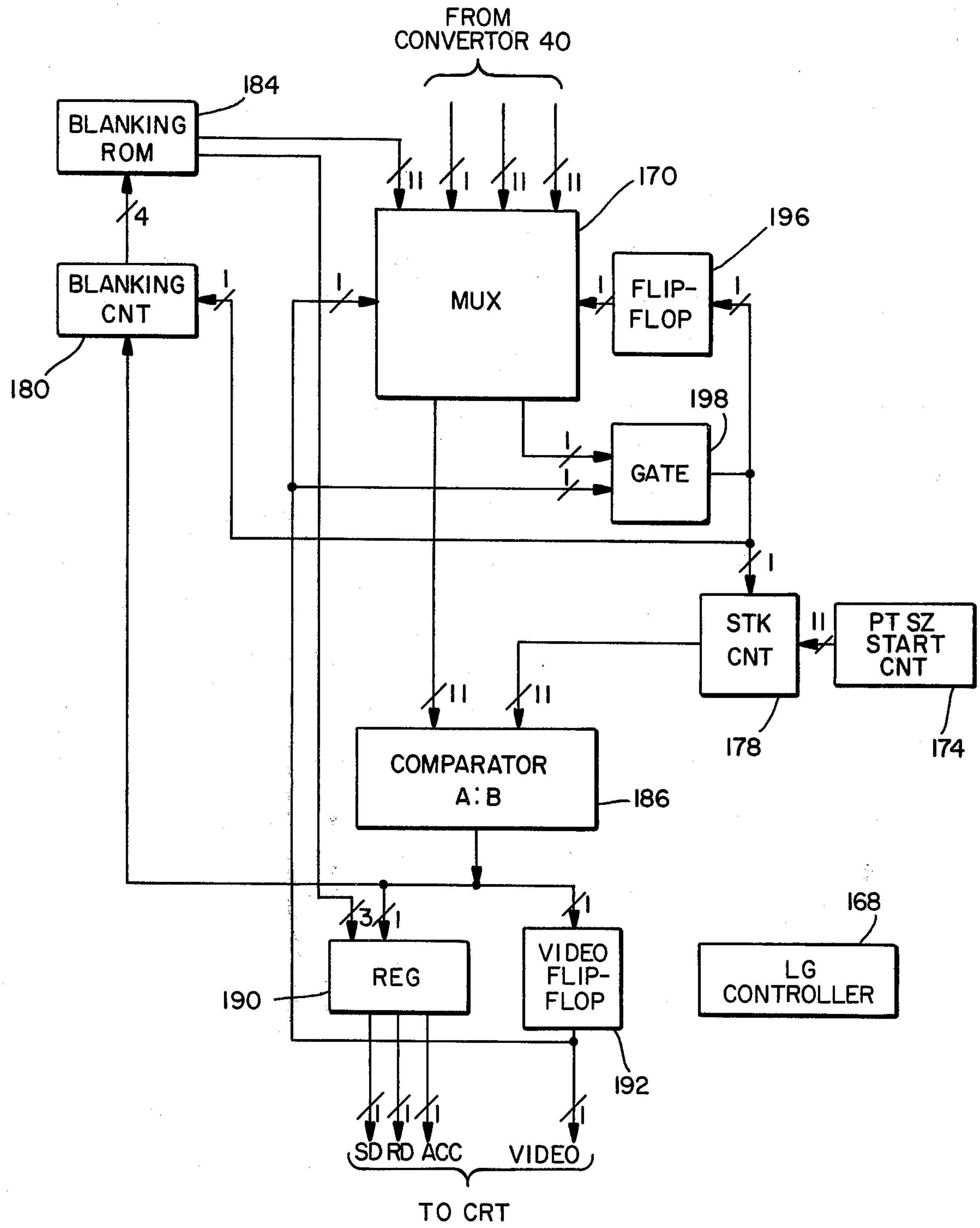
FIG. 18 shows a detailed block diagram form, the stroke-to-video convertor of the system of FIG. 1.

The line generator 42 is shown in detailed form in FIG. 18 and includes LG controller 168, multiplexer (MUX) 170, point size start counter 174, stroke counter 178, blanking counter 180, blanking ROM 184, comparator 186, register 190, video flip flop 192, MUX flip flop 196, and gate 198. In this embodiment, the output signals SD, RD, ACC, and VIDEO are adapted for application to a conventional CRT phototypesetter display, such as the display for a Videosetter II, manufactured by Compugraphic Corporation, Wilmington, Mass. In other embodiments, other configurations may be used. The line generator 42 converts the sequence of stroke data words provided by comparator 40 into video data under the control of LG controller 168, which operates in accordance with the flow charts of FIGS. 19A–19C.

Figure 19A:
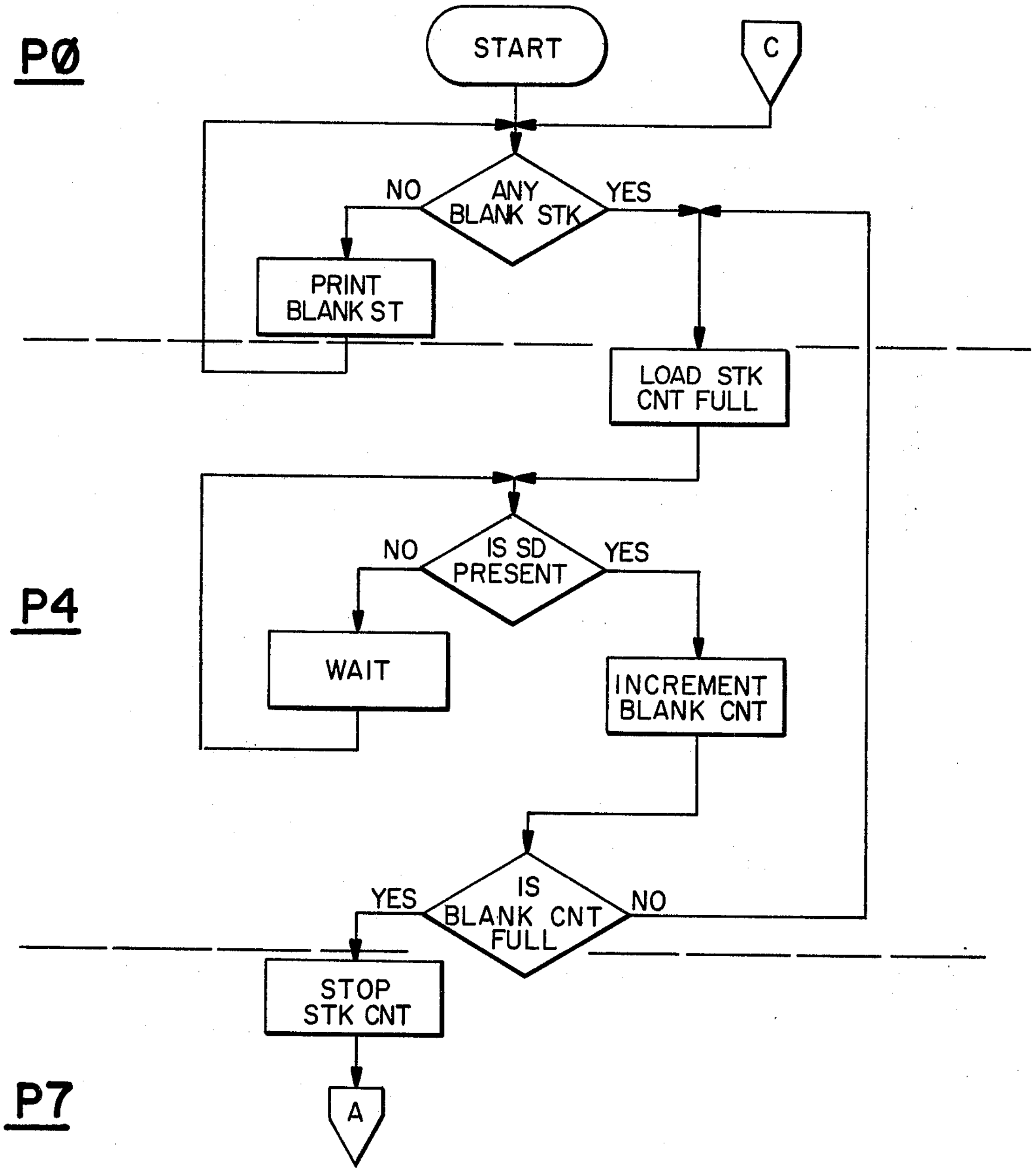
FIGS. 19A–19C show flow charts representative of the operation of the stroke-to-video convertor of FIG. 18.
Figure 19B:
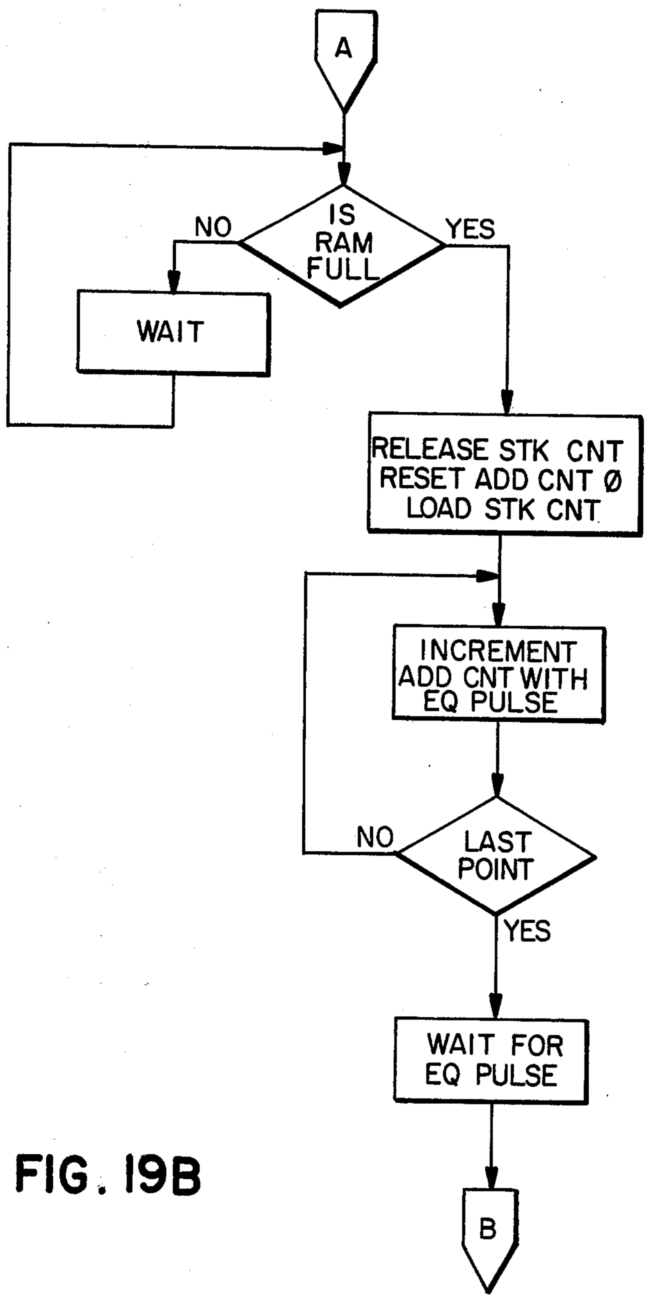
Figure 19C:
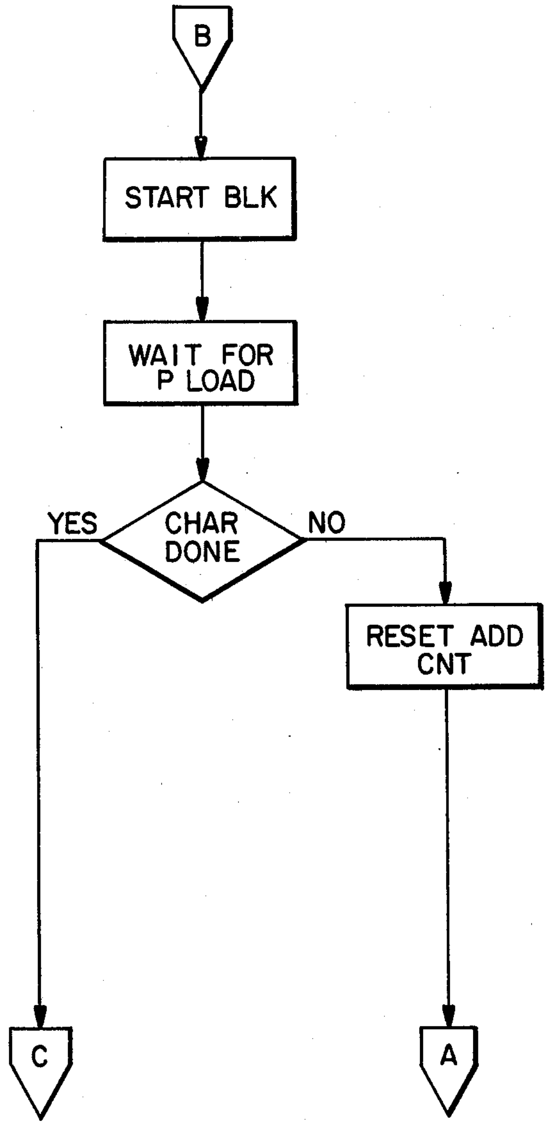

In this configuration, LG controller 168 includes a state counter which is initially reset to state PO (see FIG. 19A). At this state, the line generator 42 is in a standby mode waiting for the number of blank strokes to be loaded, where blank strokes refer to the white left hand edge bearing of each character. After loading, the state counter jumps to state P4 to start blank strokes.

The blank stroke counter 178 is incremented by one each time an SD pulse is present (see FIG. 19A). When the blank stroke counter 178 becomes full, a request for data is sent to the convertor 40 and the state counter is loaded to state P7. In state P7 the line generator 42 is waiting for the stroke buffer RAM's 90 of convertor 40 to be loaded with the stroke data for one stroke. When a stroke is ready for printing on the output CRT, the stroke counter 178 is preset (by counter 174) to a start count which is determined by the baseline needed for the point size to be printed, and the stroke buffer RAM's 96 of convertor 40 are reset so that the first point of the stroke data is present at their outputs. The stroke counter 178 and RAM 99 outputs are then compared in comparator 186. When a match occurs the video flip-flop 192 is toggled, and the RAM 96 is incremented to provide the next data point (see FIG. 19B). The flip-flop 92 provides the video signal for the CRT. The above process repeats for every point (black-white or white-black transition) in a vertical stroke. The last point in a vertical stroke is known from the $W_{old}$ bit in the white RAM section of RAM 96. As soon as a match occurs, blanking begins (see FIG. 19B and 19C).

When blanking is completed the next line of stroke data may be processed. At the completion of a character, the state counter is reset to PO and prints blank strokes as a standby mode until the next character is ready to begin.

The timing information used for generating the SD, RD, and ACC signals is stored in the blanking ROM. During blanking, the ROM and stroke counter outputs are compared in comparator 186. Each time a match occurs the ROM address is incremented, and one or more of the pulses is updated. This process is repeated until blanking is completed. This allows generation of arbitrary pulse widths and timing relationships as may be required by a CRT phototypesetter.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX 1

```
         .PSECT DATA,RW,D,GBL,REL,OVR
AMAX:    .BLKW 1
WID:     .BLKW 1
OPTION:  .BLKW 1
CC:      .BLKW 7500.
SOC:     .BLKW 2000.
NC:      .BLKW 1
CN:      .BLKW 1
CODEI:   .BLKW 1
MIN:     .BLKW 1
MAX:     .BLKW 1
IX:      .BLKW 1
LIST:    .BLKW 2500.
NOL:     .BLKW 1
ST:      .BLKW 4000.
SNL:     .BLKW 1
NAME:
PTR:     .BLKW 5000.
CCSI:    .BLKW 1
SOCI:    .BLKW 1

         PUSH0=10046
         PUSH1=10146
         PUSH2=10246
         PUSH3=10346
         PUSH4=10446
         PUSH5=10546
         POP0=12600
         POP1=12601
         POP2=12602
         POP3=12603
         POP4=12604
         POP5=12605
.MCALL FSRSZ$,FDBDF$,FDRC$A,FDOP$A,NMBLK$,FDAT$A,FINIT$,OPEN$R
.MCALL OPEN$W,GET$R,PUT$,CLOSE$,EXIT$S,QIOW$S,GET$,CALL,RETURN

                 .MACRO FMI A,B
                 MOV A,B
                 DEC B
                 ASL B
                 .ENDM

                 .MACRO MFI A,B
                 MOV A,B
                 ASR B
                 INC B
                 .ENDM

                 .MACRO SWAP A,B
                 MOV A,-(SP)
                 MOV B,A
                 MOV (SP)+,B
                 .ENDM

                 .MACRO DELTA,?P
                 MOV MAX,R4
```

```
          BGT P
          TYPE 4,EXIT
P:        MOV R4,R1
          ADD IX,R1
          FMI R1,R5
          MOV LIST(R5),R1
          FMI IX,R5
          SUB LIST(R5),R1
          .ENDM

          .MACRO IMIN A,B,C
          CMP A,B
          BGE C
          MOV A,B
          .ENDM

          .MACRO MSG A,B
MSG'A:    .ASCII <15><12>/B/
          SIZE'A=.-MSG'A
          .ENDM

          .MACRO TYPE A,B
          JSR R0,OUTLIN
          .WORD SIZE'A
          .WORD MSG'A
          .IF NB <B>
          JMP B
          .ENDC
          .ENDM

          .PSECT OUTLIN
OUTLIN::  QIOW$S #IO.WVB,#5,#1,,,,<(R0)+,(R0)+>
          RTS R0
```

FILE DEFINITION AND OUTPUT MESSAGES

```
          .PSECT
          FSRSZ$ 4
F1::      FDBDF$
          FDRC$A
          FDOP$A 1,VERS,PTRS
PTRS:     NMBLK$ PTRS,VAR,,DK,0
          ERR=F1+F.ERR
F2::      FDBDF$
          FDRC$A FD.RAN,,128.
          FDOP$A 2,VERS,EDGES
EDGES:    NMBLK$ EDGES,BIN,,DK,0
VERS:     .WORD 0,0,0,0,2,VN
VN:       .ASCII /;1/
F3::      FDBDF$
          FDRC$A
          FDAT$A R.VAR,FD.CR
          FDOP$A 3,CODES,PTRS
CODES:    .WORD 0,0,0,0,10,NAME
F4::      FDBDF$
          FDOP$A 4,,REF
REF:      NMBLK$ REFDATA,DAT,1
```

```
        .PSECT MSSG
        MSG 1,<CRASH-ERROR      NOT END OF FILE.>
        MSG 2,<CRASH-UNEXPECTED VALUE IN SORT PHASE 1.>
        MSG 3,<CRASH-UNEXPECTED VALUE IN SORT PHASE 2.>
        MSG 4,<CRASH-MAX IS NEGATIVE OR ZERO.>
```

MASTER PROGRAM

```
        .PSECT
ENTER:  FINIT$
        OPEN$R #F4
        GET$ #F4,#NAME,#3
        MOV #NAME,R0
        CALL $CDTB
        MOV R1,WID
        MOV #200.,AMAX
        GET$ #F4,#NAME,#20.
        MOV F4+F.NRBD,CODES+10
GO:     OPEN$R #F1
        OPEN$R #F2
        OPEN$W #F3
        MOV #CN-CC,R1
        MOV #CC,R0
20$:    CLR (R0)+
        SOB R1,20$
        MOV #PTR,R1
        MOV #ST,R2
        MOV #CC+2,CCSI
        MOV #SOC,SOCI
1$:     GET$ #F1,R1,#128.,2$
        MOV 4(R1),2000.(R2)
        MOV (R1),(R2)+
        ADD 2(R1),R1
        INC NC
        BR 1$
2$:     CMPB #IE.EOF,ERR
        BEQ 3$
        MOV #MSG1+15.,R0
        MOVB ERR,R1
        MOV #15412,R2
        CALL $CBTA
        TYPE 1,EXIT
3$:     JSR PC,SORT
        MOV NC,R5
        MOV #PTR,R4
4$:     MOV 2(R4),R3
        SUB #6,R3
        BEQ 5$
        JSR PC,RDLIST
        JSR PC,BRKPT
5$:     ADD 2(R4),R4
        SOB R5,4$
```

CODE EACH CONTOUR

```
        MOV NC,R5
        MOV #PTR,R4
9$:     MOV CCSI,R2
```

```
        MOV (R4),R0
        CMP AMAX,#50.
        BNE 8$
        DEC R0
        ASH #2,R0
        INC R0
8$:     MOV R0,(R2)+
        MOV 4(R4),(R2)+
        MOV 2(R4),R3
        SUB #6,R3
        BEQ 11$
        JSR PC,RDLIST
        MOV #1,IX
10$:    JSR PC,SEG
        CMP IX,NOL
        BNE 10$
11$:    MOV CCSI,R3
        MOV R2,CCSI
        ADD #2,CCSI
        SUB R3,R2
        MOV R2,-(R3)
        MOV SOCI,R2
        INC 2000.(R2)
        SUB #CC,R3
        MOV R3,(R2)+
        MOV R2,SOCI
        ADD 2(R4),R4
        SOB R5,9$
        JSR PC,CODING
EXIT::  CLOSE$ #F1
        CLOSE$ #F2
        CLOSE$ #F3
CRLF:   CLOSE$ #F4
        JSR R0,OUTLIN
        .WORD 2
        .WORD MSG1
        EXIT$S
```

READ INDICATED RECORDS FROM DISK (RDLIST)

```
RDLIST: CALL $SAVAL
        MOV R5,CN
        MOV (R4),SNL
        ASR R3
        ADD #6,R4
        MOV #LIST-128.,R5
1$:     ADD #128.,R5
        MOV (R4)+,R2
        GET$R #F2,R5,,R2
        SOB R3,1$
        CLR 128.(R5)
2$:     TST (R5)+
        BNE 2$
        SUB #LIST+4,R5
        MFI R5,NOL
        RETURN
```

SORT IN LINE-NUMBER AND START-VALUE ORDER

```
SORT:   MOV #ST,R0
        MOV NC,R5
1$:     MOV R0,R1
        ADD #2,R1
2$:     TST (R1)
        BEQ 4$
        CMP (R0),(R1)
        BLE 3$
        SWAP (R0),(R1)
        SWAP 2000.(R0),2000.(R1)
3$:     TST (R1)+
        CMP #ST+2000.,R1
        BGT 2$
        TYPE 2,EXIT
4$:     TST (R0)+
        SOB R5,1$


        MOV #ST,R0
        MOV NC,R5
5$:     MOV R0,R1
        ADD #2,R1
6$:     CMP (R0),(R1)
        BNE 8$
        CMP 2000.(R0),2000.(R1)
        BLE 7$
        SWAP 2000.(R0),2000.(R1)
7$:     TST (R1)+
        CMP #ST+2000.,R1
        BGT 6$
        TYPE 3,EXIT
8$:     CMP #1,(R0)
        BNE 9$
        MOV 2000.(R0),4000.(R0)
9$:     TST (R0)+
        SOB R5,5$
        RTS PC
```

LOCATE FORCED BREAKPOINTS

```
BRKPT:  CALL $SAVAL
        MOV NOL,R0
        ADD SNL,R0
        MOV #ST,R1
        MOV NC,R5
1$:     CMP SNL,(R1)
        BGE 5$
        CMP R0,(R1)
        BLT 6$
        MOV (R1),R2
        SUB SNL,R2
        ASL R2
        MOV LIST(R2),R4
        MOV 4000.(R1),R3
        BNE 2$
```

```
        MOV R4,4000.(R1)
        BR 4$
2$:     SUB 2000.(R1),R4
        SUB 2000.(R1),R3
        BGT 3$
        CMP R4,R3
        BLE 4$
        MOV LIST(R2),4000.(R1)
        BR 4$
3$:     TST R4
        BMI 4$
        CMP R4,R3
        BGE 4$
        MOV LIST(R2),4000.(R1)
4$:     CMP LIST(R2),4000.(R1)
        BNE 5$
        MOV CN,6000.(R1)
5$:     TST (R1)+
        SOB R5,1$
6$:     RETURN
```

FIND LONGEST ALLOWABLE LINEAR SEGMENT REMAINING

```
SEG:    PUSH5,PUSH4,PUSH3
        PUSH0,PUSH1,PUSH2
        JSR PC,20$
1$:     ADD R1,R3
        ADC R2
        ADD R0,R2
        BIC #174000,R2
        CMP LIST(R5),R2
        BEQ 4$
        PUSH2
        SUB LIST(R5),R2
        BPL 2$
        NEG R2
2$:     CMP R2,#1
        BGT 3$
        DEC MIN
        BMI 3$
        POP2
        BR 4$
3$:     POP2
        DEC MAX
        JSR PC,24$
        BR 1$
4$:     TST (R5)+
        SOB R4,1$
        POP2
        DELTA
        ADD R4,IX
        MOV R4,(R2)+
        MOV R1,(R2)+
        MOV #ST,R5
        MOV IX,R4
        ADD SNL,R4
        DEC R4
        MOV NC,R0
```

```
5$:     CMP 6000.(R5),CN
        BNE 6$
        CMP (R5),R4
        BNE 6$
        CLR 6000.(R5)
6$:     TST (R5)+
        SOB R0,5$
        POP1,POP0
        POP3,POP4,POP5
        RTS PC


10$:    0
```

MAX LENGTH / ALLOWABLE ERROR / SLOPE / PREP REGISTERS

```
20$:    MOV NC,R0
        MOV NOL,MAX
        SUB IX,MAX
        IMIN AMAX,MAX,21$
21$:    MOV #ST,R5
        MOV IX,R4
        ADD SNL,R4
        DEC R4
22$:    CMP CN,6000.(R5)
        BNE 23$
        MOV (R5),10$
        SUB R4,10$
        IMIN 10$,MAX,23$
23$:    TST (R5)+
        SOB R0,22$
24$:    MOV #3,MIN
        CMP MAX,#25.
        BGE 30$
        DEC MIN
        CMP MAX,#15.
        BGE 30$
        DEC MIN
30$:    CLR 10$
        DELTA
        BPL 31$
        NEG R1
        MOV #2047.,10$
31$:    CLR R0
        ASH #2,R1
        DIV R4,R0
        ASH #7,R1
        MOV R1,R3
        CLR R2
        DIV R4,R2
        MOV R2,R1
        ASH #9.,R1
        ASHC #-2,R0
        MOV LIST(R5),R2
        TST (R5)+
        MOV #100000,R3
```

```
            TST 10$
            BEQ 32$
            SUB R0,10$
            MOV 10$,R0
            COM R1
            BIC #177,R1
32$:        RTS PC


            .END ENTER
```

APPENDIX 2

```
        .PSECT DATA,RW,D,GBL,REL,OVR
AMAX:   .BLKW 1
WID:    .BLKW 1
OPTION: .BLKW 1
CC:     .BLKW 7500.
SOC:    .BLKW 2000.
NC:     .BLKW 1
CI:     .BLKW 1
CODE:   .BLKW 4000.
MIN:    .BLKW 1
NS:     .BLKW 1
BL:     .BLKW 1
LINE:   .BLKW 1
NEXT:   .BLKW 1
M:      .BLKW 1
M2:     .BLKW 1
ST2:    .BLKW 1
ST3:    .BLKW 1
AMAT:   .BLKW 240.
MAT:    .BLKW 420.
IX:     .BLKW 1
        FLDSZ=.-CI

        PUSH0=10046
        PUSH1=10146
        PUSH2=10246
        PUSH3=10346
        PUSH4=10446
        PUSH5=10546
        POP0=12600
        POP1=12601
        POP2=12602
        POP3=12603
        POP4=12604
        POP5=12605
        ROW2=120.
        ROW3=ROW2+ROW2
        ROW4=ROW3+ROW2
        ROW5=ROW4+ROW2
        ROW6=ROW5+ROW2
        ROW7=ROW6+ROW2
```

```
.MCALL PUT$,CLOSE$,EXIT$S,QIOW$C,CALL,RETURN

            .MACRO FMI A,B
            MOV A,B
            DEC B
            ASL B
            .ENDM

            .MACRO MFI A,B
            MOV A,B
            ASR B
            INC B
            .ENDM

            .MACRO SWAP A,B
            MOV A,-(SP)
            MOV B,A
            MOV (SP)+,B
            .ENDM

            .MACRO IMIN A,B,C
            CMP A,B
            BGE C
            MOV A,B
            .ENDM

            .MACRO PREP A,B,C,D
            MOV A,B
            MOV C,D
            .ENDM

            .MACRO SHIFT A
            SUB #MAT,A
            ASL A
            ADD #AMAT,A
            .ENDM

            .MACRO MSG A,B
    MSG'A:  .ASCII <15><12>/B/
            SIZE'A=.-MSG'A
            .ENDM

            .MACRO TYPE A,B
            JSR R0,OUTLIN
            .WORD SIZE'A
            .WORD MSG'A
            .IF NB <B>
            JMP B
            .ENDC
            .ENDM

            .PSECT MSSG
            MSG 2,<CRASH-UNEXPECTED VALUE IN NSCODE.>
            MSG 3,<CRASH-RAN OUT OF COLUMNS.>
```

INTERLEAVING PROGRAM

```
          .PSECT
CODING::  PREP #FLDSZ,R5,#CI,R4
1$:       CLR (R4)+
          SOB R5,1$
          MOV #1,CODE+2
          MOV WID,CODE+4
          PREP #3,CI,#1020.,BL
          INC LINE
          INC NEXT
4$:       JSR PC,STARTS
          TST NS
          BEQ 6$
          JSR PC,GETMIN
          JSR PC,NSCODE
5$:       JSR PC,UPDATE
          ADD MIN,LINE
          JSR PC,GETMIN
          MOV LINE,R5
          ADD MIN,R5
          SUB NEXT,R5
          BMI 5$
          BR 4$
6$:       MOV CI,CODE
          PREP CI,R5,#CODE,R4
          MOV #512.,R3
8$:       CMP #256.,R5
          BLE 9$
          MOV R5,R3
          ASL R3
9$:       PUT$ #F3,R4,R3
          ADD #512.,R4
          SUB #256.,R5
          BGT 8$
          RTS PC
```

GETMIN, STARTS, AND NSFIND ROUTINES

```
GETMIN:   PREP IX,R5,#MAT,R0
          MOV #2047.,MIN
1$:       TST (R0)+
          BEQ 2$
          IMIN ROW4-2(R0),MIN,2$
2$:       SOB R5,1$
          RTS PC


STARTS:   CLR NS
          MOV NEXT,MIN
          SUB LINE,MIN
          CLR ST2
          CLR ST3
          PREP NC,R5,#SOC,R0
1$:       TST 2000.(R0)
          BEQ 2$
          MOV (R0),R1
```

```
         CMP NEXT,CC+2(R1)
         BNE 2$
         JSR PC,COLUMN
2$:      TST (R0)+
         SOB R5,1$
         TST NS
         BNE 10$
         RTS PC
10$:     PREP #ROW2,R5,#MAT,R4
         ASR R5
3$:      TST (R4)+
         BEQ 4$
         MOV R4,R1
4$:      SOB R5,3$
         SUB #MAT+2,R1
         MFI R1,IX



NSFIND:  MOV LINE,NEXT
         ADD #1000.,NEXT

         PREP NC,R5,#SOC,R0
1$:      TST 2000.(R0)
         BEQ 2$
         MOV (R0),R1
         IMIN CC+2(R1),NEXT,2$
2$:      TST (R0)+
         SOB R5,1$
```

INTER ROUTINE - INTERPOLATE MID VALUES AT NEW STARTS

```
INTER:   PREP IX,R5,#MAT,R4
1$:      CMP (R4),#1
         BNE 4$
         MOV ROW4(R4),R0
         SUB MIN,R0
         MOV R4,R1
         SHIFT R1
         PUSH5,PUSH4,PUSH1
         MOV (R1)+,R2
         MOV (R1),R3
         TST R2
         BPL 2$
         COM R5
         COM R2
         COM R3
2$:      CALL $DMUL
         TST R5
         BPL 3$
         COM R0
         COM R1
3$:      POP5,POP4
         MOV ROW7(R4),R2
         CLR R3
         SUB R1,R3
         SBC R2
```

```
        SUB RO,R2
        CLC
        ROR R3
        MOV R2,ROW3(R5)
        MOV R3,ROW3+2(R5)
        POP5
4$:     TST (R4)+
        SOB R5,1$
```

VSORT ROUTINE - SORT IN START-VALUE ORDER

```
VSORT:  PREP IX,R5,#MAT,RO
        FMI R5,R1
        ADD RO,R1
        DEC R5
1$:     MOV RO,R2
        TST (R2)+
        BEQ 4$
        MOV RO,R3
        SHIFT R3
2$:     TST (R2)
        BEQ 3$
        MOV R2,R4
        SHIFT R4
        CMP ROW3(R3),ROW3(R4)
        BLT 3$
        BGT 5$
        CMP ROW3+2(R3),ROW3+2(R4)
        BGT 5$
        BLT 3$
        JSR PC,BRIDGE
        TST L9
        BMI 5$
3$:     TST (R2)+
        CMP R2,R1
        BLE 2$
4$:     TST (RO)+
        SOB R5,1$
        CLR M2
        TST ST3
        BEQ 6$
        JMP FILTER
6$:     RTS PC


5$:     SWAP (RO),(R2)
        SWAP ROW2(RO),ROW2(R2)
        SWAP ROW3(RO),ROW3(R2)
        SWAP ROW4(RO),ROW4(R2)
        SWAP ROW5(RO),ROW5(R2)
        SWAP ROW6(RO),ROW6(R2)
        SWAP ROW7(RO),ROW7(R2)
        SWAP (R3),(R4)
        SWAP 2(R3),2(R4)
        SWAP ROW3(R3),ROW3(R4)
        SWAP ROW3+2(R3),ROW3+2(R4)
        BR 3$
```

RESOLVE START-VALUE TIE DURING BRIDGE

```
        L9:      .BLKW 1
        BRIDGE:  PUSH5,PUSH4,PUSH3,PUSH2,PUSH1,PUSH0
                 PREP ROW6(R0),R1,ROW6(R2),R5
                 PREP (R0),R3,R3,R4
                 CMP CC+2(R1),CC+2(R5)
                 BLT 11$
                 BGT 12$
                 ADD CC+4(R1),R3
                 ADD CC+4(R5),R4
                 CLR L9
                 MOV CC+6(R1),R0
                 MOV CC+10(R1),R1
                 BPL 13$
                 NEG R1
                 DEC L9
        13$:     CLR R2
                 CALL $DDIV
                 TST L9
                 BPL 14$
                 COM R1
                 COM R2
        14$:     ADD R1,R3
                 PUSH2
                 CLR L9
                 MOV CC+6(R5),R0
                 MOV CC+10(R5),R1
                 BPL 15$
                 NEG R1
                 DEC L9
        15$:     CLR R2
                 CALL $DDIV
                 TST L9
                 BPL 16$
                 COM R1
                 COM R2
        16$:     ADD R4,R1
                 POP4
                 CLR L9
                 CMP R1,R3
                 BGT 17$
                 BLT 18$
                 CMP R2,R4
                 BGT 17$
        18$:     DEC L9
        17$:     POP0,POP1,POP2,POP3,POP4,POP5
                 RTS PC

        11$:     ADD CC+4(R1),R4
                 PUSH1
                 CLR L9
                 MOV CC+6(R1),R0
                 MOV CC+10(R1),R1
                 BPL 20$
                 NEG R1
                 DEC L9
        20$:     CLR R2
```

FINISH START-VALUE TIE RESOLUTION

```
        CALL $DDIV
        TST L9
        BPL 21$
        COM R1
        COM R2
21$:    ADD R1,R4
        POP1,PUSH2,PUSH1
        CLR L9
        MOV CC+2(R5),R0
        MOV CC+4(R5),R1
        BPL 22$
        NEG R1
        DEC L9
22$:    CLR R2
        CALL $DDIV
        PUSH3
        PREP R2,R3,R1,R2
        MOV 2(SP),R1
        MOV CC+2(R1),R0
        INC R0
        CALL $DMUL
        TST L9
        BPL 23$
        COM R0
        COM R1
23$:    ADD (SP)+,R0
        TST (SP)+
        POP5
        CLR L9
        CMP R0,R4
        BGT 17$
        BLT 18$
        CMP R1,R5
        BGT 17$
        BR 18$

12$:    POP0,POP1,POP2,POP3,POP4,POP5
        SWAP (R0),(R2)
        SWAP ROW2(R0),ROW2(R2)
        SWAP ROW3(R0),ROW3(R2)
        SWAP ROW4(R0),ROW4(R2)
        SWAP ROW5(R0),ROW5(R2)
        SWAP ROW6(R0),ROW6(R2)
        SWAP ROW7(R0),ROW7(R2)
        SWAP (R3),(R4)
        SWAP 2(R3),2(R4)
        SWAP ROW3(R3),ROW3(R4)
        SWAP ROW3+2(R3),ROW3+2(R4)
        JMP BRIDGE
```

FILTER ROUTINE - DELETE PAIRS OF SINGLE-POINT CONTOURS

```
FILTER: PREP IX,R5,#MAT,R0
        FMI R5,R1
        ADD R0,R1
```

```
        DEC R5
1$:     CMP (R0),#3
        BLT 4$
        MOV R0,R2
        ADD #2,R2
5$:     TST (R2)
        BEQ 3$
        CMP (R2),#3
        BLT 4$
        TST ST2
        BNE 2$
        CMP NS,#2
        BNE 2$
        INC ST2
        BR 4$
2$:     CLR (R0)
        CLR (R2)
        SUB #2,NS
        ADD #2,M2
        BR 4$
3$:     TST (R2)+
        CMP R2,R1
        BLE 5$
4$:     TST (R0)+
        SOB R5,1$
        RTS PC
```

NSCODE ROUTINE - CODE/ STORE FIRST SV AND # OF STARTS

```
NSCODE: PREP IX,R5,#MAT,R0
1$:     CMP (R0),#2
        BGE 2$
        TST (R0)+
        SOB R5,1$
        TYPE 2,EXIT
2$:     FMI CI,R1
        MOV ROW7(R0),R3
        MOV BL,R2
        SUB R3,R2
        BPL 4$
        MOV #1536.,R3
        SUB R2,R3
        MOV R3,R2
4$:     MOV R2,CODE+2(R1)
        MOV NS,CODE+4(R1)
        ADD #2,CI
        RTS PC
```

COLUMN ROUTINE - LOCATE AND START A COLUMN IN MAT

```
COLUMN: CALL $SAVAL

        PREP #ROW2,R5,#MAT,R4
        ASR R5
1$:     TST (R4)+
        BEQ 2$
        SOB R5,1$
        TYPE 3,EXIT
```

```
2$:     TST -(R4)
        MOV #2,(R4)
        CLR ROW2(R4)
        CLR ROW3(R4)
        MOV MIN,ROW4(R4)
        MOV CC(R1),R2
        ADD R1,R2
        MOV R2,ROW5(R4)
        ADD #4,R1
        MOV R1,ROW6(R4)
        MOV CC(R1),R3
        MOV R3,ROW7(R4)
        MOV R4,R2
        SHIFT R2
        MOV R3,ROW3(R2)
        CLR (R2)+
        CLR ROW3(R2)
        CLR (R2)
        INC NS
        CLR 2000.(R0)
        CMP CC-4(R1),#4
        BNE 4$
        MOV #1,ST3
        INC (R4)
        BR 5$
4$:     MOV #1,ST2
5$:     RETURN
```

LRCODE ROUTINE - GENERATE LINES RANGE CODE

```
LRCODE: CALL $SAVAL
        MOV ROW6(R0),R1
        TST (R1)+
        MOV CC(R1),R2
        ASH #-5,R2
        MOV #1,R3
1$:     ADD #4,R1
        CMP R1,ROW5(R0)
        BGT 2$
        MOV CC(R1),R4
        ASH #-5,R4
        CMP R4,R2
        BNE 2$
        INC R3
        BR 1$
2$:     MOV R3,ROW2(R0)
        DEC ROW2(R0)
        ASH #3,R3
        ADD R2,R3
        INC CI
        FMI CI,R5
        MOV R3,CODE(R5)
        RETURN
```

DRCODE ROUTINE - GENERATE DELTA RANGE CODE

```
DRCODE: CALL $SAVAL
        MOV ROW6(R0),R1
        ADD #4,R1
        MOV CC(R1),R2
        MOV R2,R5
        BPL 10$
        DEC R2
10$:    ASH #-6,R2
        MOV #1,R3
1$:     ADD #4,R1
        CMP R1,ROW5(R0)
        BGT 2$
        MOV CC(R1),R4
        BPL 11$
        DEC R4
11$:    ASH #-6,R4
        CMP R4,R2
        BNE 2$
        INC R3
        BR 1$
2$:     MOV R5,R4
        BPL 3$
        NEG R4
3$:     ASH #-6,R4
        CLR R1
        CMP R4,#4
        BLT 4$
        INC R1
4$:     MOV R4,R2
        BIC #3,R2
        BIC #177774,R4
        ASH #2,R2
        ADD R3,R2
        ASH #2,R2
        ADD R2,R4
        ROL R5
        ROL R4
        TST R1
        BEQ 5$
        BIS #2000,R4
5$:     MOV R3,ROW3(R0)
        DEC ROW3(R0)
        INC CI
        FMI CI,R3
        MOV R4,CODE(R3)
        RETURN
```

UPDATE ROUTINE - FIND AND CODE NEW SEGMENTS

```
UPDATE: PREP IX,R5,#MAT,R0
1$:     TST (R0)
        BEQ 6$
        SUB MIN,ROW4(R0)
        BNE 6$
9$:     DEC ROW2(R0)
```

```
                BPL  4$
                CMP  ROW6(R0),ROW5(R0)
                BNE  3$
                INC  CI
                FMI  CI,R1
                CLR  CODE(R1)
                CMP  (R0),#2
                BLT  2$
                JSR  PC,NSTART
        2$:     CLR  (R0)
                BR 6$
        3$:     JSR  PC,LRCODE
        4$:     DEC  ROW3(R0)
                BPL  5$
                JSR  PC,DRCODE
        5$:     MOV  ROW6(R0),R1
                MOV  CC+2(R1),ROW4(R0)
                MOV  CC+4(R1),R3
                ADD  #4,ROW6(R0)
                ADD  R3,ROW7(R0)
                MOV  ROW4(R0),R2
                BEQ  10$
                JSR  PC,DIVIDE
        10$:    TST  R3
                BPL  11$
                NEG  R3
        11$:    BIC  #177700,R3
                BIC  #177740,R2
                ASH  #5,R3
                ADD  R2,R3
                INC  CI
                FMI  CI,R1
                MOV  R3,CODE(R1)
                CMP  (R0),#2
                BLT  12$
                JSR  PC,NSTART
        12$:    TST  ROW4(R0)
                BEQ  9$
        6$:     TST  (R0)+
                DEC  R5
                BEQ  13$
                JMP  1$
        13$:    RTS  PC
```

NSTART ROUTINE - CODE NEXT START OR DISTANCE TO NEXT

```
        NSTART: CALL $SAVAL
                MOV  #1,(R0)
                FMI  IX,R3
                ADD  #MAT,R3
        1$:     CMP  R0,R3
                BLE  2$
                MOV  NEXT,R1
                SUB  LINE,R1
                SUB  MIN,R1
                INC  CI
                FMI  CI,R0
```

```
        MOV R1,CODE(R0)
        BR 6$
2$:     CMP #2,(R0)
        BLE 3$
        TST (R0)+
        BR 1$
3$:     INC CI
        FMI CI,R1
        MOV ROW7(R0),R3
        MOV BL,R2
        SUB R3,R2
        BPL 5$
        MOV #1536.,R3
        SUB R2,R3
        MOV R3,R2
5$:     MOV R2,CODE(R1)
6$:     RETURN
```

DIVIDE ROUTINE - COMPUTE SLOPE OF NEW SEGMENT

```
DIVIDE: PUSH5,PUSH4,PUSH3
        PUSH2,PUSH1,PUSH0
        MOV R2,R0
        CLR R2
        MOV R3,R1
        BPL 1$
        COM R5
        COM R1
        COM R2
1$:     CALL $DDIV
        TST R5
        BPL 2$
        COM R2
        COM R1
2$:     POP0
        MOV R0,R3
        SHIFT R3
        MOV R1,(R3)+
        MOV R2,(R3)
        POP1,POP2
        POP3,POP4,POP5
        RTS PC


        .END
```

APPENDIX 3

| ADDRESS | DATA | ADDRESS | DATA |
|---|---|---|---|
| 00 | 00004001810000 | 20 | 80C70200000000 |
| 01 | 85130004003801 | 21 | 80870000000000 |
| 02 | C21F08806FD000 | 22 | 81338004003800 |
| 03 | 04E11404000030 | 23 | 820F0000400000 |
| 04 | 840F0184463840 | 24 | 84F90110073800 |
| 05 | 824F4042800200 | 25 | 82930001007804 |
| 06 | 0A8040C1C13000 | 26 | C21F08806FD000 |
| 07 | DA804AC1A93000 | 27 | C2BF4080280000 |
| 08 | 82974E80003C10 | 28 | C2734080280000 |
| 09 | 80670000000000 | 29 | A2AB4280668000 |
| 0A | 0A044243300300 | 2A | 86CB40432C0100 |
| 0B | 021A2E94000010 | 2B | 84B30000301E00 |
| 0C | 826B0184403840 | 2C | 84B70003308600 |
| 0D | 81670000000000 | 2D | 82BB0003306600 |
| 0E | 823F0001206A00 | 2E | 8677404320C502 |
| 0F | 84C00300350000 | 2F | 82A70281220400 |
| 10 | 0A040000684000 | 30 | 84AF0002784000 |
| 11 | 854B03A0003C00 | 31 | 82478280000000 |
| 12 | 848B03800F3890 | 32 | 823B0080200400 |
| 13 | 8267404A010A00 | 33 | 00000000000000 |
| 14 | 00000000000000 | 34 | 00000000000000 |
| 15 | 00000000000000 | 35 | 00000000000000 |
| 16 | 00000000000000 | 36 | 00000000000000 |
| 17 | 00000000000000 | 37 | 00000000000000 |
| 18 | 0C080104040000 | 38 | 808A1800000000 |
| 19 | 1A8C4043400030 | 39 | 0007000000000C |
| 1A | 1A900004000030 | 3A | 00000000000000 |
| 1B | 0A141D04400000 | 3B | 00000000000000 |
| 1C | 82AB0280220000 | 3C | 00000000000000 |
| 1D | 0C044043200500 | 3D | 00000000000000 |
| 1E | 0A8040C1C13000 | 3E | 1A900004003800 |
| 1F | 00000000000000 | 3F | 00000000000000 |

I claim:

1. System for generating data representative of an image having an object within a background field, said object being characterized by a first detectable characteristic and said background being characterized by a second detectable characteristic, comprising:

A. scanning means for scanning said object and background field in a predetermined direction along a plurality of substantially parallel lines of scan, each of said lines of scan being displaced from the previous lines of scan in the direction perpendicular to the direction of scan, B. detection means for generating and storing contour point data representative of elemental regions along said scan lines characterized by a transition between said first and second detectable characteristic, said contour point data for each of said transition regions having a first (X) value representative of the position of that region as measured from the first line of scan in the direction perpendicular to the direction of scan, and a second (Y) value representative of the position of that region as measured from the start of a line of scan in the direction of scan, C. contour, defining means for identifying each contour point value pair (X, Y) with a contour element of the contour of said object, each of said contour elements being monotonically increasing in the direction of perpendicular to said direction of scan, D. vector means for generating and storing a succession of vector data pairs for each of said contour elements, said vector data pairs having a first (ΔX) value and a second (ΔY) value, said ΔY and X values being representative of the distance in said scan direction and perpendicular to said scan direction, respectively, between selected vector start and end points on an associated contour element, said vector start and end points being selected from said contour point data so that the distance between any point on the straight line segment connecting said start and end points and the closest point on said associated contour element between said vector start and end points is less than a predetermined value, E. encoder means for encoding said vector data pairs to form an ordered sequence of code words representative of said object, said encoder means including:

i. vector modification means including:

a. means for identifying the X value at which a new contour element starts along one of said scan lines, and b. breakpoint means for modifying the vector data pair ΔX, ΔY including said scan line for a previously identified contour element, said previously identified contour element being adjacent to said new contour element on the same scan line and preceding said new contour element when the new contour element is the last contour element identified in said same scan line, and following said new contour element otherwise, said breakpoint means being inoperative if the vector end point of the vector data pair of said previously identified contour element is in the same scan line, said breakpoint means including means for generating and storing a first modified vector data pair ΔX, ΔY for said previously identified contour element, said first modified vector data pair having a vector end point representative of the X and Y values for said previously identified contour element in the new start scan line and the previously determined vector start point, and including means for generating and storing a second modified vector data pair ΔX, ΔY for said previously identified contour element, said second modified vector data pair having a vector start point representative of the X and Y values for that new start scan line and the previously determined vector end point, said breakpoint means being inoperative if the vector end point of said previously identified contour element is in said new start scan line, and c. means for replacing in said vector storage means said vector data pair for said previously identified contour element with said first and second modified vector data pairs, ii. storage means for storing a contour element value CE representative of the number of identified contour elements, iii. storage means for storing, in association with each contour element, data representative of the initial X and Y values for that contour element detected during the scan of said object, iv. means for generating and storing a sequence of code words, including sequentially operative:

a. means for generating and storing the first (bearing) code word in said sequence, said first code word being representative of the X value of the scan line in which the first contour element was detected during said scan, b. means for identifying said scan line in which said first contour element was detected as the current scan line, c. means for generating and storing a subsequence of code words for said current scan line including means for performing the steps of:

1. generating and storing an SV word representative of the Y value of a first new start (NS) portion detected in said current scan line, said first NS portion being part of the first contour element detected for the first time along said current scan line, said means for performing said SV generating and storing step being inoperative for a current scan line having no new start portions, 2. generating and storing an NS word and NS value, said NS word and NS value being representative of the number of NS portions of contour elements detected for the first time along the current scan line, said means for performing said NS word and value generating and storing step being inoperative for a current scan line having no new start portions, 3. successively processing NS portions and continuing (C) portions of contour elements detected in the current scan line, said NS portions being parts of contour elements detected for the first time along the current scan line, and said C portions being extensions of contour elements detected in the next previous scan line, wherein said NS and C portion processing is performed in the order of detection of the respective portions along the current scan line, each processing of an NS portion for a current scan line including the sub-steps of:

generating and storing an LC/LR word representative of a predetermined number of most significant bits (LR) of the ΔX value associated with the first vector data pair for the NS portion, and representative of the number of vector data pairs (LC) for which that ΔX value has those most significant bits for the corresponding contour element, generating and storing a DC/DR word representative of a predetermined number of most significant bits (DR) of the ΔY value associated with the first vector data pair for said NS portion, and representative of the number of vector data pairs (DC) for which that ΔY value has those most significant bits for the corresponding contour element, generating and storing a D/L word representative of a predetermined number of least significant bits (L) of the ΔX value associated with said first vector data pair, and representative of a predetermined number of least significant bits (D) of the ΔY value associated with said first vector data pair, whereby LR and L completely specify said ΔX value and DR and D completely specify said ΔY value, generating and storing a first expiration value $X_{exp}$ representative of the number of scan lines between said current scan line and the scan line including the vector end point of the vector pair including said NS portion, generating and storing a second expiration value $M_{exp}$ representative of the number of vector data pairs for said contour element remaining before the LR portion of the LC/LR word for said NS portion changes from one vector data pair to another, generating and storing a third expiration value $N_{exp}$ representative of the number of vector data pairs from the data pair including said NS portion to the data pair in which the DR portion of the DC/DR word for said contour element including said NS portion changes from one vector data pair to another, generating and storing a fourth expiration value $Z_{exp}$ representative of the number of vector data pairs from the data pair including said NS portion to the data pair including the end of the contour element including said NS portion, decrementing said stored NS value, comparing said NS value with zero and when said NS value exceeds zero, completing said processing for said NS portion by generating and storing an SV word representative of the Y value of the next unprocessed NS portion detected along said current scan line, or when said NS value equals zero, completing said processing for said NS portion by generating an NL word, said NL word being representative of the number of scan lines between said current scan line and the next scan line including an NS portion, said NL word being representative of a reference (R) word when there are no other scan lines including an NS portion, wherein each processing of a C portion for a current scan line includes the substeps of:

updating $X_{exp}$ to equal zero when said ΔX value for the vector data pairs associated with the contour element including said C portion changes from one vector data pair to another in said current scan line, or otherwise to be representative of the number of the scan lines following said current scan line before said ΔX value for the vector data pairs associated with the contour element including said C portion changes from one vector data pair to another, comparing said updated $X_{exp}$ with zero, and, when $X_{exp}$ exceeds zero, terminating said processing of said C portion for said current scan line, and when $X_{exp}$ equals zero, updating $Z_{exp}$ to be representative of the number of vector data pairs following the data pair including said C portion to the data pair including the end of the contour element including said C portion, comparing said updated $Z_{exp}$ with zero, and when said updated $Z_{exp}$ equals zero, completing said processing of said C portion by generating and storing a termination (T) word for said contour element and decrementing said CE value, when said $Z_{exp}$ exceeds zero, continuing by updating $M_{exp}$ to be representative of the number of vector data pairs remaining before the LR portion of the LC/LR word for the vector data pairs associated with the contour element including C portion changes from one vector data pair to another, and comparing said updated $M_{exp}$ with zero, and when $M_{exp}$ equals zero, generating an LC/LR word representative of a predetermined number of most significant bits (LR) of the ΔX value associated with the next vector data pair for the C portion, and representative of the number of vector data pairs (LC) and which the ΔX value has those most significant bits, and updating $M_{exp}$ to equal said LC value, updating $N_{exp}$ to be representative of the number of vector data pairs remaining before the DR portion of the DC/DR word for the vector data pairs associated with the contour element including said C portion changes from one vector data pair to another, and comparing said updated $N_{exp}$ with zero, and when $N_{exp}$ equals zero, generating a DC/DR word representative of a predetermined number of most significant bits (DR) of the ΔY value associated with the next vector data pair for the C portion, and representative of the number of vector data pairs (DC) for which that ΔY value has those most significant bits, and updating $N_{exp}$ to equal said DC value, terminating said processing of said C portion for said current scan line, by generating a D/L word representative of a predetermined number of least significant bits (L and D) of the associated ΔX and ΔY values, respectively, associated with the next vector data for the C portion, and updating $X_{exp}$ to be representative of the number of scan lines following said current scan line before said ΔX value for the vector data pairs associated with the contour element including said C portion change from one vector data pair to another, 4. comparing said CE value with zero, when said CE value exceeds zero, updating said scan line identifying means so that said current scan line is the next closest scan line following said previous current scan line, said next closest scan line being selected from the set of scan lines including:

the scan lines identical to or following said previous current scan line and defined by the $X_{exp}$ values for processed NS and C portions, and returning to step 1 for said new current scan line, and when said CE value equals zero, terminating said generation and storage of said subsequence of code words.

2. The system according to claim 1 wherein said vector means is adapted to select said vector start and end points so that the number of points on said contour element between said vector start and end points that are greater than a predetermined distance from the straight line segment connecting said vector start and end points is less than a value that is functionally dependent on the ΔX value for said vector start and end points.

3. The system according to claim 1 wherein said object is an alphanumeric character and said scan direction is top-to-bottom with respect to said character.

4. The system according to claim 1 wherein said object is an alphanumeric character and said scan direction is left-to-right with respect to said character.

5. The system according to claim 1 wherein said object is an alphanumeric character and said scan direction is bottom-to-top with respect to said character.

6. The system according to claim 1 wherein said object is an alphanumeric character and said scan direction is right-to-left with respect to said character.

7. The system according to claim 1 wherein said scanning means is adapted to scan said object in alternate directions along alternate lines of scan, and wherein said detection means includes data buffer means to transform said contour point data so that said X value is measured from a single edge of the array of scan lines.

8. System for generating phototypesetting control signals for a cathode ray tube (CRT) having a constant stroke rate raster pattern, comprising:

means for scanning selected images and generating character data representative thereof, means for encoding said character data in accordance with a first predetermined sequence of steps to generate an ordered succession of encoded untagged character data words, means for decoding said encoded untagged character data words in accordance with a second predetermined sequence of steps, means for transforming said decoded character data to said control signals, said control signal being adapted to reproduce said selected images on said CRT, wherein said first and second predetermined sequence of steps are related so that the ordering of said ordered succession of data words provides data word type and contour segment identification required by said second sequence of steps to generate stroke signals for said output CRT, wherein said first predetermined steps are adapted so that said second predetermined steps may be selectively modified to provide selective scaling of reproduction of said selected images on said CRT.

9. System according to claim 8 wherein said selective scaling is independent in two orthogonal directions.

10. System for generating data representative of the contour of an object against a background comprising:

A. means for scanning said object and background along a plurality of substantially parallel scan lines and for identifying contour points on said object along said scan lines, B. means for grouping selected ones of said identified contour points so that the contour points of each group are representative of a contour element of said object, said contour element extending monotonically in the direction perpendicular to said scan lines, C. means for generating and storing vector data for each group representative of a piecewise linear representation of the associated contour element, each straight line portion of said piecewise linear representation being representative of the change ($\Delta Y$) in said portion in the direction of said scan lines and number of scan lines ($\Delta X$) for which said portion extends, D. means for encoding and storing said vector data for each group in a succession of data words, said succession including words representative of the starting position for said group, the common range of $\Delta X$ values for two or more of said straight line portions and the number of said straight line portions for which that common $\Delta X$ range is valid, the common range of $\Delta Y$ values for two or more of said straight line portions and the number of said straight line portions for which that common $\Delta Y$ range is valid, and the incremental variances of the $\Delta X$ and $\Delta Y$ values for each of said straight line portions within said common ranges.

11. System according to claim 10 further comprising means for compiling and storing said encoded vector data words in a predetermined order related to said $\Delta X$ and $\Delta Y$ values.

12. System for generating a succession of stroke signals from an ordered sequence of code word, said succession of stroke signals being representative of detectable characteristics of a corresponding succession of substantially parallel elongated strips of an image including an object against a background, said code words being representative of line segments connecting contour points along associated contour elements of said object, said contour elements being single valued in the direction perpendicular to said strips, and said code words including data representative of the start points of said segments, the ranges of positional changes between the start and end points of said segments, incremental variances of the positional changes beyond said ranges for said segments, and the member of successive segments associated with the same contour element having corresponding positional changes in the same range, comprising:

A. means for successively identifying each strip of said image as a current strip, B. vector generating means operative for each current strip to generate and store vector data from said code words for each of said line segments overlapping said current strip, said vector data for each of said line segments being representative of:

the ratio $\Delta Y/\Delta X$, said ratio corresponding to the change in position of said line segment in the direction of said strip from said current strip to the next strip, the starting point (SV) of said line segment in said current strip, and the number of subsequent strips ($\Delta X$) for which said change in position for each strip is unchanged, C. vector-to-stroke conversion means operative for each current strip to convert said stored vector data to one of said stroke signals.

13. A system according to claim 12 wherein said conversion means includes means responsive to said vector data to identify the location of each line segment in said current strip and to generate said stroke signal in binary form, said stroke signal being a time function and having binary level transitions at points in time corresponding to said locations.

14. A system according to claim 12 wherein said vector generating means includes:

means operative for said current strip for generating segment data words from said code words for each of said line segments overlapping said current strip, said segment data words for each of said segments being representative of:

the end point for said line segment in accordance with said associated code words, a scaled length of said line segment, said scaled length corresponding to the length of said line segment from said current strip in the direction perpendicular to said current strip and scaled by a first scale factor, and corresponding to an integer and a fractional value (k), the range of the positional change in the direction perpendicular to said current strip between said start and end points of said segment, and the number of subsequent successive segments of said associated contour element having corresponding positional changes in the same range, the range of the positional change in the direction of said current strip between said start and end points of said segment, and the number of subsequent successive segments of said associated contour element having corresponding positional changes in the same range, means for identifying segment data words having no subsequent strips for which said change in position is unchanged, means for ordering said identified segment data words in order of increasing scaled length, and for ordering said identified segment data words having the same scaled length in order of increasing position along said current strip, means for generating and updating said vector data in the order of said identified segment data words whereby said vector data for each of said words is representative of:

modified $\Delta Y/\Delta X$, said $\Delta Y$ value being modified to equal the product of $\Delta Y$ and said second scale factor, and said $\Delta X$ value being modified to equal the product of $\Delta X$ and said first scale factor, modified starting point, said modified starting point being equal to the product of SV and a second scale factor plus the product of (1-k) and said modified $\Delta Y/\Delta X$ factor, the modified number of subsequent strips for which the change in position for each strip is unchanged, said modified number being equal to k plus the product of $\Delta X$ and said first scale factor, storage means for storing said vector data in said order of said identified segment data words.

15. A system according to claim 14 wherein said conversion means includes means responsive to said vector data to identify the location of each line segment in said current strip and to generate said stroke signal in binary form, said stroke signal being a time function and having binary level transitions at points in time corresponding to said locations.

16. Method for generating data representative of an image having an object within a background field, said object being characterized by a first detectable characteristic and said background being characterized by a second detectable characteristic, comprising the steps of:

A. scanning said object and background field in a predetermined direction along a plurality of substantially parallel lines of scan, each of said lines of scan being displaced from the previous lines of scan in the direction perpendicular to the direction of scan, B. generating and storing contour point data representative of elemental regions along said scan lines characterized by a transition between said first and second detectable characteristic, said contour point data for each of said transition regions having a first (X) value representative of the position of that region as measured from the first line of scan in the direction perpendicular to the direction of scan, and a second (Y) value representative of the position of that region as measured from the start of a line of scan in the direction of scan, C. identifying each contour point value pair (X, Y) with a contour element of the contour of said object, each of said contour elements being monotonically increasing in the direction of perpendicular to said direction of scan, D. generating and storing a succession of vector data pairs for each of said contour elements, said vector data pairs having a first ($\Delta X$) value and a second ($\Delta Y$) value, said $\Delta Y$ and $\Delta X$ values being representative of the distance in said scan direction and perpendicular to said scan direction, respectively, between selected vector start and end points on an associated contour element, said vector start and end points being selected from said contour point data so that the distance between any point on the straight line segment connecting said start and end points and the closest point on said associated contour element between said vector start and end points is less than a predetermined value, E. encoding said vector data pairs to form an ordered sequence of code words representative of said object, said encoding step including:

i. modifying said vector data pairs by:

a. identifying the X value at which a new contour element starts along one of said scan lines, and b. modifying the vector data pair $\Delta X$, $\Delta Y$ including said scan line for a previously identified contour element, said previously identified contour element being adjacent to said new contour element on the same scan line and preceding said new contour element when the new contour element is the last contour element identified in said same scan line, and following said new contour element otherwise, said vector data pair modifying step being omitted if the vector end point of the vector data pair of said previously identified contour element is in the same scan line, said vector data pair modifying step including the sub-steps of generating and storing a first modified vector data pair $\Delta X$, $\Delta Y$ for said previously identified contour element, said first modified vector data pair having a vector end point representative of the X and Y values for said previously identified contour element in the new start scan line and the previously determined vector start point, and including generating and storing a second modified vector data pair $\Delta X$, $\Delta Y$ for said previously identified contour element, said second modified vector data pair having a vector start point representative of the X and Y values for that new start scan line and the previously determined vector end point, said vector data pair modifying step being omitted if the vector end point of said previsously identified contour element is in said new start scan line, and c. replacing in said vector storage means said vector data pair for said previously identified contour element with said first and second modified vector data pairs, ii. generating and storing a contour element value CE representative of the number of identified contour elements, iii. storing, in association with each contour element, data representative of the initial X and Y values for that contour element detected during the scan of said object, iv. generating and storing a sequence of code words, including the sequential sub-steps of:

a. generating and storing the first (bearing) code word in said sequence, said first code word being representative of the X value of the scan line in which the first contour element was detected during said scan, b. identifying said scan line in which said first contour element was detected as the current scan line, c. generating and storing a subsequence of code words for said current scan line including the sub-steps of:

1. generating and storing an SV word representative of the Y value of a first new start (NS) portion detected in said current scan line, said first NS portion being part of the first contour element detected for the first time along said current scan line, said SV generating and storing sub-step being deleted for a current scan line having no new start portions, 2. generating and storing an NS word and NS value, said NS word and NS value being representative of the number of NS portions of contour elements detected for the first time along the current scan line, said NS word and value generating and storing sub-step being deleted for a current scan line having no new start portions 3. successively processing NS portions and continuing (C) portions of contour elements detected in the current scan line, said NS portions being parts of contour elements detected for the first time along the current scan line, and said C portions being extensions of contour elements detected in the next previous scan line, wherein said NS and C portion processing is performed in the order of detection of the respective portions along the current scan line, each processing of an NS portion for a current scan line including the sub-steps of:

generating and storing an LC/LR word representative of a predetermined number of most significant bits (LR) of the ΔX value associated with the first vector data pair for the NS portion, and representative of the number of vector data pairs (LC) for which that ΔX value has those most significant bits for the corresponding contour element, generating and storing a DC/DR word representative of a predetermined number of most significant bits (DR) of the ΔY value associated with the first vector data pair for said NS portion, and representative of the number of vector data pairs (DC) for which that ΔY value has those most significant bits for the corresponding contour element, generating and storing a D/L word representative of a predetermined number of least significant bits (L) of the ΔX value associated with said first vector data pair, and representative of a predetermined number of least significant bits (D) of the ΔY value associated with said first vector data pair, whereby LR and L completely specify said ΔX value and DR and D completely specify said ΔY value, generating and storing a first expiration value $X_{exp}$ representative of the number of scan lines between said current scan line and the scan line including the vector end point of the vector pair including said NS portion, generating and storing a second expiration value $M_{exp}$ representative of the number of vector data pairs for said contour element remaining before the LR portion of the LC/LR word for said NS portion changes from one vector data pair to another, generating and storing a third expiration value $N_{exp}$ representative of the number of vector data pairs from the data pair including said NS portion to the data pair in which the DR portion of the DC/DR word for said contour element including said NS portion changes from one vector data pair to another, generating and storing a fourth expiration value $Z_{exp}$ representative of the number of vector data pairs from the data pair including said NS portion to the data pair including the end of the contour element including said NS portion, decrementing said stored NS value, comparing said NS value with zero and when said NS value exceeds zero, completing said processing for said NS portion by generating and storing an SV word representative of the Y value of the next unprocessed NS portion detected along said current scan line, or when said NS value equals zero, completing said processing for said NS portion by generating an NL word, said NL word being representative of the number of scan lines between said current scan line and the next scan line including an NS portion, said NL word being representative of a reference (R) word when there are no other scan lines including an NS portion, wherein each processing of a C portion for a current scan line includes the substeps of:

updating $X_{exp}$ to equal zero when said ΔX value for the vector data pairs associated with the contour element including said C portion changes from one vector data pair to another in said current scan line, or otherwise to be representative of the number of the scan lines following said current scan line before said ΔX value for the vector data pairs associated with the contour element including said C portion changes from one vector data pair to another, comparing said updated $X_{exp}$ with zero, and, when $X_{exp}$ exceeds zero, terminating said processing of said C portion for said current scan line, and when $X_{exp}$ equals zero, updating $Z_{exp}$ to be representative of the number of vector data pairs following the data pair including said C portion to the data pair including the end of the contour element including said C portion, comparing said updated $Z_{exp}$ with zero, and when said updated $Z_{exp}$ equals zero, completing said processing of said C portion by generating and storing a termination (T) word for said contour element and decrementing said CE value, when said $Z_{exp}$ exceeds zero, continuing by updating $M_{exp}$ to be representative of the number of vector data pairs remaining before the LR portion of the LC/LR word for the vector data pairs associated with the contour element includng C portion changes from one vector data pair to another, and comparing said updated $M_{exp}$ with zero, and when $M_{exp}$ equals zero, generating an LC/LR word representative of a predetermined number of most significant bits (LR) of the ΔX value associated with the next vector data pair for the C portion, and representative of the number of vector data pairs (LC) and which that ΔX value has those most significant bits, and updating $M_{exp}$ to equal said LC value, updating $N_{exp}$ to be representative of the number of vector data pairs remaining before the DR portion of the DC/DR word for the vector data pairs associated with the contour element including said C portion changes from one vector data pair to another, and comparing said updated $N_{exp}$ with zero, and when $N_{exp}$ equals zero, generating a DC/DR word representative of a predetermined number of most significant bits (DR) of the ΔY value associated with the next vector data pair for the C portion, and representative of the number of vector data pairs (DC) for which that ΔY value has those most significant bits, and updating $N_{exp}$ to equal said DC value, terminating said processing of said C portion for said current scan line, by generating a D/L word representative of a predetermined number of least significant bits (L and D) of the associated ΔX and ΔY values, respectively, associated with the next vector data pair for the C portion, and updating X hd exp to be representative of the number of scan lines following said current scan line before said ΔX value for the vector data pairs associated with the contour element including said C portion change from one vector data pair to another, 4. comparing said CE value with zero, and when said CE value exceeds zero, updating said scan line identifying means so that said current scan line is the next closest scan line following said previous current scan line, said next closest scan line being selected from the set of scan lines including:

the scan lines identical to or following said previous current scan line and defined by the $X_{exp}$ values for processed NS and C portions, and returning to step 1 for said new current scan line, and when said CE value equals zero, terminating said generation and storage of said subsequence of code words.

17. The method according to claim 16 wherein said step of generating said succession of vector data pairs includes the step of selecting said vector start and end points so that the number of points on said contour element between said vector start and end points that are greater than a predetermined distance from the straight line segment connecting said vector start and end points is less than a value that is functionally dependent on the ΔX value for said vector start and end points.

18. The method according to claim 16 wherein said object is an alphanumeric character and said scanning step includes scanning from top-to-bottom with respect to said character.

19. The method according to claim 16 wherein said object is an alphanumeric character and said scanning step includes scanning from left-to-right with respect to said character.

20. The method according to claim 16 wherein said object is an alphanumeric character and said scannig step includes scanning from bottom-to-top with respect to said character.

21. The method according to claim 16 wherein said object is an alphanumeric character and said scanning step includes scanning from right-to-left with respect to said character.

22. The method according to claim 16 wherein said scanning step includes scanning of said object in alternate directions along alternate lines of scan, and wherein said detecting step includes transforming said contour point data so that said X value is measured from a single edge of the array of scan lines.

23. Method for generating phototypesetting control signals for a cathode ray tube (CRT) having a constant stroke rate raster pattern, comprising the steps of:

scanning selected images and generating character data representative thereof, encoding said character data in accordance with a first predetermined sequence of steps to generate an ordered succession of encoded untagged character data words, decoding said encoded untagged character data words in accordance with a second predetermined sequence of steps, transforming said decoded character data to said control signals, said control signal being adapted to reproduce said selected images on said CRT, wherein said first and second predetermined sequence of steps are related so that the ordering of said ordered succession of data words provides data word type and contour segment identification required by second sequence of steps to generate stroke signals for said output CRT, including the further step of selectively modifying said first predetermined steps so that said second predetermined steps provide selective scaling of reproduction of said selected images on said CRT.

24. Method according to claim 23 wherein said selective scaling is independent in two orthogonal directions.

25. Method for generating data representative of the contour of an object against a background comprising the steps of:

A. scanning said object and background along a plurality of substantially parallel scan lines and for identifying contour points on said object along said scan lines, B. grouping selected ones of said identified contour points so that the contour points of each group are representative of a contour element of said object, said contour element extending monotonically in the direction perpendicular to said scan lines, C. generating and storing vector data for each group representative of a piecewise linear representation of the associated contour element, each straight line portion of said piecewise linear representation being representative of the change (ΔY) in said portion in the direction of said scan lines and number of scan lines (ΔX) for which said portion extends, D. encoding and storing said vector data for each group in a succession of data words, said succession including words representative of the starting position for said group, the common range of ΔX values for two or more of said straight line portions and the number of said straight line portions for which that common ΔX range is valid, the common range of ΔY values for two or more of said straight line portions and the number of said straight line portions for which that common ΔY range is valid, and the incremental variances of the ΔX and ΔY values for each said straight line portions within said common ranges.

26. Method according to claim 25 comprising the further step of compiling and storing said encoded vector data words in a predetermined order related to said ΔX and ΔY values.

27. Method for generating a succession of stroke signals from an ordered sequence of code words, said succession of stroke signals being representative of detectable characteristics of a corresponding succession of substantially parallel elongated strips of an image including an object against a background, said code words being representative of line segments connecting contour points along associated contour elements of said object, said contour elements being single valued in the direction perpendicular to said strips, and said code words including data representative of the start points of said segments, the ranges of positional changes between the start and end points of said segments, incremental variances of the positional changes beyond said ranges for said segments, and the number of successive segments associated with the same contour element having corresponding positional changes in the same range, comprising the steps of:

A. successively identifying each strip of said image as a current strip,

B. for each current strip, generating and storing vector data from said code words for each of said line segments overlapping said current strip, said vector data for each of said line segments being representative of:

the ratio ΔY/ΔX, said ratio corresponding to the change in position of said line segment in the direction of said strip from said current strip to the next strip, the starting point (SV) of said line segment in said current strip, and the number of subsequent strips (ΔX) for which said change in position for each strip is unchanged, C. for each current strip, converting said stored vector data to one of said stroke signals.

28. The method according to claim 27 wherein said converting step includes identifying the location of each line segment in said current strip from said vector data and generating said stroke signal in binary form, said stroke signal being a time function and having binary level transitions at points in time corresponding to said locations.

29. The method according to claim 27 wherein said vector data generating step includes the sub-steps of:

generating segment data words for said current strip from said code words for each of said line segments overlapping said current strip, said segment data words for each of said segments being representative of:

the end point for said line segment in accordance with said associated code words, a scaled length of said line segment, said scaled length corresponding to the length of said line segment from said current strip in the direction perpendicular to said current strip and scaled by a first scale factor, and corresponding to an integer and a fractional value (k), the range of the positional change in the direction perpendicular to said current strip between said start and end points of said segment, and the number of subsequent successive segments of said associated contour element having corresponding positional changes in the same range, the range of the positional change in the direction of said current strip between said start and end points of said segment, and the number of subsequent successive segments of said associated contour element having corresponding positional changes in the same range, identifying segment data words having no subsequent strips for which said change in position is unchanged, ordering said identified segment data words in order of increasing scaled length, and ordering said identified segment data words having the same scales length in order of increasing position along said current strip, generating and updating said vector data in the order of said identified segment data words whereby said vector data for each of said words is representative of:

modified ΔY/ΔX, said ΔY value being modified to equal the product of ΔY and said second scale factor, and said ΔX value being modified to equal the product of ΔX and said first scale factor, modified starting point, said modified starting point being equal to the product of SV and a second scale factor plus the product of (1-k) and said modified ΔY/ΔX factor, the modified number of subsequent strips for which the change in position for each strip is unchanged, said modified number being equal to k plus the product of ΔX and said first scale factor, storing said vector data in said order of said identified segment data words.

30. The method according to claim 29 wherein said converting step includes identifying the location of each line segment in said current strip from said vector data and generating said stroke signal in binary form, said stroke signal being a time function and having binary level transitions at points in time corresponding to said locations.

* * * * *